(12) United States Patent
Pohl et al.

(10) Patent No.: US 10,260,629 B2
(45) Date of Patent: Apr. 16, 2019

(54) CONTINUOUSLY VARIABLE TRANSMISSION

(71) Applicant: Fallbrook Intellectual Property Company LLC, Cedar Park, TX (US)

(72) Inventors: Brad P. Pohl, Leander, TX (US); Fernand A. Thomassy, Liberty Hill, TX (US); Charles B. Lohr, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 15/869,528

(22) Filed: Jan. 12, 2018

(65) Prior Publication Data

US 2018/0135750 A1    May 17, 2018

Related U.S. Application Data

(63) Continuation of application No. 14/550,702, filed on Nov. 21, 2014, now Pat. No. 9,869,388, which is a
(Continued)

(51) Int. Cl.
*F16H 15/28* (2006.01)
*F16H 15/50* (2006.01)
(Continued)

(52) U.S. Cl.
CPC .......... *F16H 61/664* (2013.01); *F16H 15/50* (2013.01); *F16H 61/6648* (2013.01); *F16H 63/067* (2013.01); *F16H 15/28* (2013.01)

(58) Field of Classification Search
CPC ... F16H 2064/6604; F16H 15/28; F16H 15/50
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |

(Continued)

FOREIGN PATENT DOCUMENTS

| | | |
|---|---|---|
| CH | 118064 | 12/1926 |
| CN | 1054340 | 9/1991 |

(Continued)

OTHER PUBLICATIONS

Office Action dated Aug. 31, 2012 for U.S. Appl. No. 12/667,681.
(Continued)

*Primary Examiner* — Tisha D Lewis
(74) *Attorney, Agent, or Firm* — Knobbe Martens Olson & Bear LLP

(57) ABSTRACT

Inventions are directed to components, subassemblies, systems, and/or methods for continuously variable transmissions (CVT). In one aspect, a control system is adapted to facilitate a change in the ratio of a CVT. A control system includes a control reference nut coupled to a feedback cam and operably coupled to a skew cam. In some cases, the skew cam is configured to interact with carrier plates of a CVT. Various inventive feedback cams and skew cams can be used to facilitate shifting the ratio of a CVT. In some transmissions described, the planet subassemblies include legs configured to cooperate with the carrier plates. In some cases, a neutralizer assembly is operably coupled to the carrier plates. A shift cam and a traction sun are adapted to cooperate with other components of the CVT to support operation and/or functionality of the CVT. Among other things, shift control interfaces for a CVT are described.

18 Claims, 41 Drawing Sheets

Related U.S. Application Data continuation of application No. 13/963,274, filed on Aug. 9, 2013, now Pat. No. 8,900,085, which is a continuation of application No. 12/667,681, filed as application No. PCT/US2008/068929 on Jul. 1, 2008, now Pat. No. 8,506,452.

(60) Provisional application No. 60/948,152, filed on Jul. 5, 2007.

(51) Int. Cl.
 *F16H 61/664* (2006.01)
 *F16H 63/06* (2006.01)

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |

(56) References Cited

U.S. PATENT DOCUMENTS

| | | |
|---|---|---|
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schivelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,086,506 A | 7/2000 | Petersmann et al. |
| 6,095,940 A | 8/2000 | Ai et al. |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,459,978 B2 | 10/2002 | Tamiguchi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,931,316 B2 | 8/2005 | Joe et al. |
| 6,932,739 B2 | 8/2005 | Miyata et al. |
| 6,942,593 B2 | 9/2005 | Nishii et al. |

(56) References Cited

U.S. PATENT DOCUMENTS

| | | |
|---|---|---|
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |

(56) References Cited

U.S. PATENT DOCUMENTS

| | | |
|---|---|---|
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,996,263 B2 | 3/2015 | Quinn et al. |
| 9,017,207 B2 | 4/2015 | Pohl et al. |
| 9,022,889 B2 | 5/2015 | Miller |
| 9,046,158 B2 | 6/2015 | Miller et al. |
| 9,074,674 B2 | 7/2015 | Nichols et al. |
| 9,086,145 B2 | 7/2015 | Pohl et al. |
| 9,121,464 B2 | 9/2015 | Nichols et al. |
| 9,182,018 B2 | 11/2015 | Bazyn et al. |
| 9,239,099 B2 | 1/2016 | Carter et al. |
| 9,249,880 B2 | 2/2016 | Vasiliotis et al. |
| 9,273,760 B2 | 3/2016 | Pohl et al. |
| 9,279,482 B2 | 3/2016 | Nichols et al. |
| 9,291,251 B2 | 3/2016 | Lohr et al. |
| 9,328,807 B2 | 5/2016 | Carter et al. |
| 9,341,246 B2 | 5/2016 | Miller et al. |
| 9,360,089 B2 | 6/2016 | Lohr et al. |
| 9,365,203 B2 | 6/2016 | Keilers et al. |
| 9,371,894 B2 | 6/2016 | Carter et al. |
| 9,506,562 B2 | 11/2016 | Miller et al. |
| 9,528,561 B2 | 12/2016 | Nichols et al. |
| 9,574,642 B2 | 2/2017 | Pohl et al. |
| 9,574,643 B2 | 2/2017 | Pohl |
| 9,611,921 B2 | 4/2017 | Thomassy et al. |
| 9,618,100 B2 | 4/2017 | Lohr |
| 9,676,391 B2 | 6/2017 | Carter et al. |
| 9,677,650 B2 | 6/2017 | Nichols et al. |
| 9,683,638 B2 | 6/2017 | Kostrup |
| 9,683,640 B2 | 6/2017 | Lohr et al. |
| 9,709,138 B2 | 7/2017 | Miller et al. |
| 9,726,282 B2 | 8/2017 | Pohl et al. |
| 9,732,848 B2 | 8/2017 | Miller et al. |
| 9,739,375 B2 | 8/2017 | Vasiliotis et al. |
| 9,850,993 B2 | 12/2017 | Bazyn et al. |
| 9,869,388 B2 * | 1/2018 | Pohl ............... F16H 15/50 |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0161503 A1 | 10/2002 | Joe et al. |
| 2002/0169051 A1 | 11/2002 | Oshidari |
| 2002/0179348 A1 | 12/2002 | Tamai et al. |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1 | 7/2003 | O'Hora |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1 | 4/2005 | Carlson et al. |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2010/0181130 A1 | 7/2010 | Chou |

(56) References Cited

U.S. PATENT DOCUMENTS

| | | |
|---|---|---|
| 2011/0127096 A1 | 6/2011 | Schneidewind |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2014/0274536 A1 | 9/2014 | Versteyhe |
| 2015/0018154 A1 | 1/2015 | Thomassy |
| 2015/0051801 A1 | 2/2015 | Quinn et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2016/0003349 A1 | 1/2016 | Kimura et al. |
| 2016/0186847 A1 | 6/2016 | Nichols et al. |
| 2016/0201772 A1 | 7/2016 | Lohr et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0274903 A1 | 9/2017 | Carter et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 19851738 | 5/2000 |
| DE | 10155372 | 5/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 136 724 | 9/2001 |
| EP | 1 251 294 | 10/2002 |
| EP | 1 366 978 | 3/2003 |
| EP | 1 433 641 | 6/2004 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |

(56) References Cited

FOREIGN PATENT DOCUMENTS

| | | |
|---|---|---|
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 11-063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-133896 | 6/2008 |
| JP | 2010-069005 | 4/2010 |
| JP | 2012-225390 | 11/2012 |
| JP | 2015-227690 | 12/2015 |
| JP | 2015-227691 | 12/2015 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 08/078047 | 7/2008 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

Office Action dated Dec. 7, 2012 for U.S. Appl. No. 12/667,681.
Office Action dated Feb. 14, 2014 in U.S. Appl. No. 13/963,274.
Office Action dated Dec. 15, 2014 in Canadian Patent Application No. 2,692,476.
Office Action dated Aug. 27, 2015 in Canadian Patent Application No. 2,692,476.
Office Action dated Nov. 29, 2012 for Chinese Patent Application No. 200880105257.6.
Office Action dated May 29, 2013 for Chinese Patent Application No. 200880105257.6.
First Office Action dated Oct. 13, 2015 in Chinese Patent Application No. 201310716731.1.
Second Office Action dated May 17, 2016 in Chinese Patent Application No. 201310716731.1.
Office Action dated Jul. 2, 2013 in Japanese Patent Application No. 2010-515240.
Office Action dated Sep. 24, 2014 in Japanese Patent Application No. 2013-264904.
Office Action dated Aug. 6, 2014 in Korean Patent Application No. 10-2010-7002355.
Office Action dated Jan. 7, 2015 in Korean Patent Application No. 10-2010-7002355.
Office Action dated Jul. 1, 2015 in Korean Patent Application No. 10-2010-7002355.
Office Action dated Dec. 12, 2014 in Korean Patent Application No. 10-2014-7031011.
Notification of Allowance dated Oct. 26, 2015 in Korean Patent Application No. 10-2014-7031011.
Notice of Notification to Submit an Argument dated Apr. 4, 2016 in Korean Patent Application No. 10-2016-7001566.
International Preliminary Report on Patentability for International Patent Application No. PCT/US2008/068929 dated Feb. 18, 2010.
International Search Report and Written Opinion dated Feb. 2, 2010 from International Patent Application No. PCT/US2008/068929, filed on Jan. 7, 2008.
Taiwanese Office Action dated Mar. 27, 2013 for Taiwanese Patent Application No. 097125222.
Thomassy: An Engineering Approach to Simulating Traction EHL. CVT-Hybrid International Conference Mecc/Maastricht/The Netherlands, Nov. 17-19, 2010, p. 97.
Office Action dated Nov. 23, 2016 in U.S. Appl. No. 14/550,702.
Office Action dated May 19, 2017 in U.S. Appl. No. 14/550,702.
Office Action dated Dec. 12, 2016 in Canadian Patent Application No. 2,692,476.
First examination report dated Jul. 6, 2017 in Indian Patent Application No. 72/KOLNP/2010.

* cited by examiner

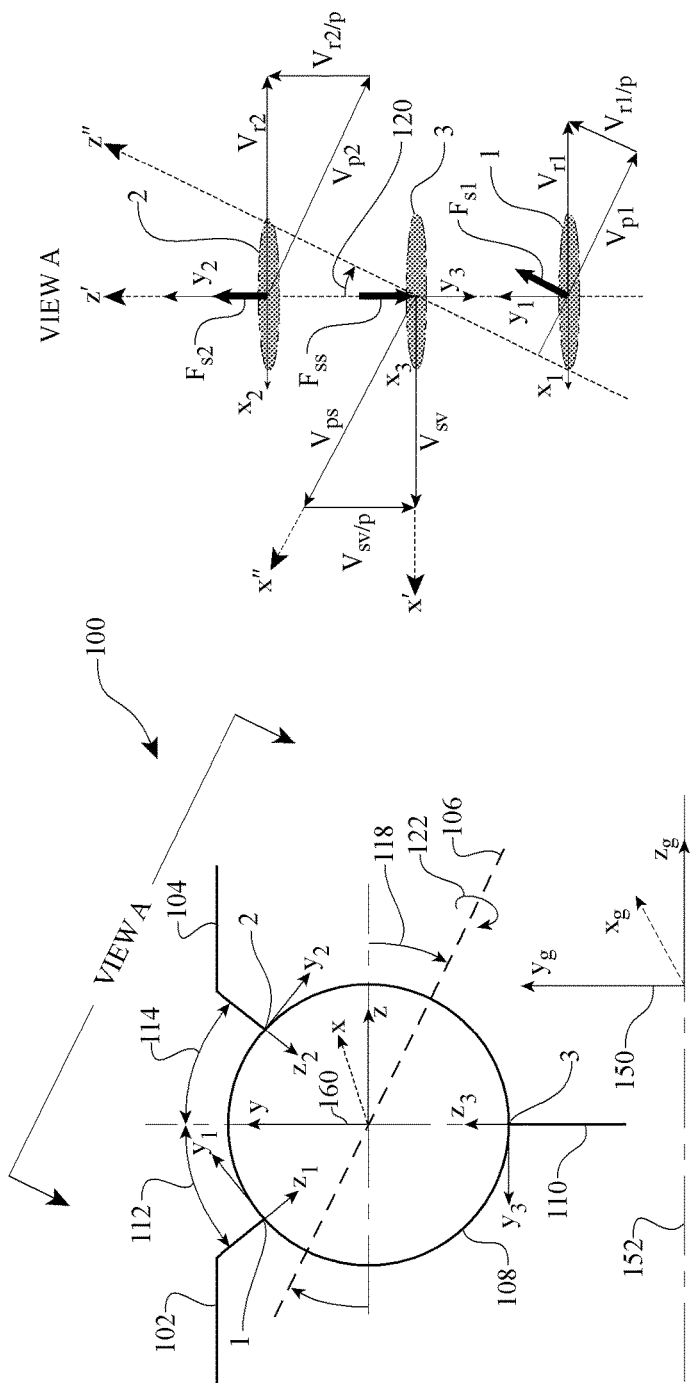
FIG. 1A
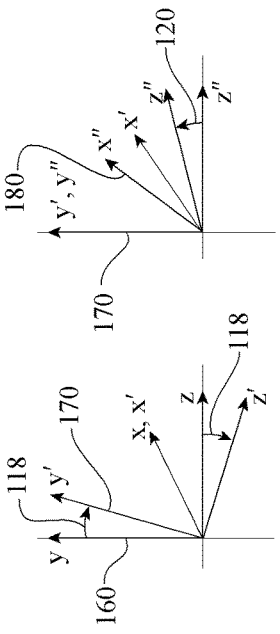
FIG. 1B
FIG. 1C

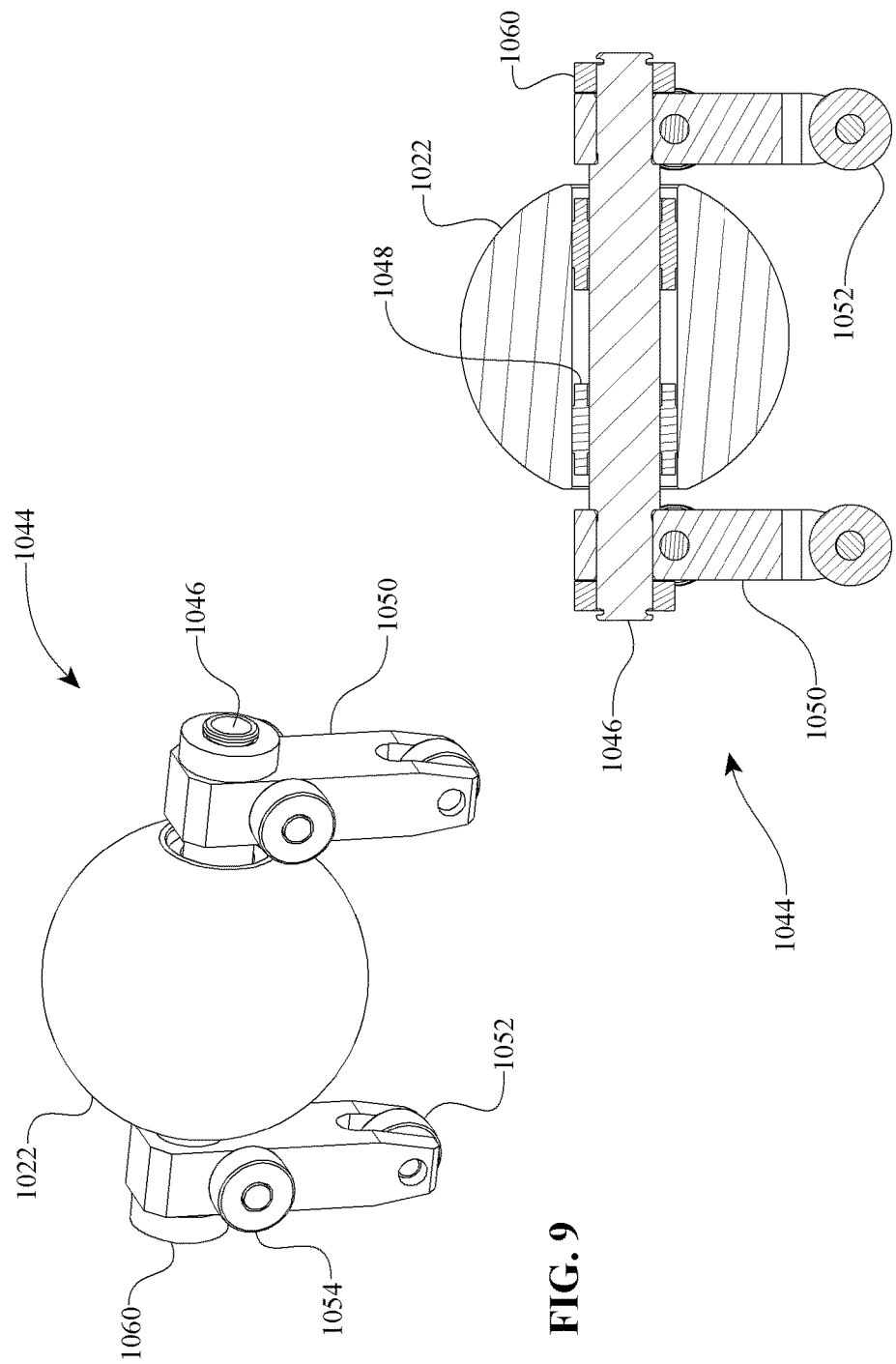

DETAIL A

DETAIL B

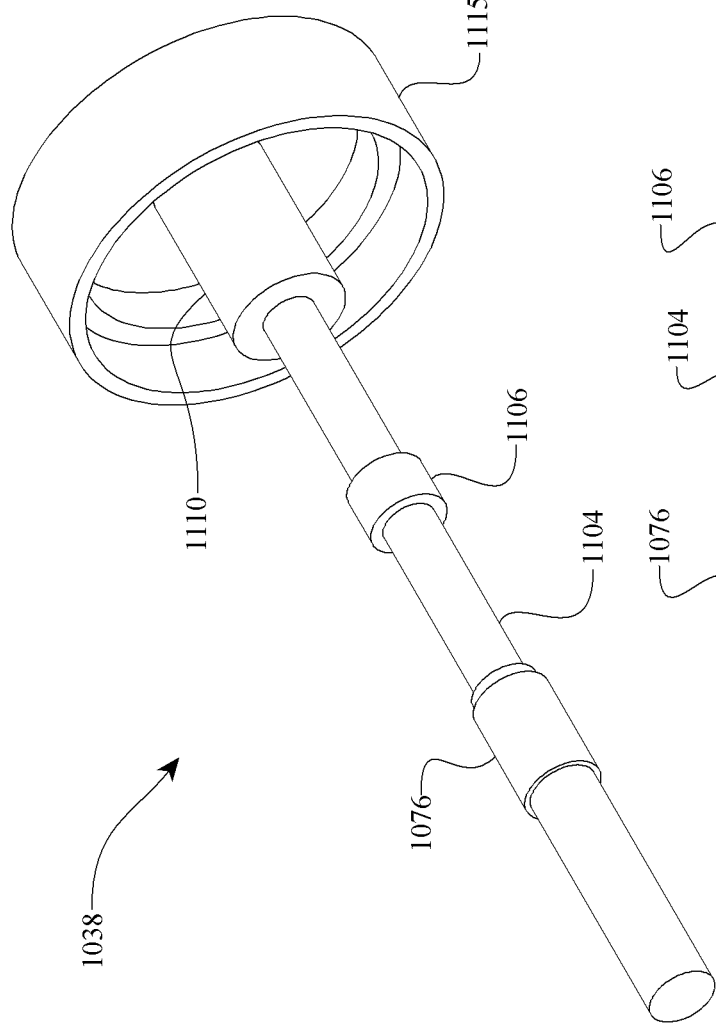
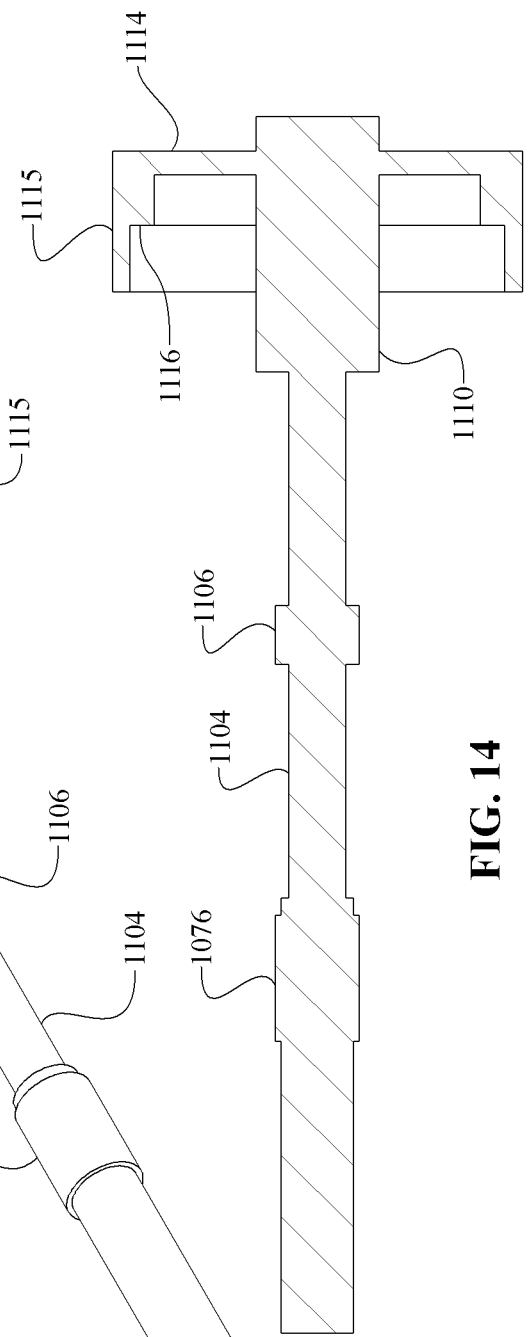

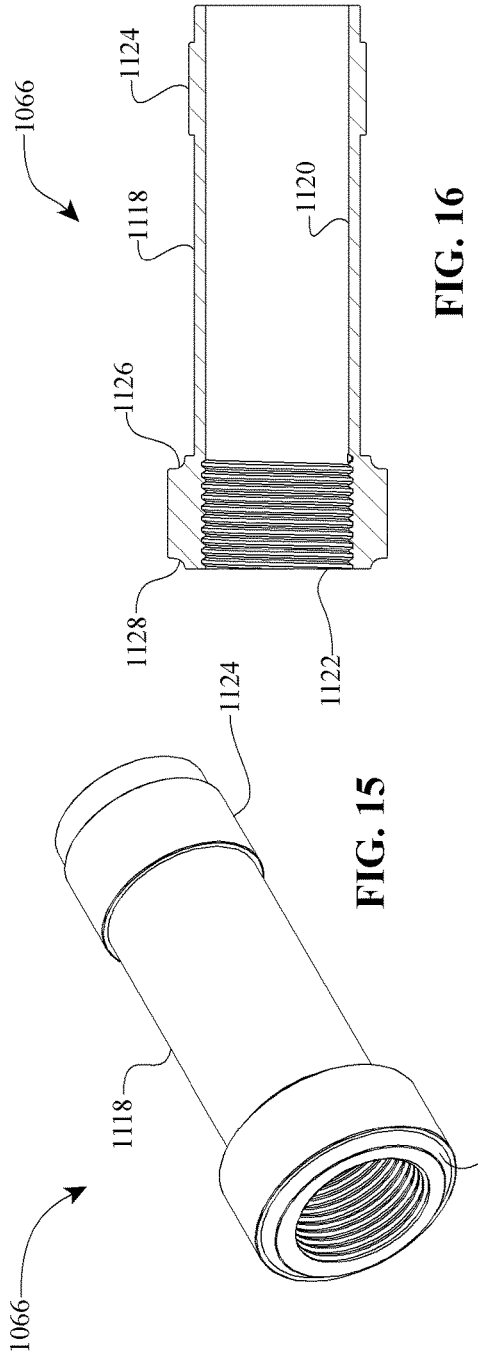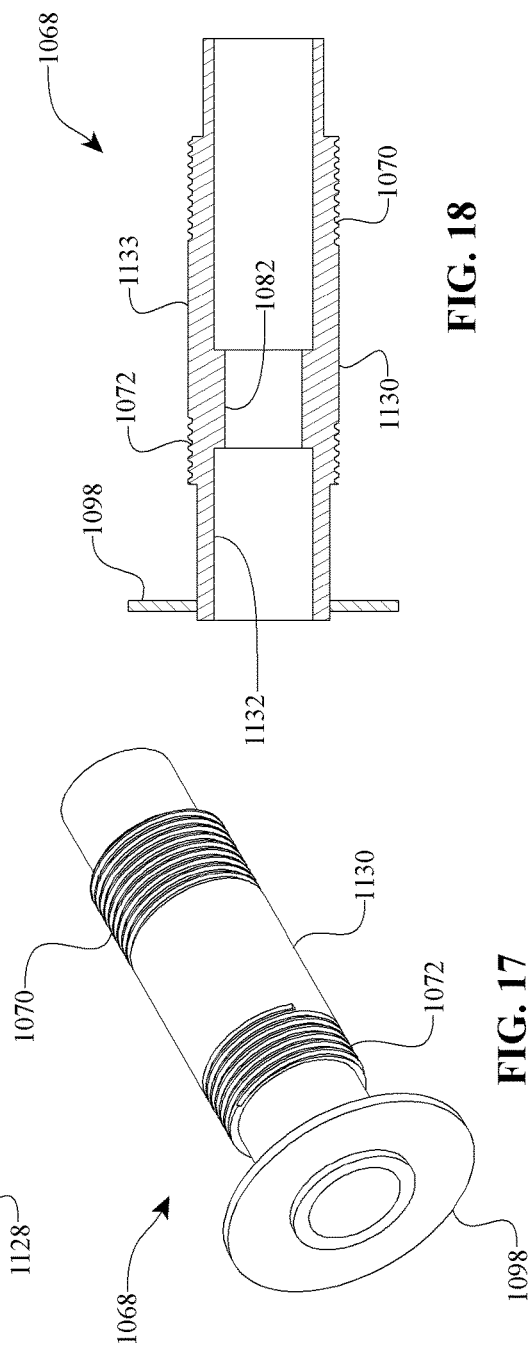

DETAIL C

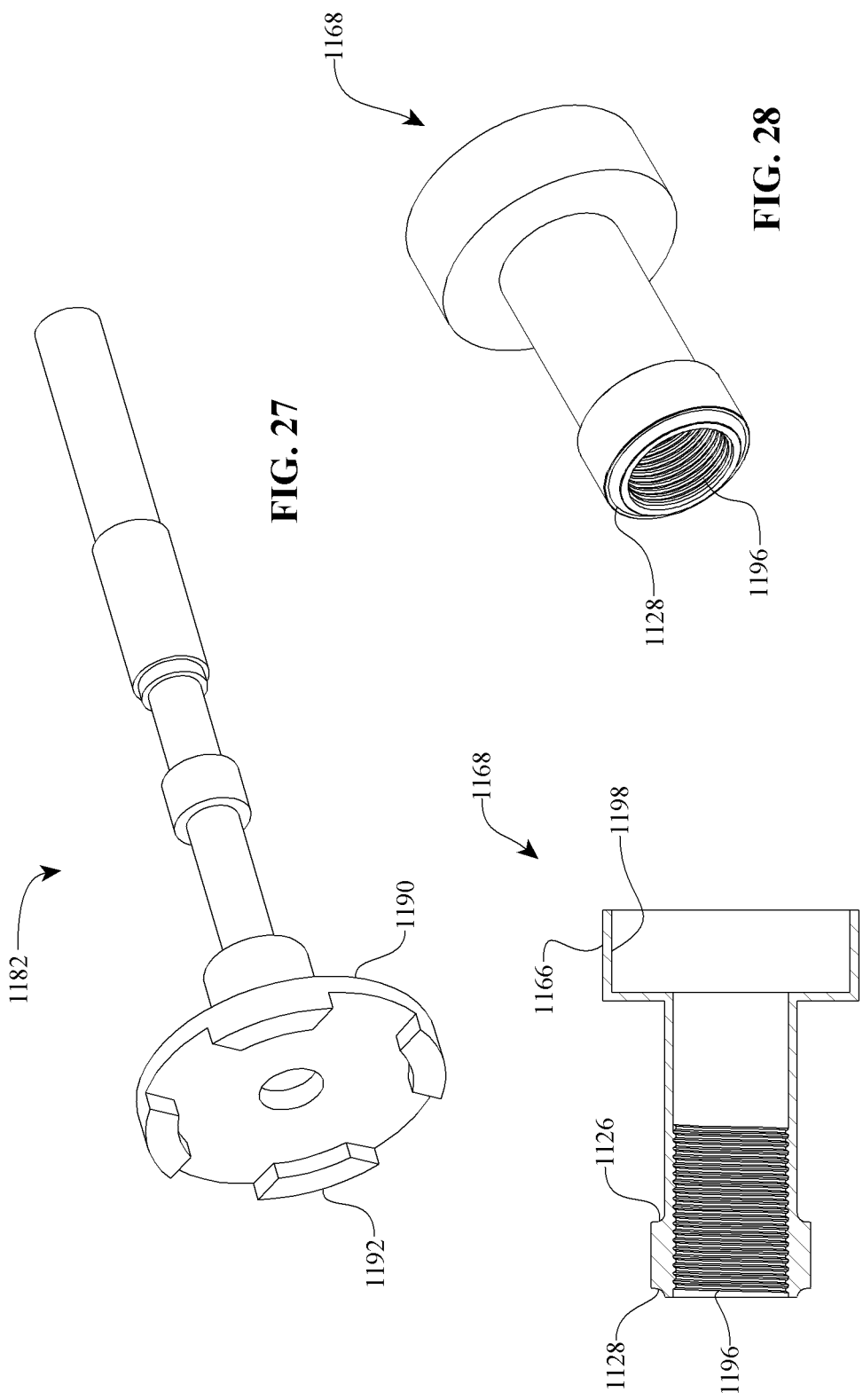

DETAIL D

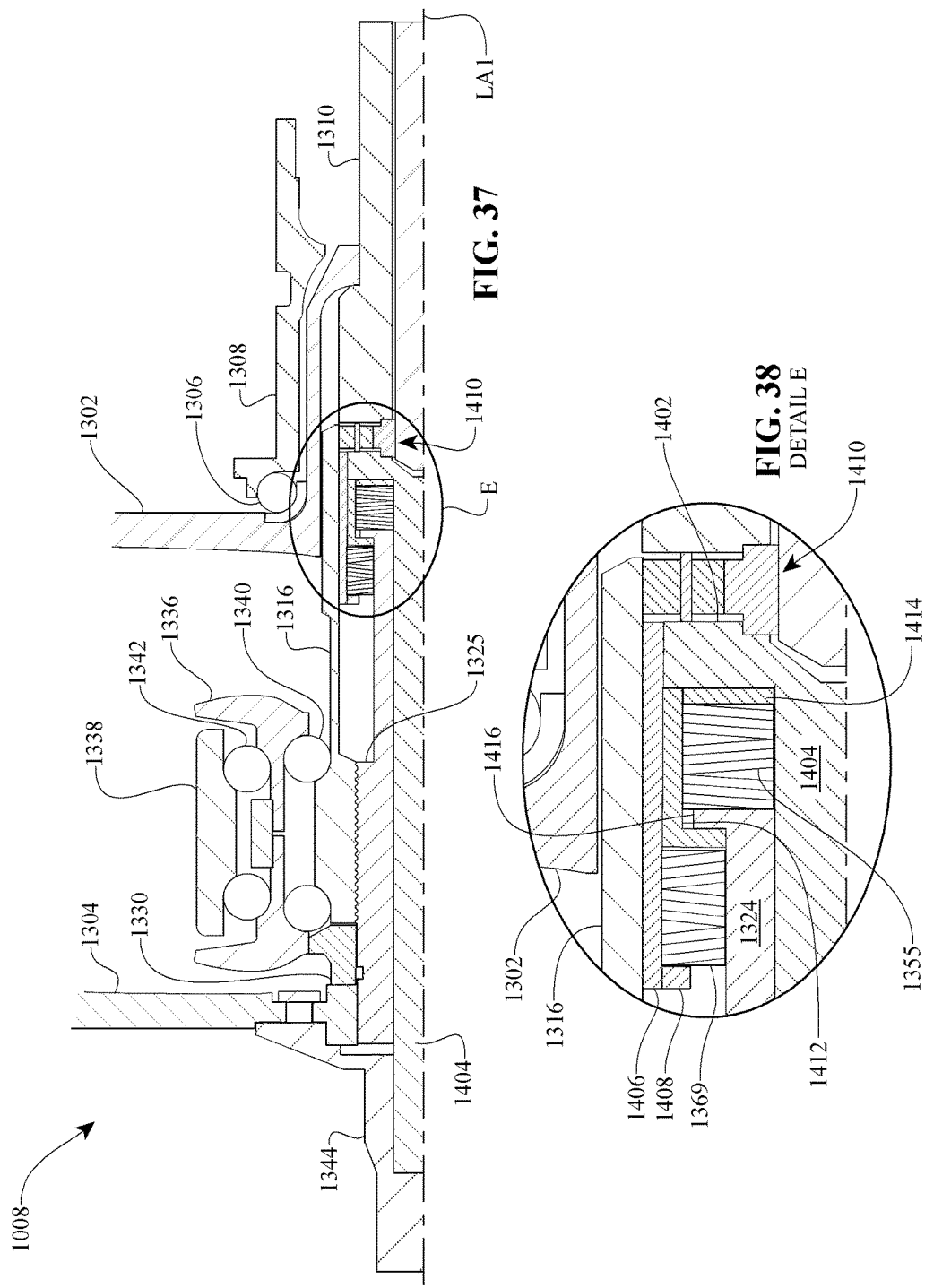

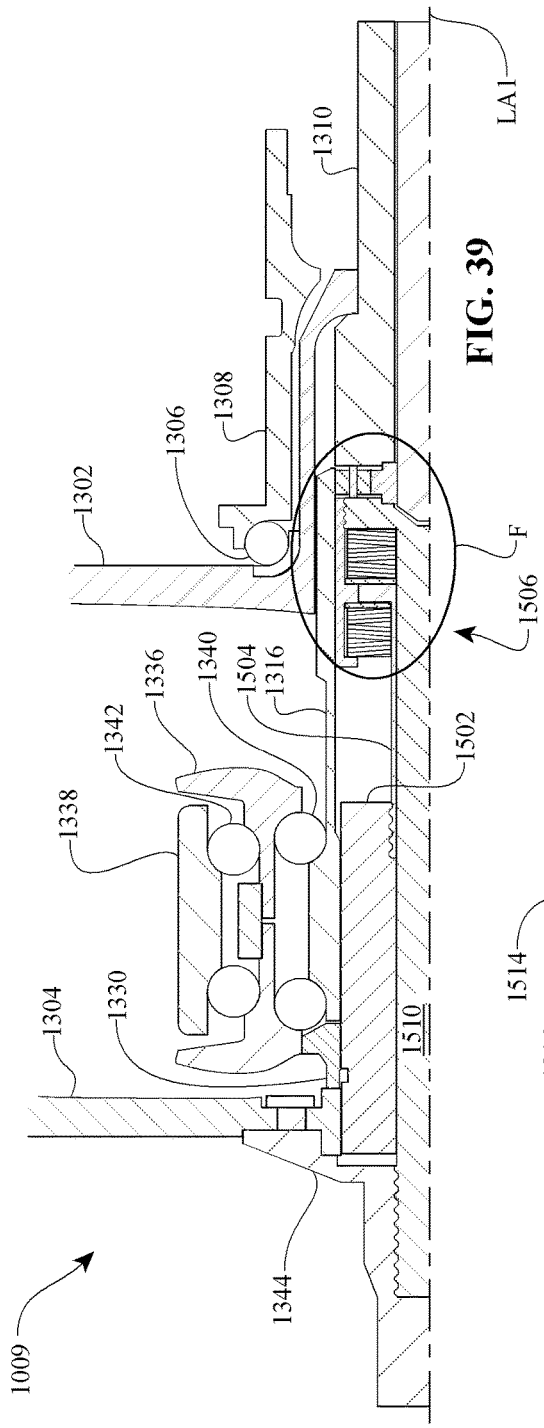
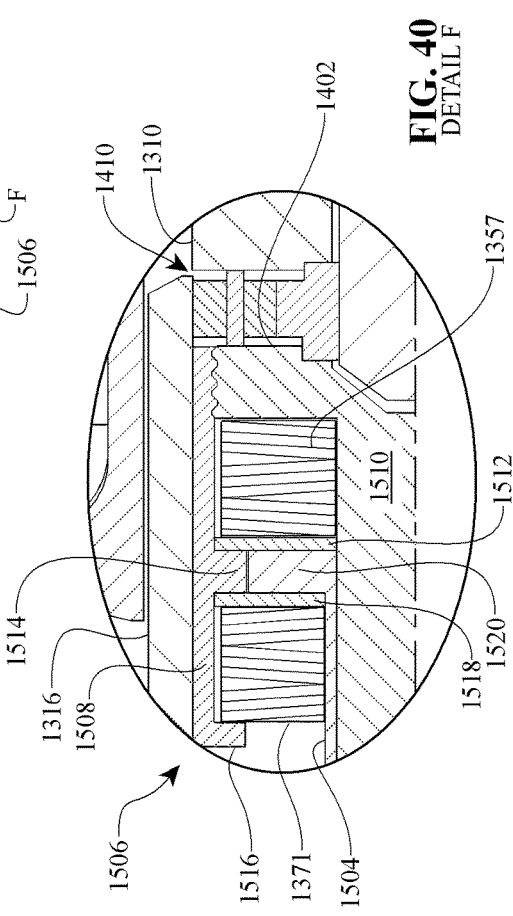
FIG. 39
FIG. 40
DETAIL F

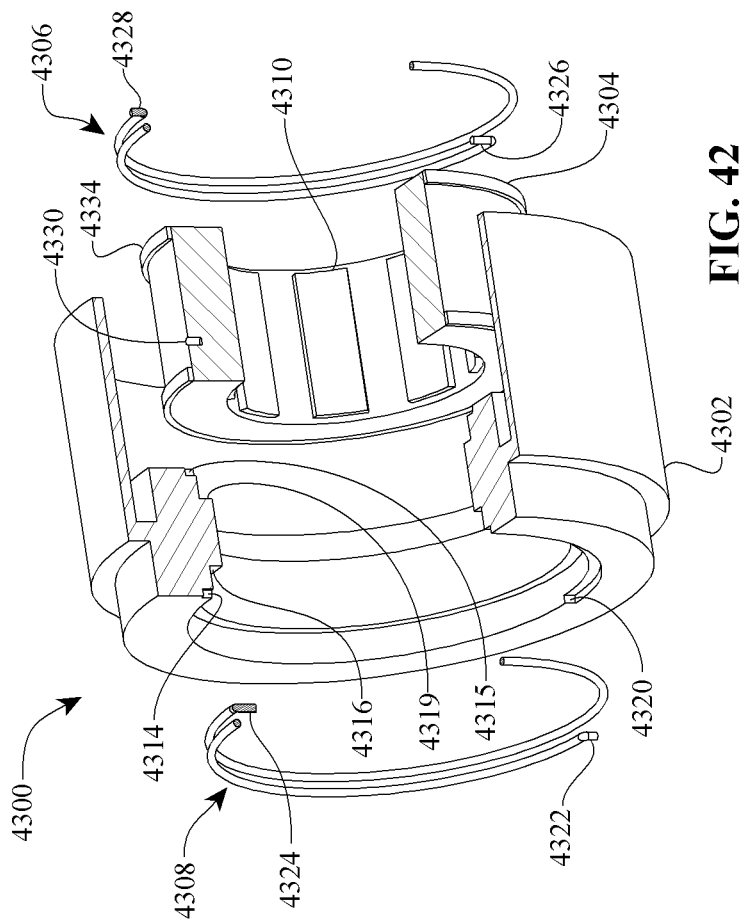
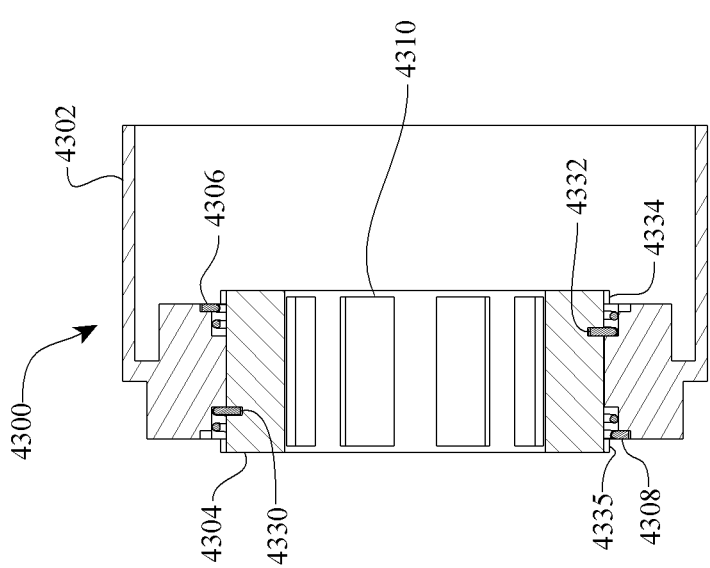

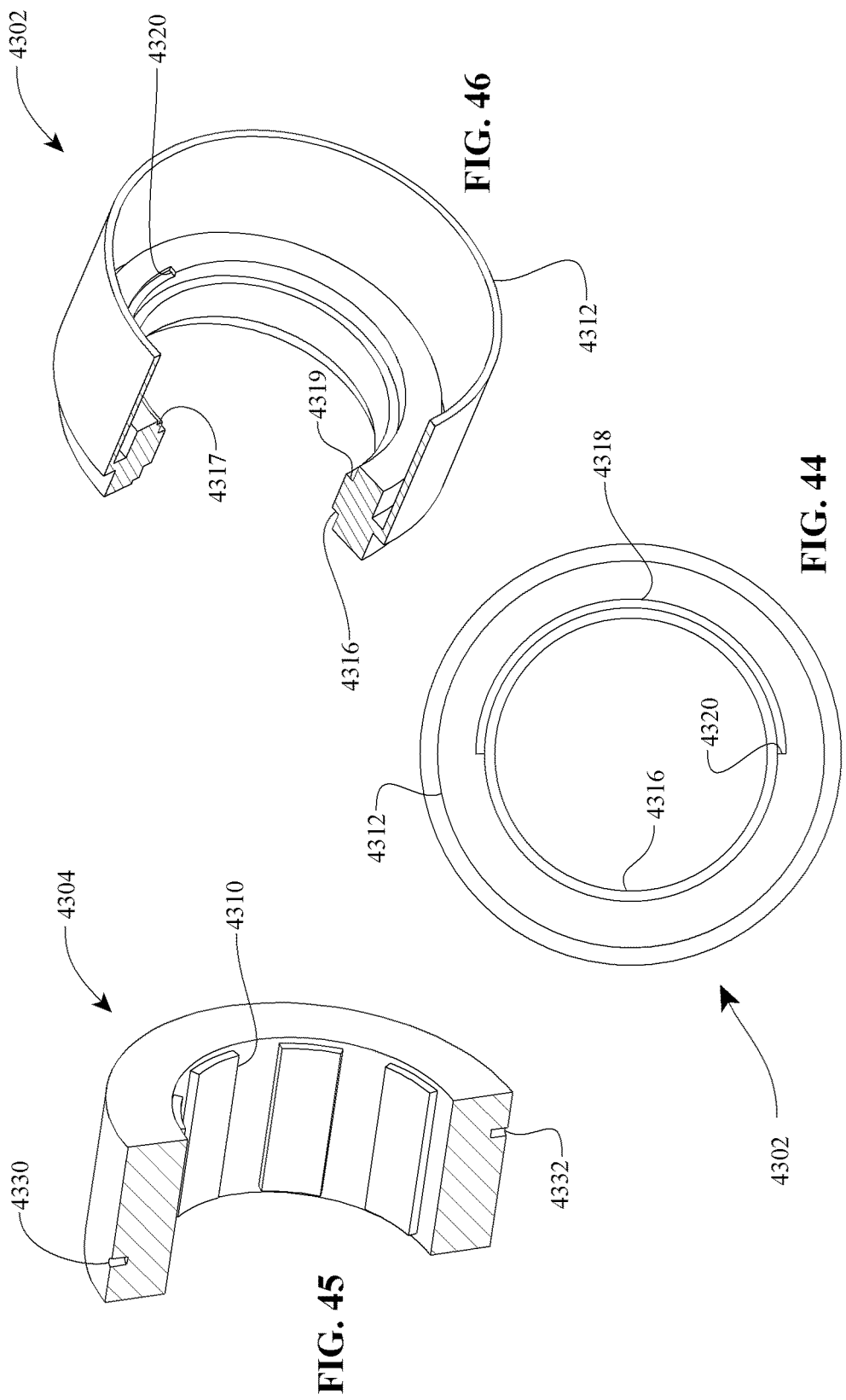

DETAIL G

DETAIL H

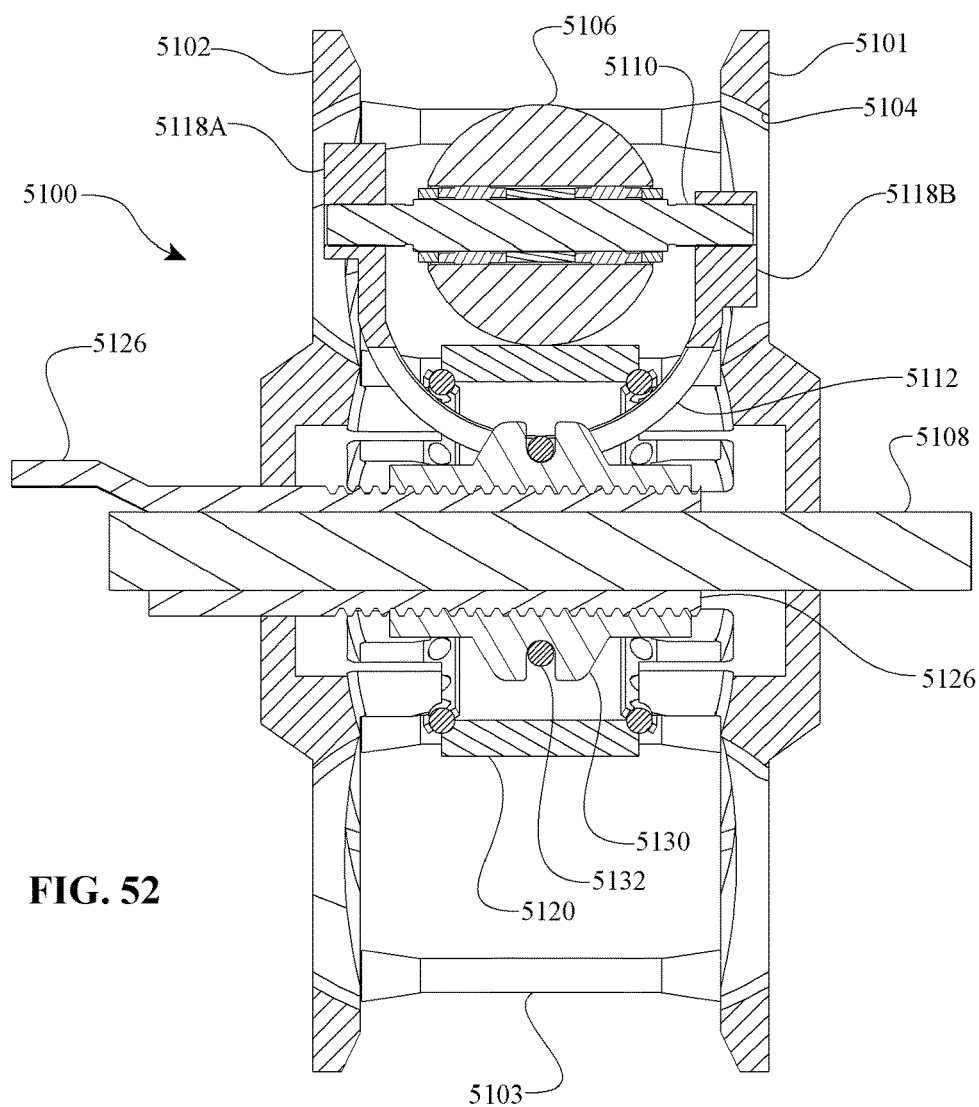
FIG. 52
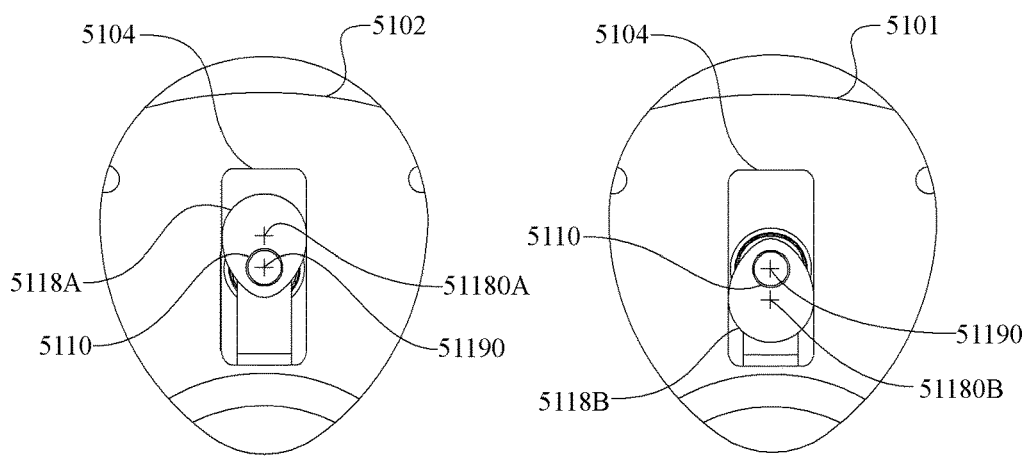
FIG. 53A
DETAIL I
FIG. 53B
DETAIL J

CONTINUOUSLY VARIABLE TRANSMISSION

CROSS-REFERENCE TO RELATED APPLICATIONS

This application is a continuation of U.S. application Ser. No. 14/550,702, filed Nov. 21, 2014 and scheduled to issue on Jan. 16, 2018 as U.S. Pat. No. 9,869,388, which is a continuation of U.S. application Ser. No. 13/963,274, filed Aug. 9, 2013 and issued as U.S. Pat. No. 8,900,085 on Dec. 2, 2014, which is a continuation of U.S. application Ser. No. 12/667,681, filed Jan. 4, 2010 and issued as U.S. Pat. No. 8,506,452 on Aug. 13, 2013, which is a national phase application of International Application No. PCT/US2008/068929, filed Jul. 1, 2008, which claims the benefit of U.S. Provisional Application No. 60/948,152, filed Jul. 5, 2007. The disclosures of all of the above-referenced prior applications, publications, and patents are considered part of the disclosure of this application, and are incorporated by reference herein in their entirety.

BACKGROUND OF THE INVENTION

Field of the Invention

The field of the invention relates generally to transmissions, and more particularly to methods, assemblies, and components for continuously variable transmissions (CVTs).

Description of the Related Art

There are well-known ways to achieve continuously variable ratios of input speed to output speed. Typically, a mechanism for adjusting the speed ratio of an output speed to an input speed in a CVT is known as a variator. In a belt-type CVT, the variator consists of two adjustable pulleys coupled by a belt. The variator in a single cavity toroidal-type CVT usually has two partially toroidal transmission discs rotating about a shaft and two or more disc-shaped power rollers rotating on respective axes that are perpendicular to the shaft and clamped between the input and output transmission discs. It is generally necessary to have a control system for the variator so that the desired speed ratio can be achieved in operation.

Embodiments of the variator disclosed herein include spherical-type variators utilizing spherical speed adjusters (also known as power adjusters, balls, planets, sphere gears or rollers) that each has a tiltable axis of rotation adapted to be adjusted to achieve a desired ratio of output speed to input speed during operation. The speed adjusters are angularly distributed in a plane perpendicular to a longitudinal axis of a CVT. The speed adjusters are contacted on one side by an input disc and on the other side by an output disc, one or both of which apply a clamping contact force to the rollers for transmission of torque. The input disc applies input torque at an input rotational speed to the speed adjusters. As the speed adjusters rotate about their own axes, the speed adjusters transmit the torque to the output disc. The output speed to input speed ratio is a function of the radii of the contact points of the input and output discs to the axes of the speed adjusters. Tilting the axes of the speed adjusters with respect to the axis of the variator adjusts the speed ratio.

There is a continuing need in the industry for variators and control systems therefor that provide improved performance and operational control. Embodiments of the systems and methods disclosed here address said need.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a method of controlling a transmission having a group of traction planets. The method includes the steps of providing each traction planet with a planet axle and imparting a skew angle to each planet axle. In one embodiment, the method can also include the step of tilting each planet axle.

Another aspect of the invention concerns a method of facilitating control of the speed ratio of a continuously variable transmission (CVT). The method can include the steps of providing a group of traction planets and providing each of the traction planets with a planet axle. Each traction planet can be configured to rotate about a respective planet axle. In one embodiment, the method includes providing a first carrier plate configured to engage a first end of each of the planet axles. The first carrier plate can be mounted along a longitudinal axis of the CVT. The method can include the step of providing a second carrier plate configured to engage a second end of each of the planet axles. The second carrier plate can be mounted coaxially with the first carrier plate. The method can also include the step of arranging the first carrier plate relative to the second carrier plate such that during operation of the CVT the first carrier plate can be rotated, about the longitudinal axis, relative to the second carrier plate.

Yet another aspect of the invention concerns a transmission having a set of traction planets arranged angularly about a longitudinal axis of the transmission. In one embodiment, the transmission has a set of planet axles. Each planet axle can be operably coupled to each traction planet. Each planet axle can define a tiltable axis of rotation for each traction planet. Each planet axle can be configured for angular displacement in first and second planes. The transmission can have a first carrier plate operably coupled to a first end of each planet axle. The first carrier plate can be mounted about the longitudinal axis. The transmission can also have a second carrier plate operably coupled to a second end of each planet axle. The second carrier plate can be mounted about the longitudinal axis. The first and second carrier plates are configured to rotate, about the longitudinal axis, relative to each other.

One aspect of the invention concerns a control system for a continuously variable transmission (CVT) having a set of traction planets with tiltable axes of rotation. The control system includes a control reference source configured to provide a control reference indicative of a desired operating condition of the CVT. In one embodiment, the control system also includes a skew dynamics module operably coupled to the control reference source. The skew dynamics module can be configured to determine an adjustment in the tiltable axes of rotation based at least in part on a skew angle value.

Another aspect of the invention concerns a method of controlling a continuously variable transmission (CVT) having a group of traction planets. Each traction planet having a planet axle about which the traction planet rotates. The method includes the steps of providing a control reference indicative of a desired operating condition of the CVT and determining a skew angle based at least in part on the desired operating condition of the CVT. In one embodiment, the method includes the step of applying the skew angle to each of the planet axles.

Yet one more aspect of the invention addresses a method of controlling a continuously variable transmission (CVT) having a group of traction planets with tiltable axes of rotation. The method includes the steps of providing a control reference indicative of a desired operating condition of the CVT and sensing a current operating condition of the CVT. In one embodiment, the method includes the step of comparing the desired operating condition with the current operating condition thereby generating a control error. The method also includes the step of imparting a skew angle to each of the tiltable axes. The skew angle is based at least in part on the control error.

In another aspect, the invention concerns a method of controlling a continuously variable transmission (CVT) having a group of traction planets arranged angularly about a longitudinal axis of the CVT, each traction planet mounted on a planet axle that defines a tiltable axis of rotation. The CVT can have a traction sun in contact with each of the traction planets. The traction sun can be configured to translate axially. The method includes the step of coupling the traction sun to a sun position locker. The sun position locker can be configured to retain the traction sun at an axial position. In one embodiment, the method includes the step of providing a skew angle coordinator that can be operably coupled to the traction planets and to the traction sun. The skew angle coordinator can be configured to adjust a tilt angle of the planet axles.

Another aspect of the invention relates to a control system for a transmission having a traction sun and a set of traction planets each having a tiltable axis of rotation. The control system has a control reference source configured to provide a control reference indicative of a desired operating condition of the transmission. In one embodiment, the control system has a feedback source configured to provide a feedback indicative of a current operating condition of the transmission. The control system can have a sun position locker operably coupled to the traction sun. The sun position locker can be configured to selectively hold an axial position of the traction sun. The control system can have a skew angle coordinator operably coupled to the traction planets. The control system can also have a decision process module configured to compare the control reference to the feedback. The decision process module can be configured to generate a signal based at least in part on the comparison. The signal is configured to be passed to the sun position locker and to the skew angle coordinator.

One aspect of the invention relates to a control system for a transmission having a traction sun and a group of traction planets operably coupled to a carrier plate and to the traction sun. The control system includes a control reference nut mounted coaxially with a longitudinal axis of the CVT. In one embodiment, the control system includes a feedback cam operably coupled to the control reference nut and to the traction sun. The feedback cam can be positioned coaxially with the control reference nut. The carrier plate is positioned coaxially with the feedback cam. The control system also includes a skew cam coupled to the feedback cam and to the carrier plate. The skew cam can be configured to rotate the carrier plate about the longitudinal axis.

Another aspect of the invention concerns a method for controlling a continuously variable transmission (CVT). The method includes the steps of providing a skew-based control system and operably coupling a neutralizer assembly to the skew-based control system. The neutralizer assembly can be configured to balance a group axial forces that are generated in the CVT during operation.

Yet another aspect of the invention involves a method of controlling a continuously variable transmission (CVT) having a traction sun and a group of traction planets each having a tiltable axis of rotation. The method includes the step of sensing an axial force imparted on the traction sun during operation of the CVT. In on embodiment, the method also includes the step of supplying a force of equal magnitude and of opposite direction of the axial force. The force can be configured to be operably applied to the traction sun.

One aspect of the invention concerns a neutralizer assembly for a continuously variable transmission having a skew-based control system. The neutralizer assembly can have a first resistance member configured to generate a force in a first axial direction. In one embodiment, the neutralizer assembly has a second resistance member configured to generate a force in a second axial direction. The neutralizer assembly can also have a translating resistance cap operably coupled to the skew-based control system. The translating resistance cap can be configured to separately engage each of the first and the second resistance members.

Another aspect of the invention relates to a feedback cam for a skew-based control system. The feedback cam has a generally elongated cylindrical body having a first end and a second end. In one embodiment, the feedback cam has a bearing race located on the first end. The feedback cam can have a threaded portion located on the first end. The feedback cam can also have a splined portion located on the second end.

Yet one more aspect of the invention addresses a skew cam for a continuously variable transmission (CVT) having a skew-based control system. The skew cam has a generally elongated cylindrical body having a first end and a second end. In one embodiment, the skew cam has a first threaded portion located in proximity to the first end. The skew cam can have a second threaded portion located in proximity to the second end. The first threaded portion has a lead that is smaller than a lead of the second threaded portion.

In another aspect, the invention concerns a carrier plate for a continuously variable transmission (CVT) having a skew-based control system and a group of traction planets. The carrier plate includes a generally cylindrical plate and a set of concave surfaces formed on a face of the cylindrical plate. The concave surfaces are adapted to operably couple to each of the traction planets. In one embodiment, the carrier plate includes a threaded central bore configured to operably couple to the skew-based control system. The carrier plate can also have a reaction face coaxial with the central bore. The reaction face can be configured to operably couple to the skew-based control system.

Another aspect of the invention relates to a leg assembly for a continuously variable transmission (CVT) having a skew-based control system. The leg assembly includes a leg having an elongated body with a first end and a second end. The leg has a first bore formed on the first end and a second bore formed in proximity to the first end. The second bore can have first and second clearance bores. The second bore can be substantially perpendicular to the first bore. The leg assembly can also include a shift guide roller axle operably coupled to the second bore. The shift guide roller axle can be adapted to pivot in the second bore.

One aspect of the invention relates to a leg for a continuously variable transmission (CVT) having a skew-based control system. The leg has an elongated body having a first end and a second end. In one embodiment, the leg has a first bore formed on the first end and a second bore formed in proximity to the first end. The second bore can have first and second clearance bores. The second bore can be substantially perpendicular to the first bore. The leg can also have a third clearance bore formed between the first and second clearance bores. The third clearance bore can be configured to provide a pivot location for a shift guide roller axle of the CVT.

Another aspect of the invention concerns a transmission having a longitudinal axis. In one embodiment, the transmission includes a traction sun that is coaxial with the longitudinal axis. The traction sun can be configured to translate axially. The transmission can have first and second carrier plates that are coaxial with the longitudinal axis. The traction sun is positioned between the first and second carrier plates. The transmission can have a planetary gear set operably coupled to a control reference input source. In one embodiment, the transmission has a feedback cam operably coupled to the planetary gear set and to the traction sun. The transmission can have a skew cam operably coupled to the planetary gear set and to the first carrier plate. The transmission can also have first and second resistance members operably coupled to the skew cam. The first carrier is configured to be rotatable with respect to the second carrier plate.

Yet another aspect of the invention involves a control reference assembly for a continuously variable transmission (CVT) having a skew-based control system. The control reference assembly includes a control reference nut. The control reference assembly can include first and second resistance members coupled to the control reference nut. In one embodiment, the control reference assembly includes an intermediate reaction member coupled to the first and second resistance members. The intermediate reaction member can be located coaxially with, and radially inward of, the control reference nut. A rotation of the control reference nut in a first direction energizes the first resistance member. A rotation of the control reference nut in a second direction energizes the second resistance member.

One aspect of the invention concerns a control reference assembly for a continuously variable transmission (CVT) having a skew-based control system. The control reference assembly has a control reference nut. The control reference assembly can have first and second resistance members coupled to the control reference nut. In one embodiment, the control reference assembly includes a pulley operably coupled to the control reference nut. The control reference assembly can have first and second cables each coupled to the control reference nut and to the pulley. The control reference assembly can also have a spring retention member coupled to the pulley and to the first and second resistance members. A rotation of the control reference nut in a first direction unwinds the first cable from the pulley. A rotation of the control reference nut in a second direction unwinds the second cable from the pulley.

Another aspect of the invention relates to a transmission having a carrier plate mounted coaxial with a longitudinal axis of the transmission. In one embodiment, the transmission includes a group of traction planets arranged angularly about the longitudinal axis. The transmission can include a planet axle operably coupled to each traction planet. The planet axle defines a tiltable axis of rotation. The transmission can include a planet support trunnion coupled to a respective planet axle. The planet support trunnion can have an eccentric skew cam configured to couple to the carrier plate. The transmission can also include a sleeve coupled to each planet support trunnion. The sleeve can be configured to axially translate. The sleeve can be configured to rotate. A rotation of the sleeve imparts a skew angle to each of the planet axles.

Yet one more aspect of the invention addresses a torque governor for a continuously variable transmission (CVT) having a set of traction planets with tiltable axes of rotation. The torque governor includes a carrier plate mounted coaxial with a longitudinal axis of the CVT. In one embodiment, the torque governor includes a shift cam operably coupled to the carrier plate. The shift cam can have a threaded extension. The torque governor includes a first reaction arm coupled to the shift cam. The first reaction arm can be operably coupled to the carrier plate. The first reaction arm is coaxial with the longitudinal axis. The torque governor also includes a second reaction arm operably coupled to the first reaction arm. The first and second reaction arms are configured to rotate the carrier plate during operation of the CVT.

In another aspect, the invention concerns a method of adjusting a speed ratio of a continuously variable transmission (CVT) having a group of traction planets configured angularly about a longitudinal axis of the CVT. Each traction planet is mounted on a planet axle that defines a tiltable axis of rotation for a respective traction planet. The method includes the step of imparting a skew angle to each planet axle.

Another aspect of the invention relates to a method of adjusting a speed ratio of a continuously variable transmission (CVT) having a group of traction planet configured angularly about a longitudinal axis of the CVT. Each traction planet has a tiltable axis of rotation. The method includes the step of imparting a skew angle to each tiltable axis of rotation.

BRIEF DESCRIPTION OF THE FIGURES

FIG. 1A is a schematic diagram of a ball planetary continuously variable transmission (CVT) and certain relevant coordinate systems.

FIG. 1B is a diagram of certain relative-coordinate systems related to a coordinate system shown in FIG. 1A.

FIG. 1C is a schematic diagram of certain kinematic relationships between certain contacting components of the CVT of FIG. 1A.

FIG. 8 is the second section, of the CVT illustrated, that compliments the section shown in FIG. 7.

FIG. 9 is a perspective view of a planet-leg assembly that can be used with the CVT of FIG. 6.

FIG. 10 is a cross-sectional view of the planet-leg assembly of FIG. 9.

FIG. 13 is a perspective view of a main axle that can be used with the CVT of FIG. 6.

FIG. 14 is a cross-sectional view of the main axle of FIG. 13.

FIG. 15 is a perspective view of a feedback cam that can be used with the CVT of FIG. 6.

FIG. 16 is a cross-sectional view of the feedback cam of FIG. 15.

FIG. 17 is perspective view of a skew cam that can be used with the CVT of FIG. 6.

FIG. 18 is a cross-sectional view of the skew cam of FIG. 17.

FIG. 27 is a perspective view of a main axle that can be used with the CVT of FIG. 24.

FIG. 28 is a perspective view of a feedback cam that can be used with the CVT of FIG. 24.

FIG. 29 is a cross-sectional view of the feedback cam of FIG. 28.

FIG. 37 is a cross-sectional view of certain components of another embodiment of a CVT having a skew-based control system and a neutralizer assembly.

FIG. 38 is a Detail E view of the CVT of FIG. 37.

FIG. 39 is a cross-sectional view of certain components of yet another embodiment of a CVT having a skew-based control system and a neutralizer assembly.

FIG. 40 is a Detail F view of the CVT of FIG. 39.

FIG. 42 is a partially cross-sectioned, exploded view of a control reference assembly that can be used with the CVT of FIG. 41.

FIG. 43 is a cross-sectional view of the control reference assembly of FIG. 42.

FIG. 44 is a plan view of a control reference nut that can be used with the control reference assembly of FIG. 43.

FIG. 45 is a cross-sectioned perspective view of an intermediate reaction member that can be used with the control reference assembly of FIG. 43.

FIG. 46 is a partially cross-sectioned perspective view of the control reference nut of FIG. 44.

FIG. 52 is a cross-sectional view of the CVT of FIG. 51A.

FIG. 53A is a Detail I view of the CVT of FIG. 51A.

FIG. 53B is a Detail J view of the CVT of FIG. 51A.

DETAILED DESCRIPTION OF CERTAIN INVENTIVE EMBODIMENTS

Figure 1D:
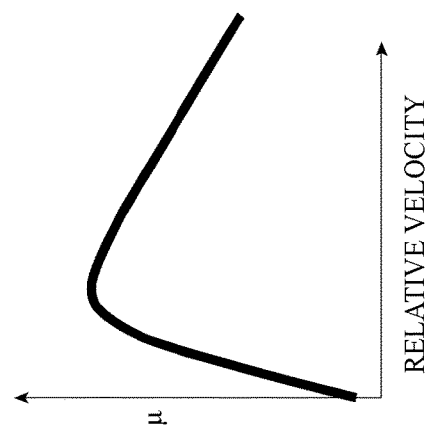
FIG. 1D is a representative chart of traction coefficient versus relative velocity for a typical traction fluid and rolling contact between CVT traction components.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several novel features, no single one of which is solely responsible for its desirable attributes or which is essential to practicing the inventions described. Certain CVT embodiments described here are generally related to the type disclosed in U.S. Pat. Nos. 6,241,636; 6,419,608; 6,689,012; 7,011,600; 7,166,052; U.S. patent application Ser. Nos. 11/243,484 and 11/543,311; and Patent Cooperation Treaty patent application PCT/IB2006/054911 filed Dec. 18, 2006. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis of a transmission or variator. The term "axial" as used here refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient ($\mu$) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

Embodiments of the invention disclosed here are related to the control of a variator and/or a CVT using generally spherical planets each having a tiltable axis of rotation that can be adjusted to achieve a desired ratio of input speed to output speed during operation. In some embodiments, adjustment of said axis of rotation involves angular misalignment of the planet axis in one plane in order to achieve an angular adjustment of the planet axis in a second plane, thereby adjusting the speed ratio of the variator. The angular misalignment in the first plane is referred to here as "skew" or "skew angle". In one embodiment, a control system coordinates the use of a skew angle to generate forces between certain contacting components in the variator that will tilt the planet axis of rotation. The tilting of the planet axis of rotation adjusts the speed ratio of the variator. In the description that follows, a coordinate system is established with respect to the traction planet, followed by a discussion of certain kinematic relationships between contacting components that generate forces which tend to cause the planet axis to tilt in the presence of a skew angle. Embodiments of skew control systems for attaining a desired speed ratio of a variator will be discussed.

Turning now to FIGS. 1A and 1B, coordinate systems will be defined in reference to embodiments of certain components of a continuously variable transmission (CVT). The coordinate systems are shown here for illustrative purposes and should not be construed as the only frame of reference applicable to the embodiments discussed here. An embodiment of a CVT 100 includes generally spherical traction planets 108 in contact with a traction sun 110. The traction planets 108 are also in contact with a first traction ring 102 and a second traction ring 104 at, respectively, a first angular position 112 and a second angular position 114. A global coordinate system 150 (that is, $x_g$, $y_g$, $z_g$) and a planet-centered coordinate system 160 (that is, x, y, z) are defined in FIG. 1A. The global coordinate system 150 is generally oriented with respect to a longitudinal axis or main drive axis 152 of the CVT 100, for example with the $z_g$-axis coinciding with the main drive axis 152 about which the traction planets 108 are arranged. The planet-centered coordinate system 160 has its origin at the geometric center of the traction planet 108 with the y-axis generally bisecting the angle formed between the traction rings 102, 104 and the z-axis generally parallel to the main drive axis 152. Each of the traction planets 108 has an axis of rotation, that is, a planet axis 106, which can be configured to tilt in the y-z plane to thereby form a tilt angle 118 (sometimes referred to here as $\gamma$). The tilt angle 118 determines the kinematic speed ratio between the traction rings 102, 104. Each of the planets 108 has a rotational velocity about the planet axis 106 and is shown in FIG. 1A as planet velocity 122, sometimes referred to here as $\omega$. Typically the planet axis 106 corresponds to a planet axle, which is operationally coupled to a carrier or a cage (not shown) that can be stationary, while in other embodiments the planet axle is coupled to a carrier (not shown) that is rotatable about main drive axis 152. In the planet-centered coordinate system 160, the x-axis is directed into the plane of the page and the z-axis is generally parallel to the main drive axis 152, consequently the tilt angle 118 is generally coplanar with the main drive axis 152.

Turning now to FIG. 1B, the planet-centered coordinate system 160 is resolved further to illustrate the angular adjustments of the planet axis 106 that are used in the embodiments of skew control systems described here. As shown in FIG. 1B, a tilt angle 118 can be derived by rotating the coordinate system 160 with the planet axis 106 in the y-z plane about the x-axis to achieve a first relative coordinate system 170 (x', y', z'). In the relative coordinate system 170, the planet axis 106 coincides with the z'-axis. By rotating the coordinate system 170 with the planet axis 106 about the y'-axis, a skew angle 120 (sometimes referred to here as $\zeta$) can be obtained in a x'-z' plane, which is defined in a second relative coordinate system 180 (x", y", z"). The skew angle 120 can be considered, approximately, the projection in the x-z plane of the angular alignment of the planet axis 106. More specifically, however, the skew angle 120 is the angular position of the planet axis 106 in the x'-z' plane as defined by the relative coordinate systems 170 and 180. The skew angle 120 is generally not coplanar with the main drive axis 152. In some embodiments of the CVT 100, the tilt angle 118 can be adjusted directly to adjust the speed ratio. In one embodiment of the CVT 100, the tilt angle 118 is controlled, at least in part, through an adjustment of the skew angle 120.

Referring now to FIG. 1C, certain kinematic relationships between contacting components of the CVT 100 will be described to explain how the inducement of a skew condition generates forces that tend to adjust the tilt angle 118. As used here, the phrase "skew condition" refers to an arrangement of the planet axis 106 relative to the main drive axis 152 such that a non-zero skew angle 120 exists. Hence, reference to "inducement of a skew condition" implies an inducement of the planet axis 106 to align at a non-zero skew angle 120. It should be noted that in certain embodiments of the CVT 100 certain spin-induced forces also act on the traction plane 108. Spin is a phenomenon of traction contacts well known to those of ordinary skill in the relevant technology. For our immediate discussion, the effects of the spin-induced forces will be ignored. However, later on, embodiments of CVTs will be disclosed that take into account the effects of spin-induced forces upon the traction planet 108 and components operationally coupled to the traction planet 108. In the CVT 100, components contact the traction planet 108 at three locations to form traction or friction contact areas. The first ring 102 drives the planet 108 at a contact 1, and the planet 108 transmits power to the second ring 104 at a contact 2. The traction sun 110 supports the traction planet 108 at a contact 3. For discussion purposes, the three contacts 1, 2, 3 are arranged in FIG. 1C to reflect a view of the x"-z" plane as seen from a reference above the CVT 100, or View A in FIG. 1A. Since the contact areas 1, 2, 3 are not coplanar, contact-centered coordinate systems are used in FIG. 1C so that the contact areas 1, 2, 3 can be illustrated with the x"-z" plane. Subscripts 1, 2, and 3 are used to denote the specific contact area for contact-centered coordinate systems. The $z_{1,2,3}$-axis are directed at the center of the traction planet 108.

Referring now to contact area 1 in FIG. 1C, the surface velocity of the first traction ring 102 is denoted in the negative $x_1$ direction by a vector $V_{r1}$ and the surface velocity of the planet 108 is represented by a vector $V_{p1}$; the angle formed between the vectors $V_{r1}$ and $V_{p1}$ is the skew angle 120. The resulting relative surface velocity between the traction ring 102 and the traction planet 108 is represented by a vector $V_{r1/p}$. At the contact area 3 between the traction planet 108 and the traction sun 110, the surface velocity of the traction sun 110 is represented by a vector $V_{sv}$ and the surface velocity of the traction planet 108 is represented by a vector $V_{ps}$; the angle formed between $V_{sv}$ and $V_{ps}$ is the skew angle 120. The relative surface velocity between the traction planet 108 and the traction sun 110 is represented by a vector $V_{sv/p}$. Similarly, for contact 2, the surface velocity of the traction planet 108 at the contact area 2 is shown as a vector $V_{p2}$ and the surface velocity of the second traction ring 104 is represented by a vector $V_{r2}$; the angle formed between $V_{p2}$ and $V_{r2}$ is the skew angle 120; the relative surface velocity between the traction planet 108 and the second traction ring 104 is the resultant vector $V_{r2/p}$.

Figure 1E:
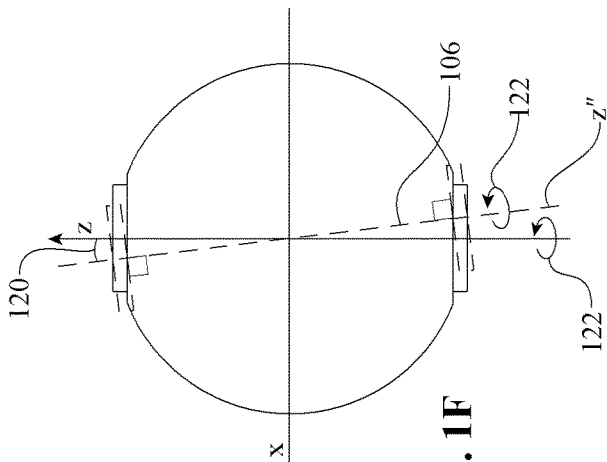
FIG. 1E is a free body diagram of a traction planet of the CVT of FIG. 1A.

The kinematic relationships discussed above tend to generate forces at the contacting components. FIG. 1D shows a generalized, representative traction curve that can be applied at each of contact areas 1, 2, 3. The graph illustrates the relationship between the traction coefficient μ and the relative velocity between contacting components. The traction coefficient μ is indicative of the capacity of the fluid to transmit a force. The relative velocity, such as $V_{r1/p}$, can be a function of the skew angle 120. The traction coefficient μ is the vector sum of the traction coefficient in the x-direction $\mu_x$ and the traction coefficient in the y-direction $\mu_y$ at a contact area 1, 2, or 3. As a general matter, the traction coefficient μ is a function of the traction fluid properties, the normal force at the contact area, and the velocity of the traction fluid in the contact area, among other things. For a given traction fluid, the traction coefficient μ increases with increasing relative velocities of components, until the traction coefficient μ reaches a maximum capacity after which the traction coefficient μ decays. Consequently, in the presence of a skew angle 120 (that is, under a skew condition), forces are generated at the contact areas 1, 2, 3 around the traction planet 108 due to the kinematic conditions. Referring to FIGS. 1C and 1E, $V_{r1/p}$ generates a force $F_{s1}$ parallel to the $V_{r1/p}$. Increasing the skew angle 120 increases the $V_{r1/p}$ and, thereby, increases the force $F_{s1}$ according to the general relationship shown in FIG. 1D. The $V_{sv/p}$ generates a force $F_{ss}$, and similarly, the $V_{r2/p}$ generates a force $F_{s2}$. The forces $F_{s1}$, $F_{ss}$, and $F_{s2}$ combine to create a net moment about the traction roller 108 in the y-z plane. More specifically, the summation of moments about the traction roller 108 is $\Sigma M = R*(F_{s1}+F_{s2}+F_{ss})$, where R is the radius of the traction roller 108, and the forces $F_{s1}$, $F_{s2}$, and $F_{ss}$ are the resultant components of the contact forces in the y-z plane. The contact forces, some times referred to here as skew-induced forces, in the above equation are as follows: $F_{s1}=\mu_{y1}N_1$, $F_{s2}=\mu_{y2}N_2$, $F_{ss}=\mu_{ys}N_3$, where $N_{1,2,3}$ is the normal force at the respective contact area 1, 2, 3. Since the traction coefficient μ is a function of relative velocity between contacting components, the traction coefficients $\mu_{y1}$, $\mu_{y2}$, and $\mu_{ys}$ are consequently a function of the skew angle 120 as related by the kinematic relationship. By definition, a moment is the acceleration of inertia; hence, in the embodiment illustrated here, the moment will generate a tilt angle acceleration γ". Therefore, the rate of change of the tilt angle γ' is a function of the skew angle 120.

As already mentioned, spin-induced forces can be generated at the contacting areas. The spin-induced forces tend to resist the skew-induced forces. During operation of a CVT, the spin-induced forces and the skew-induced forces can be reacted axially through the traction sun 110, and are sometimes referred to here as axial forces or side forces. Embodiments of the CVT 100 can be configured such that the planet axis 106 tilts when the skew-induced forces are larger than the spin-induced forces. In one embodiment of a CVT, under a steady state operating condition, the skew-induced forces and the spin-induced forces can balance each other, resulting in the CVT operating under a skew condition. To operate the CVT under a substantially zero skew angle, therefore, it is preferable to provide an auxiliary side force reaction acting on the traction sun 110; that is, in some embodiments of the CVT, the axial position of the traction sun 110 is constrained axially by a mechanism other than the skew-induced forces.

Figure 1F:
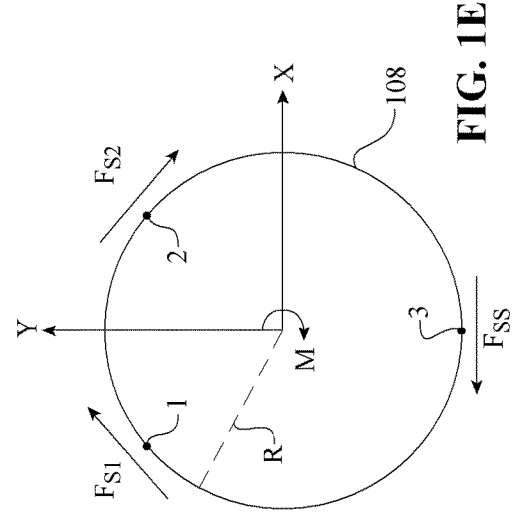
FIG. 1F is a schematic diagram of a traction planet of the CVT of FIG. 1A showing a skew angle.

Turning now to FIG. 1F, a traction planet 108 is illustrated having a tilt angle 118 equal to zero, which results in the planet axis 106 being generally coplanar to the main drive axis 152 of the CVT 100 and the rotational velocity 122 of the traction planet 108 is coaxial with the z-axis. A skew angle 120 can be formed in the x-z plane to generate forces for motivating a change in the tilt angle 118. In the presence of the skew angle 120, the traction planet 108 would have a rotational velocity 122 about an axis z", and the tilt angle 118 would be formed in the y-z' plane.

Figure 2:
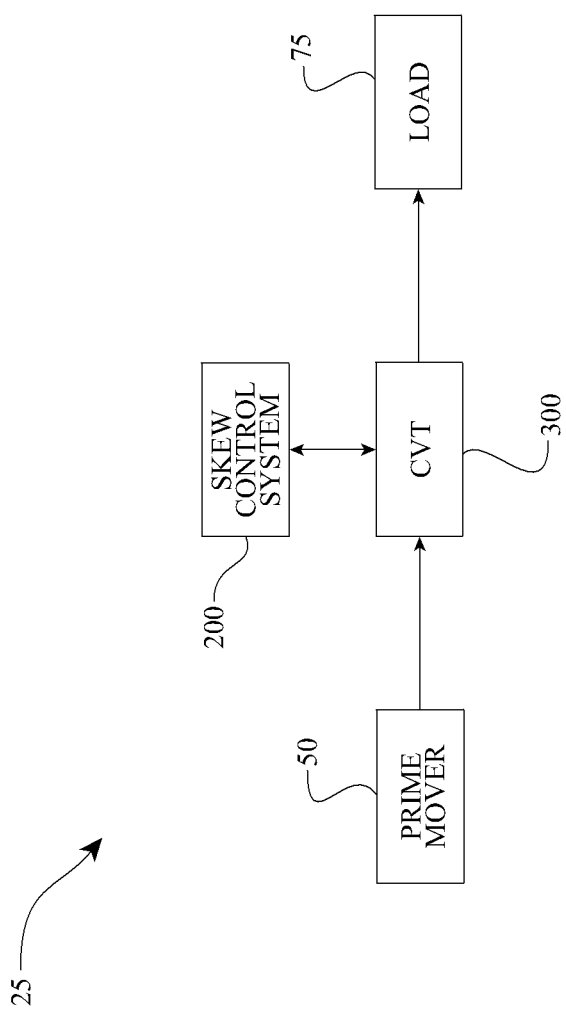
FIG. 2 is a block diagram of an embodiment of a drive apparatus configured to use certain inventive embodiments of CVTs and skew control systems and methods therefor disclosed here.

Passing now to FIGS. 2-5B, embodiments of certain control systems for a CVT that rely on inducing a skew condition to motivate a change in the tilt angle 118 will be described now. FIG. 2 shows a drive 25 that includes a CVT 300 operationally coupled between a prime mover 50 and a load 75. The drive 25 can also include a skew-based control system 200. Typically, the prime mover 50 delivers power to the CVT 300, and the CVT 300 delivers power to a load 75. The prime mover 50 can be one or more of various power generating devices, and the load 75 can be one or more of various driven devices or components. Examples of the prime mover 50 include, but are not limited to, human power, engines, motors and the like. Examples of loads include, but are not limited to, drivetrain differential assemblies, power take-off assemblies, generator assemblies, pump assemblies, and the like. In some embodiments, the skew control system 200 can coordinate the operation of the CVT 300 as well as the prime mover 50, or can coordinate the operation of the CVT 300 and the load 75, or can coordinate the operation of all elements in the drive apparatus 25. In the embodiment illustrated in FIG. 2, the skew control system 200 can be configured to use an adjustment of a skew angle 120 to control the operating condition of the CVT 300, and consequently, coordinate the control of the drive 25.

Figure 3:
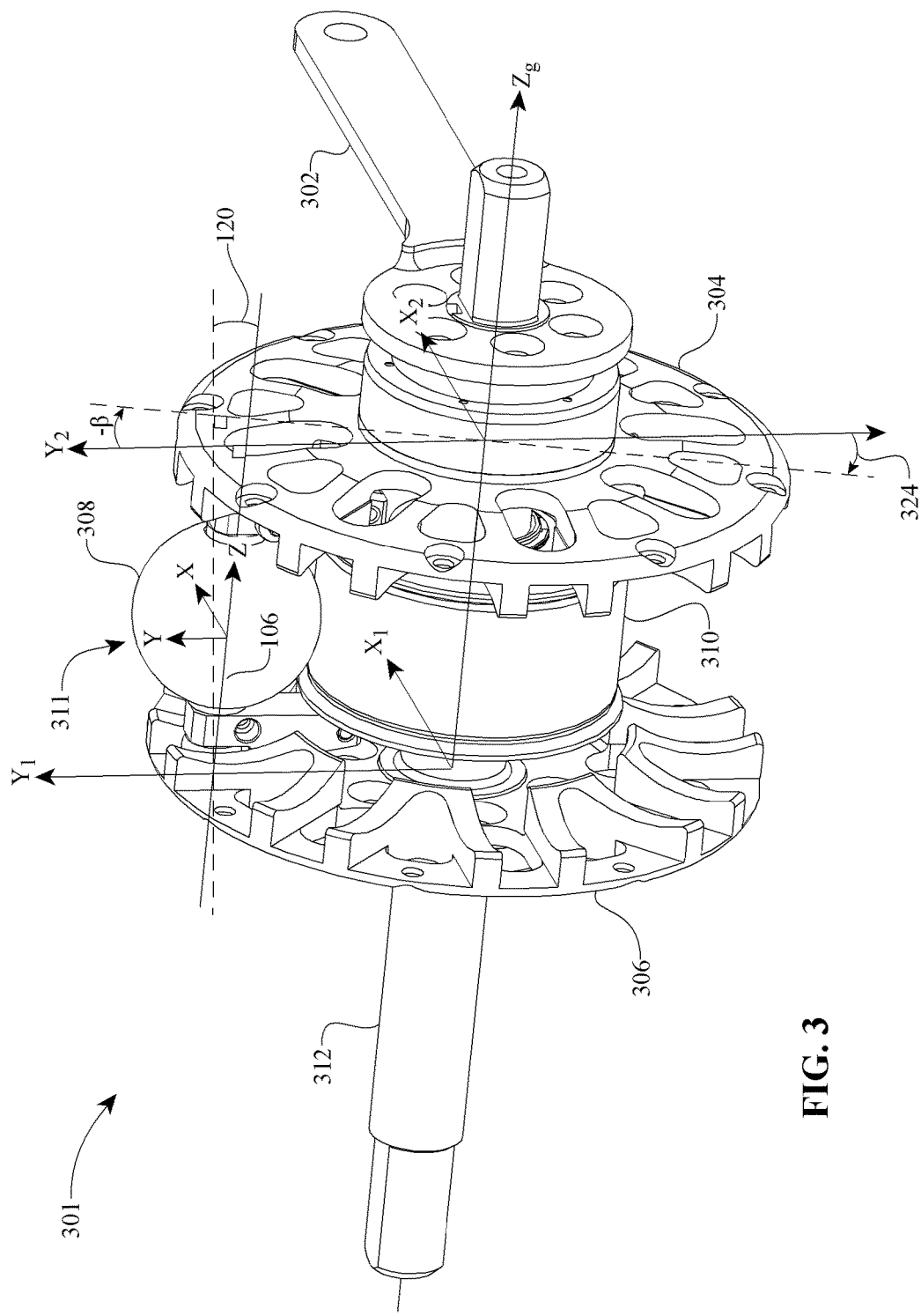
FIG. 3 is a perspective view of certain components of a CVT configured to employ a skew angle adjustment to cause a tilt in the axis of rotation of traction planets.

Turning to FIG. 3, an embodiment of a CVT 301 will be described now. For clarity and conciseness of description, only certain components of a variator or CVT are shown. In the embodiment illustrated, a skew lever 302 can be operationally connected to carrier plate 304 in such a manner that a rotation of the skew lever 302 causes a rotation of the carrier plate 304 with respect to a main axle 312. A second carrier plate 306 is rigidly coupled to the main axle 312. A traction planet assembly 311 and a traction sun assembly 310 are arranged to operate between the two carrier plates 304 and 306. One end of the planet axis 106 is operably coupled to the carrier plate 304, and the other end of planet axle 106 is operably coupled to the carrier plate 306. The planet-centered coordinate system 160 is shown in the planet assembly 308 in FIG. 3 for reference. An angular rotation of the skew lever 302 causes a rotation of the carrier plate 304 to a carrier plate angle 324 (sometimes referred to as carrier plate angle β. Since the planet axis 106 is constrained by the carrier plates 304 and 306, the planet axis 106 will adjust to a position that is no longer coplanar with the axis of the main axle 312; resulting in the inducement of a skew condition.

For some applications, a linear relation between an axial translation of the traction sun 310 and the tilt angle 118 can be expressed as follows. Axial translation of the traction sun 310 is the mathematical product of the radius of the traction planets 308, the tilt angle 18 and a RSF (that is, axial translation of the traction sun 310=planet radius * tilt angle 118 * RSF), where RSF is a roll-slide factor. RSF describes the transverse creep rate between the traction planet 308 and the traction sun 310. As used here, "creep" is the discrete local motion of a body relative to another and is exemplified by the relative velocities of rolling contact components as previously discussed. In traction drives, the transfer of power from a driving element to a driven element via a traction interface requires creep. Usually, creep in the direction of power transfer is referred to as "creep in the rolling direction." Sometimes the driving and driven elements experience creep in a direction orthogonal to the power transfer direction, in such a case this component of creep is referred to as "transverse creep." During operation of the CVT 301, the traction planet 308 and the traction sun 310 roll on each other. When the traction sun 310 is translated axially (that is, orthogonal to the rolling direction), transverse creep is imposed between the traction sun 310 and the traction planet 308. An RSF equal to 1.0 indicates pure rolling. At RSF values less than 1.0, the traction sun 310 translates slower than the traction planet 308 rotates. At RSF values greater than 1.0, the traction sun 310 translates faster than the traction planet 308 rotates.

Figure 4:
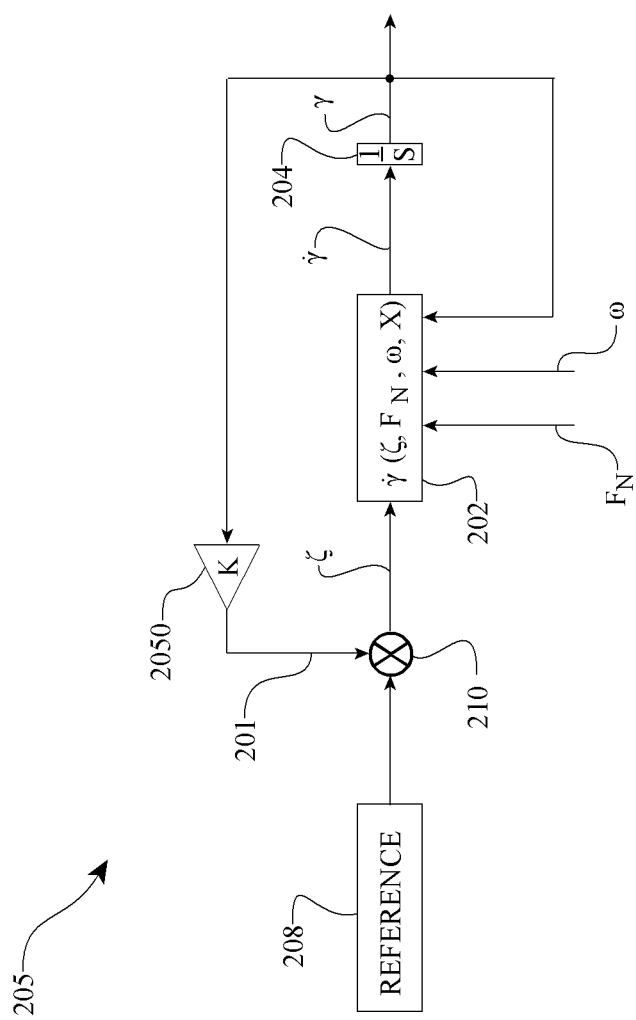
FIG. 4 is a block diagram of an embodiment of a skew control system that can be used in, for example, the drive apparatus of FIG. 2.

Turning now to FIG. 4, an embodiment of a skew-based control system 205 that can be used with the drive 25 will be described now. In one embodiment, the skew-based control system 205 can include a skew dynamics module 202, which can be defined by a transfer function, for example. The skew dynamics module 202 abides by the kinematic relationships described previously between a skew angle 120 and the generation of forces that tend to motivate an adjustment in the tilt angle 118. In some embodiments, the operating condition of the CVT 300, or substantially equivalent embodiments, can be used as input for the skew dynamics module 202 and can be generally represented by the normal force (that is, $F_N$) at the contact areas and the rotational velocity ω of the traction planet 308. A control reference 208 can be a desired skew angle 120, for example. The control reference 208 is compared to a feedback value 201 at the summing junction 210. The feedback value 201 is indicative of an actual skew angle under the current operating conditions. The resulting skew angle ζ is provided to the skew dynamics module 202, which returns a rate of change in the tilt angle γ'; integration of γ' with integrator 204 returns a tilt angle γ. In one embodiment, the tilt angle γ is further processed by a gain (K) 2050 to provide feedback to the summing junction 210. In some embodiments, the control reference 208 can be a position reference of the traction sun 110, a desired tilt angle γ, or any other parameter relevant to the operation of the CVT 300, such as a speed ratio or a torque ratio. In certain embodiments, the control reference 208 can be converted where appropriate to provide a reference skew angle $ζ_R$.

Figure 5A:
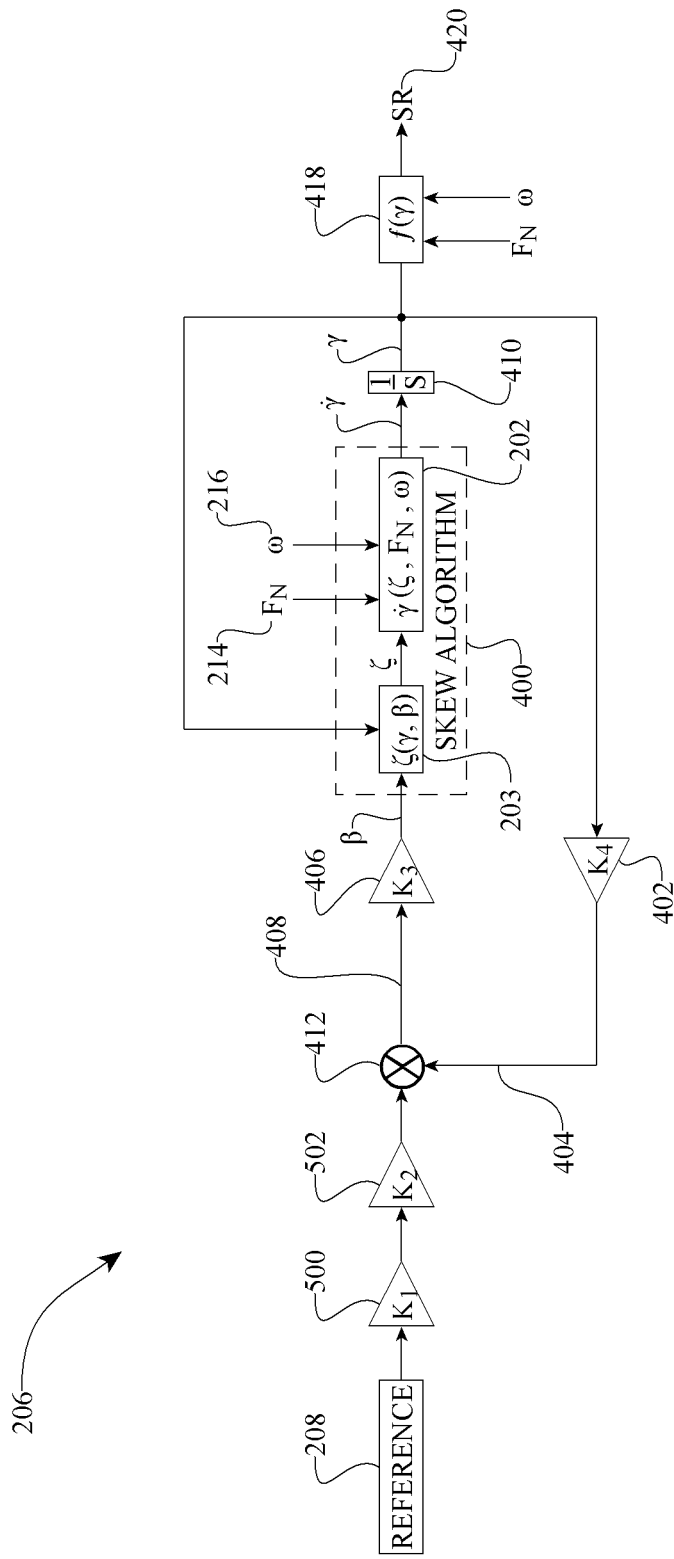
FIG. 5A is a schematic diagram of another embodiment of a skew control system that can be used with, for example, the drive apparatus of FIG. 2.

Referring to FIG. 5A, an embodiment of a skew control system 206 will be described now. The control reference 208 can be an angular position reference such as a rotation of a shift nut or a reference dial, which is coupled to a planetary gear set having a ratio ($K_1$) 500. An angular position of a planetary gear set can be transformed into an axial translation of a reference element by using, for example, a screw lead ($K_2$) 502, and can be compared to an axial position of a traction sun 110 (again, for example) to derive a control error 408. In some embodiments, an axial position, such as the axial position of a shift rod (not shown), can be used as the control reference 208. In the embodiment shown in FIG. 5A, the control reference 208 is compared to a feedback 404, which in this case is the axial position of the traction sun 110, at the summing junction 412 to derive the control error 408. It is preferable to convert the physical units of the control reference 208 and the feedback 404 so that the two parameters have the same units prior to the summing junction 412 for arithmetic consistency. A gain ($K_3$) 406 can be applied to convert the control error 408 into a carrier plate angle β, such as the carrier plate angle 324 shown in FIG. 3, for example. In some embodiments, the gain 406 can be a screw lead. The carrier plate angle β can be actuated by a skew lever 302 as shown in FIG. 3, for example.

In this embodiment, a skew algorithm 400 includes a function 203 coupled to the skew dynamics module 202. The function 203 is configured to convert the carrier plate angle β into a skew angle ζ. The skew algorithm 400 receives the carrier plate angle β as input and returns a rate of change in tilt angle γ'. In one embodiment, an integrator 410 can be applied to the result of the skew dynamics module 202 to derive a tilt angle γ, which determines a speed ratio of a CVT. A speed ratio (SR) 420 can be derived from γ by a function 418 having as inputs the normal force $F_N$ and the rotational speed of the traction planet 108. The tilt angle γ can also be transformed into a feedback 404 by applying a gain (K4) 402. In some embodiments, the gain 402 is equal to the planet radius multiplied by the RSF (that is, $K_4=R*RSF$). In one embodiment, the skew algorithm 400 is a transfer function based on the specific operating conditions of a CVT. In some applications, the skew algorithm 400 can take the form of a look up table that can be created by empirically determining γ' for a given carrier plate angle β and operating conditions of a CVT. For example, tests can be performed on a specific CVT where the input operating condition is held at discrete speeds and loads appropriate for the intended application, while discrete steps in the carrier plate angle β can be applied to the system so that the speed ratio change of the CVT can be measured and used to calculate the resultant γ'. The resultant data characterizes the dynamic response of the system and can be formulated into a look-up table or function used for the skew algorithm 400.

Figure 5B:
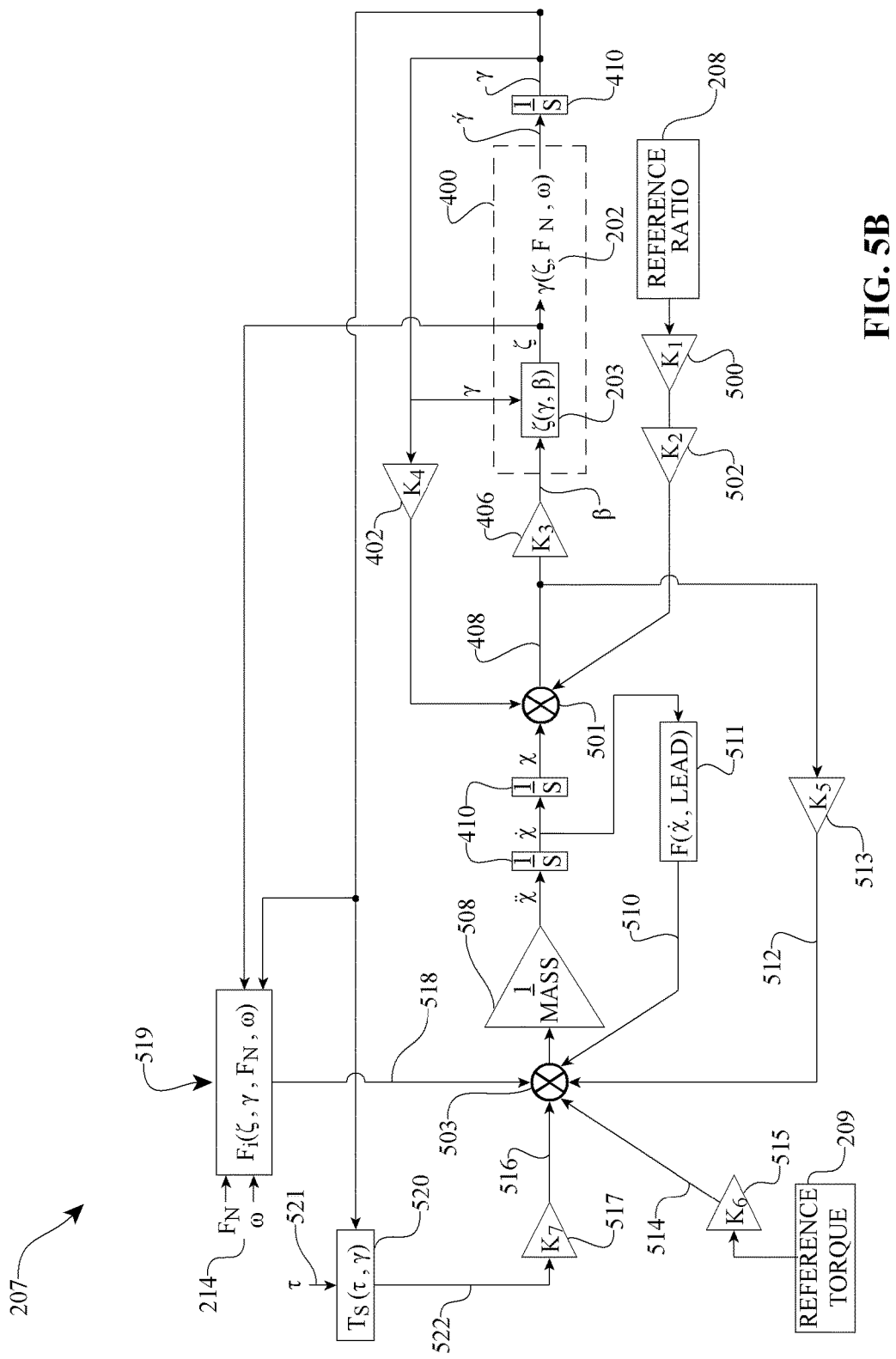
FIG. 5B is a schematic diagram of yet another embodiment of a skew control system that can be used with, for example, the drive apparatus of FIG. 2.

Referring now to FIG. 5B, yet another embodiment of a skew-based control system 207 that can be used with the drive 25 will be described now. For description purposes the skew control system 207 will be described by analogy to a mechanical embodiment such as the one shown in FIG. 6; however, in some embodiments, the skew control system 207 can be implemented as an electrical or electro-mechanical system where the elements shown in FIG. 5B are functions in an electronic controller. The skew control system 207 includes the control reference 208 coupled to a planetary gear set having a ratio $(K_1)$ 500. In some embodiments, the control reference 208 can be adjusted by the application of a torque 209 to the shift nut or reference dial. The control reference 208 applied with a torque 209 can be transformed into an axial translation of a reference element, such as a feedback cam 1066 having a screw lead $(K_2)$ 502.

In one embodiment, the skew control system 207 includes two summing junctions 501 and 503. The first summing junction 501 produces the control error 408 based on a control reference 208 and two sources of feedback. A first feedback source can be the axial position of the traction sun 110, and the other feedback source can be the axial position of the skew cam 1068 (see FIG. 6), for example. The second summing junction 503 sums forces exerted on the skew cam 1068. The result of the summing junction 503 is, therefore, a force exerted on the skew cam 1068 that can be used to determine the axial position of the skew cam 1068. The position χ of the skew cam 1068 is determined by dividing the resultant force of the summing junction 503 by the mass of the skew cam 1068, shown as gain 508, and integrating the resulting skew cam acceleration χ" with integrators 410, once to determine speed χ' of the skew cam 1068 and again to determine the position χ. The axial position χ is provided as input to the summing junction 501 and combined with the control reference 208 and the axial position of the traction sun to derive a control error 408. A gain $(K_3)$ 406 can be applied to convert the control error 408 into a carrier plate angle β. The skew algorithm 400 receives a carrier plate angle β as input and returns a rate of change in tilt angle γ'. An integrator 410 is applied to γ' to provide a tilt angle γ that can be further transformed into an axial position of traction sun by applying a gain $(K_4)$ 402. The gain 402 is equal to the planet radius multiplied by the RSF (that is, $K_4=R*RSF$).

Referring still to FIG. 5B, the summing junction 503 will be described further. As previously stated, the summing junction 503 sums forces exerted on, for example, the skew cam 1068. The forces can include friction 510, neutralizing spring force 512, control reference force 514, carrier plate force 516, and axial forces 518 on the traction sun 110, 1026, which is typically produced at the contact area 3 between the traction sun 110, 1026 and the traction planet 108, 1022, for example. For the embodiment shown, friction exerted on the skew cam 1068 can be determined from the velocity of the skew cam 1068 and the screw lead of the skew cam 1068 with a function 511. Neutralizing spring force 512 can be determined by applying a gain $(K_5)$ 513 to the control error 408 formed at the summing junction 501. In some embodiments, the gain $(K_5)$ 513 can represent a mechanical system that tends to bias a skew cam 1068, for example, to a neutral location through linear, non-linear, or discontinuous functions, such as the neutralizer assembly 1092 shown in FIG. 6. A force can be generated by the reference torque 209 exerted while adjusting the control reference 208. In one embodiment, the control reference force 514 is determined by applying a gain $(K_6)$ 515 proportional to the effective lever arm of the torque 209 applied to the skew cam 1068. During operation of a CVT 300, for example, the drive torque (τ) 521 is reacted by the carrier plates 304 and 306. In some embodiments, the carrier plate 304 can be configured to react the drive torque (τ) 521 and to actuate the skew angle ζ, for instance, by a skew lever 302 or a skew cam 1068. In one embodiment, the carrier plate torque function 520 provides a carrier plate torque 522 based on the drive torque (τ) 521 and the tilt angle γ. The resulting carrier plate force 516 acting on the skew cam 1068 is determined by applying to the carrier plate torque 522 a gain $(K_7)$ 517, which is proportional to the distance from the skew cam 1068 that the carrier plate torque is acting on the skew cam 1068.

The axial force 518 on the traction sun is reacted on the skew cam 1068 in some embodiments. In one embodiment, the axial force 518 is generated by spin-induced and skew-induced side forces at the contact area 3. The force 518 can be determined by the traction sun force algorithm 519 that is a function of, among other things, the normal force at contact 3 and the rotational speed ω of the traction planet 108, 308, or 1022. The forces just described are combined at the summing junction 503 and are used in the skew control system 207 for feedback to account for the steady state operating error that can exist in the skew angle ζ. A steady state error in the skew angle ζ can arise when operating the CVT 300 due to reacting the spin-induced side forces on the traction sun. In some embodiments, it is preferable for optimal efficiency of a CVT to generally operate with a skew angle ζ equal to zero when a change in speed ratio is not desired. The embodiment of a skew control system shown in FIG. 6 incorporates a side force neutralizer assembly 1092 that effectively reacts the side forces on the traction sun 1026 so that the skew angle ζ is at an optimal operating skew condition $ζ_{opt}$, which in some cases means a substantially zero skew angle ζ during steady state operation.

Figure 5C:
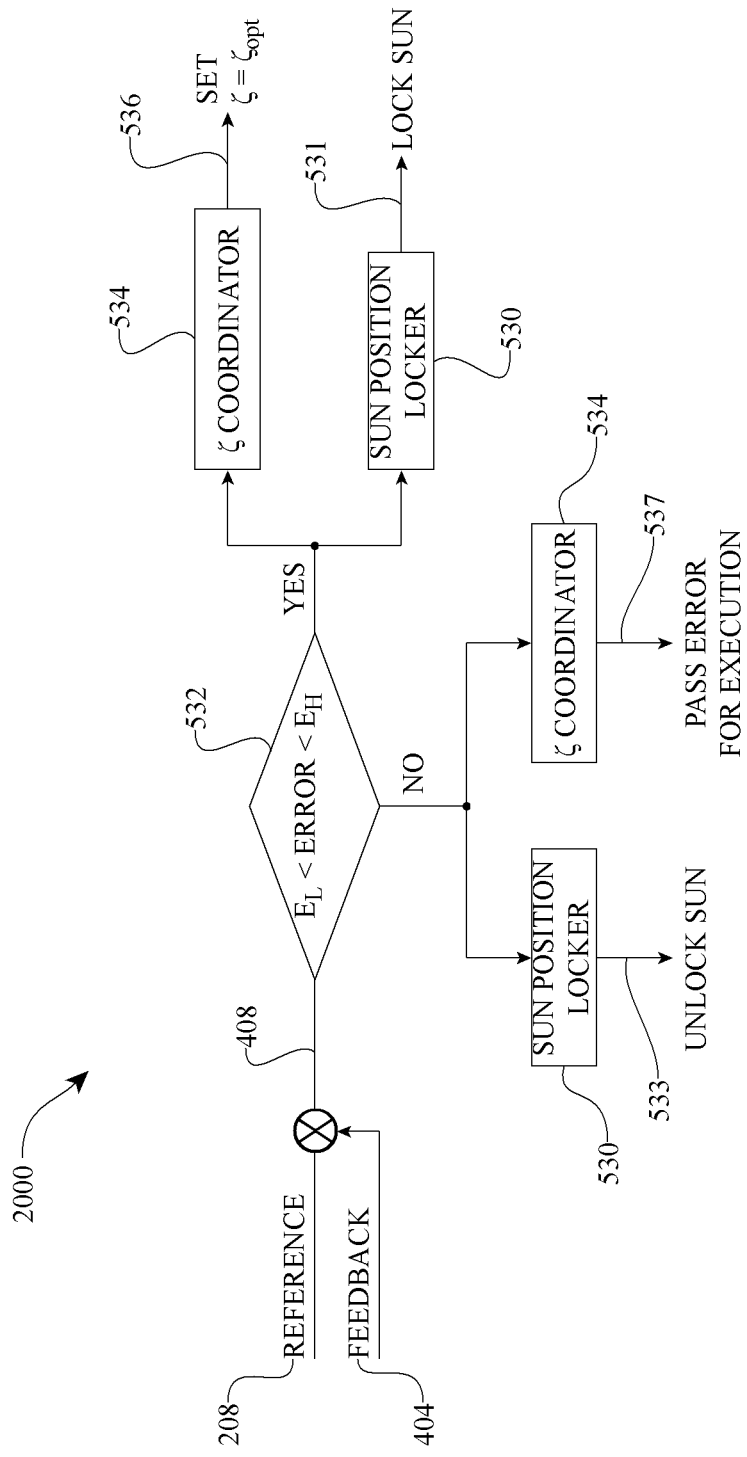
FIG. 5C is a schematic diagram of one more embodiment of a skew control system that can be used with, for example, the drive apparatus of FIG. 2.

Passing now to FIG. 5C, another embodiment of a skew control system 2000 is described. As previously discussed, during operation of a CVT 300 a steady state error of the skew angle ζ can arise due to axial forces acting on the traction sun. Therefore, to maintain a steady state speed ratio, it is desirable to decouple the skew control system 2000 from the position of the traction sun. In one embodiment, a traction sun position locker 530 can be coupled to a traction sun and integrated with the skew control system 2000. The traction sun position locker 530 can be, for example, a mechanism that locks and holds the traction sun at an axial position until the lock is released. The mechanism can be a mechanical locking pawl, or an electro-mechanically actuated device, or an electro-hydraulically actuated device.

In one embodiment, the state of the traction sun position locker is based on a result from a decision process 532 that compares the control error 408 with an upper and lower limit for the error. If the control error 408 is within the limits set in the decision process 532, the positive or true result from the process 532 is sent to the traction sun position locker 530, which returns a command 531 to lock the traction sun at its current position. A positive or true result from the decision process 532 is also sent to a skew angle $\zeta$ coordinator 534 that returns a command 536 to set the skew angle $\zeta$ to an optimal skew angle $\zeta_{opt}$, which is some embodiments it means that the skew angle $\zeta$ is zero. If the control error 408 is not within the limits of the decision process 532, a negative or false result is passed to the sun position locker 530, which returns a command 533 to unlock the traction sun. The false result is passed to the skew angle $\zeta$ coordinator 534, which returns a command 537 that passes the control error 408 to, for example, a skew algorithm 400, to execute a change in the tilt angle $\gamma$. In this embodiment, the control error 408 can be determined by comparing a control reference 208 to a feedback 404. A control reference 408 can be a position, either angular or axial, a desired speed ratio, or any other relevant reference for operating a CVT 300.

The embodiments of a skew-based control system described previously can be used in conjunction with systems such as speed governors or torque governors, among others. In applications were it is desirable to maintain a constant input speed in the presence of a varying output speed, or vice versa, a mechanical, electrical, or hydraulic speed governor can be coupled to the shift nut or control reference in order to adjust the operating condition of the drive. In other applications, it might be desirable to maintain a constant input torque in the presence of a varying output torque, which is generally more challenging to implement with traditional controls systems. A skew control system, such control system 200 described here, can be coupled to a mechanism for controlling input torque in the presence of a varying output torque.

A CVT 1000 adapted to employ a skew-based control system related to those discussed above will now be described with reference to FIGS. 6-23. In one embodiment, the CVT 1000 includes a housing formed generally by a shell 1010 and a cap 1012; the shell 1010 and the cap 1012 can be rigidly coupled with, for example, bolts, screws, or a threaded joint. A power input member 1014, such as a sprocket for example, couples to an input driver 1018, which is positioned coaxially with a longitudinal axis LA1 of the CVT 1000. A first axial force generator 1016 is placed between the input driver 1018 and a first traction ring 1020. An array of traction planets 1022 is positioned on a plane perpendicular to the longitudinal axis LA1. The traction planets 1022 are arranged angularly about the longitudinal axis LA1, and are placed in frictional or tractive contact with the first traction ring 1020, a second traction ring 1024, and a traction sun 1026. The shell 1010 is adapted to receive torque from, or transmit torque to, the second traction ring 1024. In one embodiment, a shell torque member 1028 couples to the second traction ring 1024 via a second axial force generator 1030. The traction ring 1024, traction sun 1026, and the axial force generators 1016, 1030 are mounted coaxially with the longitudinal axis LA1. In some embodiments, the shell 1010 and the cap 1012 are supported radially by bearings 1032, 1034, respectively. The bearing 1032 provides a rolling interface between the shell 1010 and an axial retainer plate 1084. The bearing 1034 provides a rolling interface between the cap 1012 and the input driver 1018. A thrust bearing 1036 can be positioned between the input driver 1018 and the cap 1012 to provide an axial rolling interface between the input driver 1018 and the cap 1012, which cap 1012 reacts axial forces generated during operation of the CVT 1000. A main axle 1038 can be provided to, in part, support various component of the CVT 1000 and to, in some embodiments, provide for attachment of the CVT 1000 to a frame of a vehicle, a support bracket, a fixed member of a machine, or the like.

The CVT 1000 includes carrier plates 1040, 1042 adapted to, among other things, support radially and axially an array of planet-leg assemblies 1044, which will be described further with reference to FIGS. 9 and 10. In some embodiments, stator spacers (not shown) can be provided to attach the carrier plates 1040, 1042 together. Preferably, for certain applications, the carrier plates 1040, 1042 are coupled only semi-rigidly (rather than rigidly) to allow some relative rotation between the carrier plate 1040 and the carrier plate 1042. As will be described further below, in some embodiments, at least one of the carrier plates 1040, 1042 can be adapted to facilitate adjustment of the speed ratio of the CVT 1000.

Referring to FIGS. 9 and 10 specifically now, a planet-leg assembly 1044 generally includes, among other things, a traction planet 1022 mounted about a planet axle 1046. In some embodiments, one or more bearings 1048 can be provided between the planet axle 1046 and a bore of the traction planet 1022. The planet axle 1046 is configured to extend beyond the circumference of the traction planet 1022. At each end of the planet axle 1046, a leg 1050 couples to the planet axle 1046. The leg 1050 is sometimes characterized as a shift lever because the leg 1050 acts as a lever to facilitate a tilt of the planet axle 1046, which results in an adjustment (or shift) of the speed ratio between the traction rings 1020, 1024. In some embodiments, the leg 1050 is adapted to receive and support a shift cam roller 1052 and a shift guide roller 1054. The shift cam rollers 1052 are adapted to transmit force from shift cams 1056, 1058 (see FIG. 6) to the legs 1050 for, among other things, facilitating a speed ratio adjustment. In some embodiments, the shift guide rollers 1054 are generally adapted to cooperate with the carrier plates 1040, 1042 to react forces that arise during a speed ratio adjustment. In one embodiment, each of the planet axles 1046 is provided with a skew roller 1060 to, in part, react forces that tend to misalign (that is, remove the coplanarity between) a longitudinal axis of the planet axle 1046 and the longitudinal axis LA1. It should be noted that the planet-leg assembly 1044 described here is merely one example of a variety of planet-leg assemblies that can be used with the CVT 1000. Other suitable planet-leg assemblies and/or legs, are described in U.S. Patent Application 60/943,273, filed on Jun. 11, 2007, and which is hereby incorporated by reference herein in its entirety.

During operation, referencing FIG. 6 most particularly, the flow of power through the CVT 1000 proceeds generally as follows. Power is input to the power input member 1014. The input driver 1018 receives the power from the input member 1014 and drives the axial force generator 1016.

Power flows from the axial force generator 1016 into the first traction ring 1020, which through friction or traction drives the traction planets 1022. The second traction ring 1024 receives power from the traction planets 1022 and transfers power to the second axial force generator 1030. Power flows from the second axial force generator 1030 to the shell 1010 via the shell torque member 1028. Power can then be delivered from the shell 1010 to a load, final drive, machine, gearbox, planetary gearset, etc. It should be noted that the power flow just described can be reversed such that power is input via the shell 1010 and transmitted from the second axial force generator 1030, to the second traction ring 1024, and so on, and delivered to the power input member 1014 (in which case, the power input member 1014 is more precisely characterized as a power output member). It should be additionally noticed that in some applications it might be preferable to provide a power output shaft (not shown) that can be coupled to the second axial force generator 1030, which allows the shell 1010 to be removed from the power flow and to be held stationary relative to the power flow components.

Adjustment in the speed ratio between the traction rings 1020, 1024, which adjustment results in the modulation of power flow through the CVT 1000, can be accomplished by tilting the axis of the planet axles 1046 relative to the longitudinal axis LA1. In the discussion that follows, mechanisms and methods for actuating and controlling a tilting of the planet axles 1046 will be described.

Referencing FIGS. 6-8 and 13-23 more specifically now, in one embodiment a reference input nut 1062 is mounted coaxially with the longitudinal axis LA1 and coupled via a sliding spline interface 1064 to a feedback cam 1066. The sliding spline interface 1064 is configured to allow the reference input nut 1062 to rotate the feedback cam 1066, and to allow the feedback cam 1066 to translate axially relative to the reference input nut 1062. A skew cam 1068 includes a first threaded portion 1070 adapted to couple to a mating threaded portion 1122 of the feedback cam 1066 (see FIGS. 15-18). The skew cam 1068 additionally includes a second threaded portion 1072 configured to mate with a corresponding threaded portion 1074 of the carrier plate 1042. In one embodiment, the main axle 1038 is provided with a splined portion 1076 that mates to a splined portion 1082 of the skew cam 1068. The splined interface between the main axle 1038 and the skew cam 1068 facilitates anti-rotation, but allows relative axial translation, of the skew cam 1068 relative to the main axle 1038. In some embodiments, the reference input nut 1062, feedback cam 1066, and skew cam 1068 are mounted concentrically with the main axle 1038.

To adjust a speed ratio of the CVT 1000, the reference input nut 1062 is turned to a selected position indicative of a desired speed ratio. If the axial forces (or, in other words, the clamping load provided by the axial force generators that yield a normal force at the contact) on the traction planets 1022 is relatively low or substantially zero, through the splined interface 1064 the reference input nut 1062 causes the feedback cam 1066 to rotate about the longitudinal axis LA1. Hence, when the clamp loads on the traction planets 1022 are relatively low, the skew cam 1068 tends not to translate. Consequently, the feedback cam 1066 is forced to translate axially as the feedback cam 1066 rotates about the axis LA1. The axial translation of the feedback cam 1066 causes an axial translation of the traction sun 1026 via thrust bearings 1078, 1080. Axial translation of the traction sun 1026 results in a tilting of the planet axles 1046 through the operational coupling between the traction sun 1026 and the planet axles 1046 via the shift cams 1056, 1058, shift cam rollers 1052, and legs 1050.

When the clamp loads on the traction planets 1022 are at, for example, average operating conditions, rotation of the reference input nut 1062 causes a rotation of the feedback cam 1066; however, under this operating condition, the resistance provided by the planet-leg assemblies 1044 and the shift cams 1056, 1058 tend to constrain axial translation of the feedback cam 1066. Since the feedback cam 1066 rotates but does not translate, the skew cam 1068 (which is constrained rotationally via the sliding spline portion 1082) is forced to translate axially via the threaded interface 1070, 1122 between the feedback cam 1066 and the skew cam 1068. Since the carrier plate 1042 is constrained axially but can have at least some angular rotation, the carrier plate 1042 is urged into angular rotation about the longitudinal axis LA1 through the sliding spline interface 1072, 1074 between the skew cam 1068 and the carrier plate 1042, resulting in the carrier plate 1042 inducing the planet axles 1046 into a skew condition. In one embodiment, the carrier plate 1042 rotates angularly until a maximum skew angle is achieved. The skew condition, as explained above, causes a tilting of the planet axles 1046. The tilting of the planet axles 1046 results in an adjustment of the speed ratio of the CVT 1000. However, the tilting of the planet axles 1046 additionally acts to translate axially the shift cams 1056, 1058 via the operational coupling between the planet axles 1046 and the shift cams 1056, 1058. The axial translation of the shift cams 1056, 1058 consequently results in an axial translation of the feedback cam 1066 via the thrust bearings 1078, 1080. Since the reference input nut 1062 prevents rotation of the feedback cam 1066, the skew cam 1068 and the feedback cam 1066 translate axially together. The axial translation of the skew cam 1068 causes a restoring angular rotation upon the carrier plate 1042, which consequently returns to a skew angle that generates sufficient skew forces to maintain the skew cam 1068 at an equilibrium axial position.

When the CVT 1000 is under an operation condition that is between a no load condition and a loaded condition, there can exist a cross over condition under which inducement of a skew condition of the planet axles 1046 (as well as the restoring action to zero skew condition) involves a translation and a rotation of the feedback cam 1066 with a simultaneous translation of the skew cam 1068. In all cases, the feedback cam 1066 and the skew cam 1068 are configured to cooperate to induce a skew condition of the planet axles 1046 via an angular rotation of the carrier plate 1042. The skew condition causes a tilting of the planet axles 1046 to set the CVT 1000 at a desired speed ratio. The feedback cam 1066, under action from the planet-leg assemblies 1044, cooperates with skew cam 1068 to restore the carrier plate 1042 to a position that induces a nominal zero skew.

Figure 6:
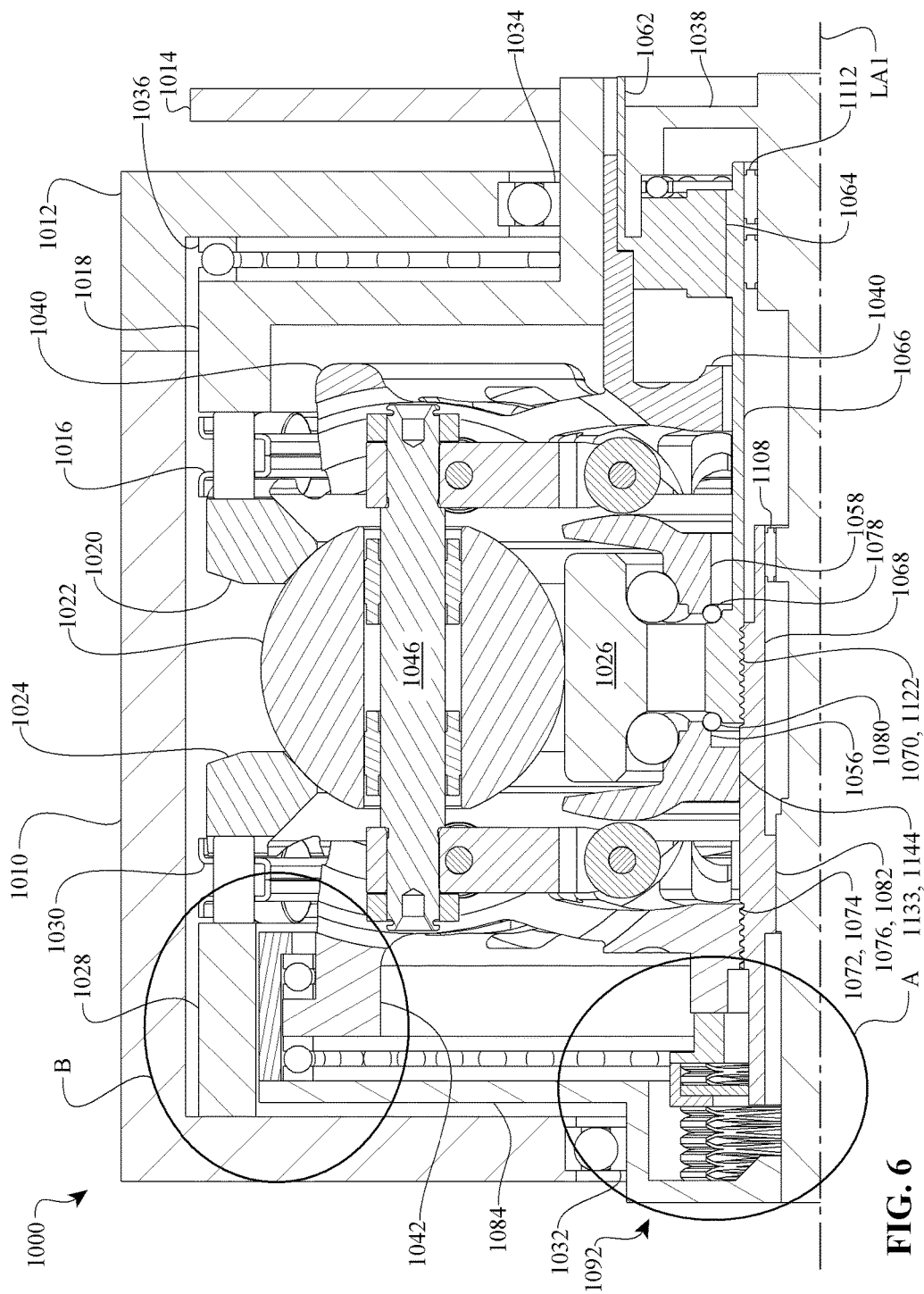
FIG. 6 is a cross-sectional view of a CVT configured to employ a skew angle adjustment to facilitate an adjustment in the speed ratio of the CVT.
Figure 7:
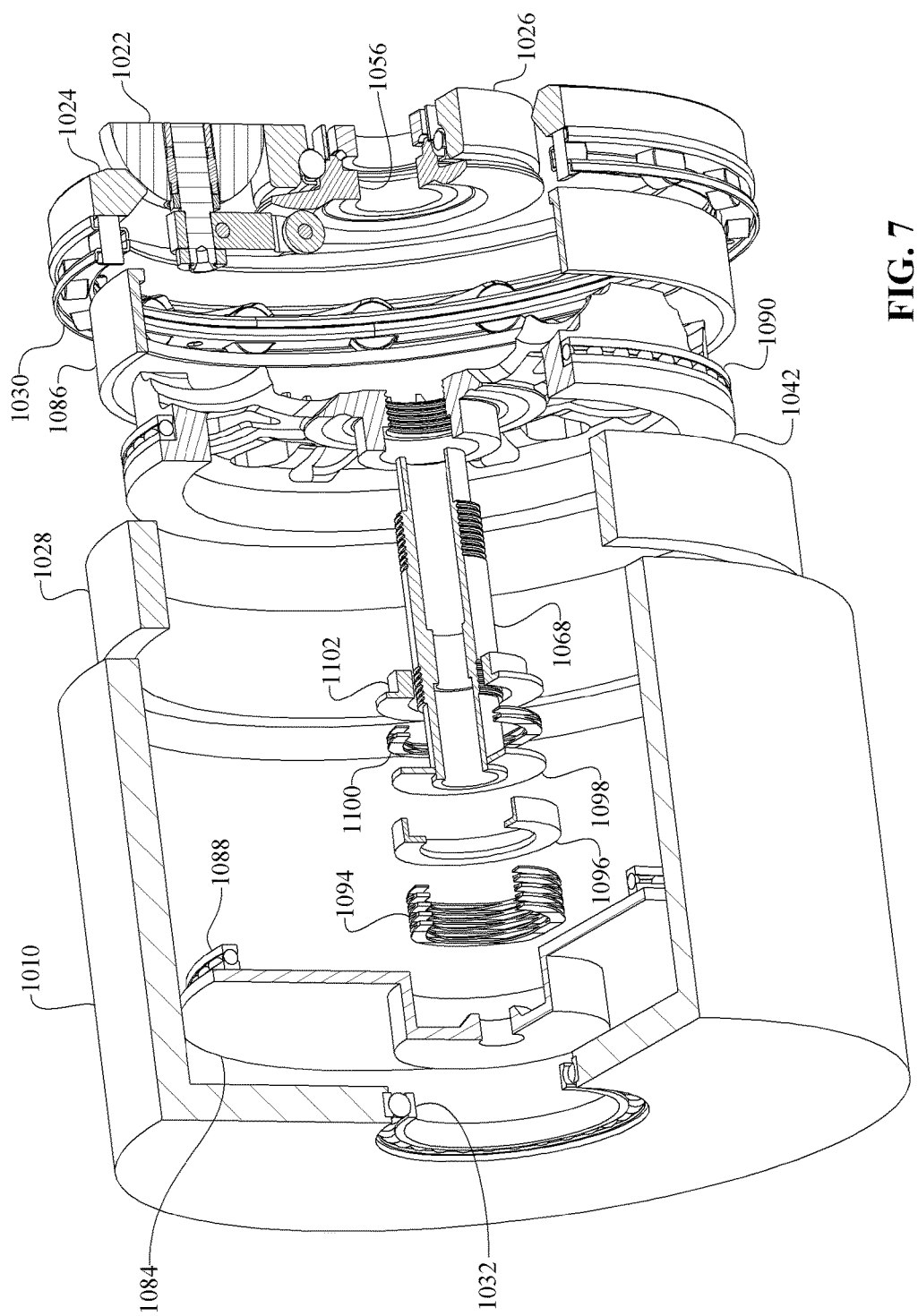
FIG. 7 is a partially sectioned and exploded, perspective view of certain components of the CVT of FIG. 6. For clarity of illustration, the CVT is shown in two pages; wherein a plane perpendicular to the main axis of the CVT and passing through the center of the traction planet divides the CVT in two sections.
Figure 8:
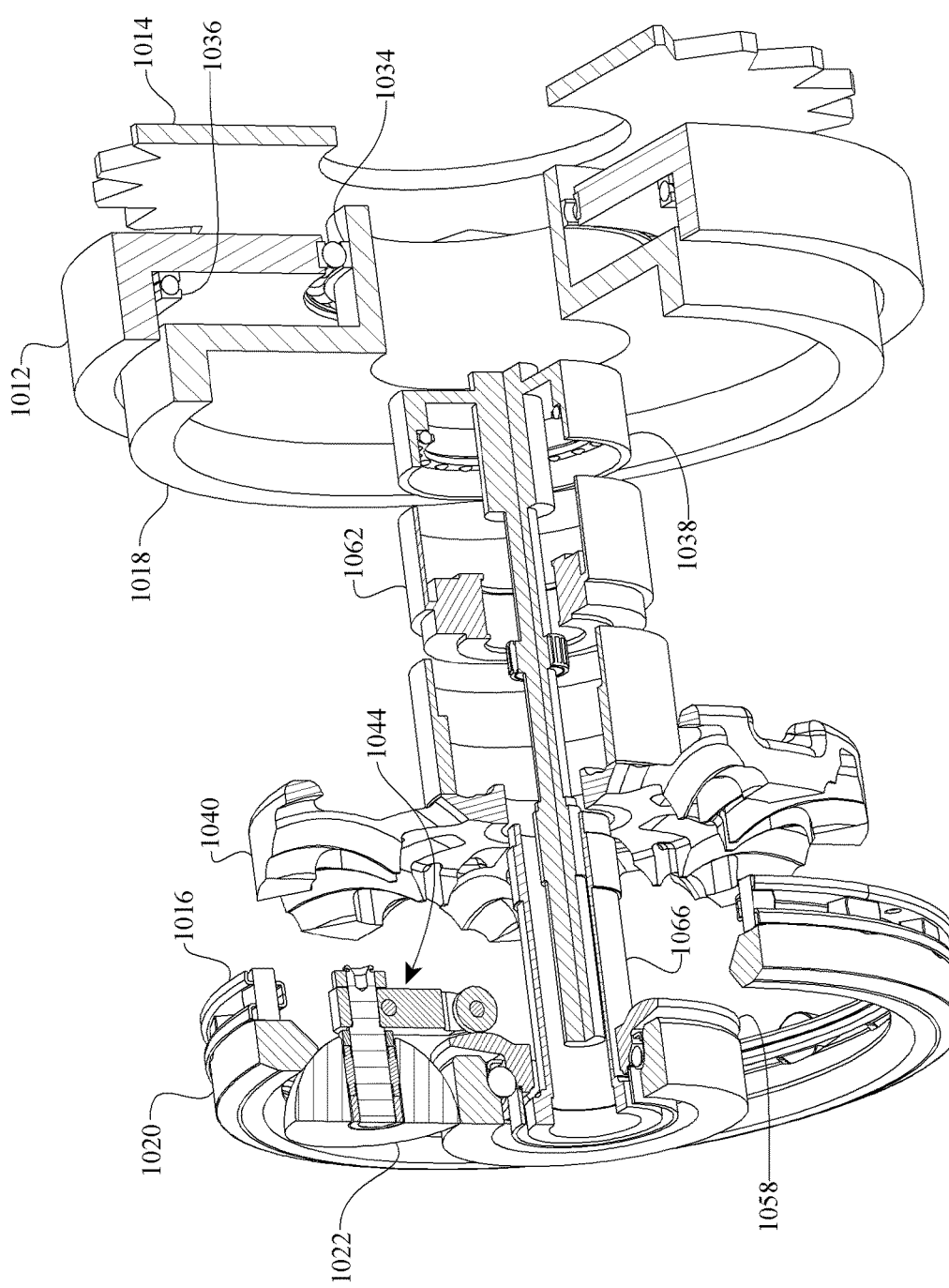
FIG. 8 is a partially sectioned and exploded, perspective view of certain components of the CVT of FIG. 6.
Figure 11:
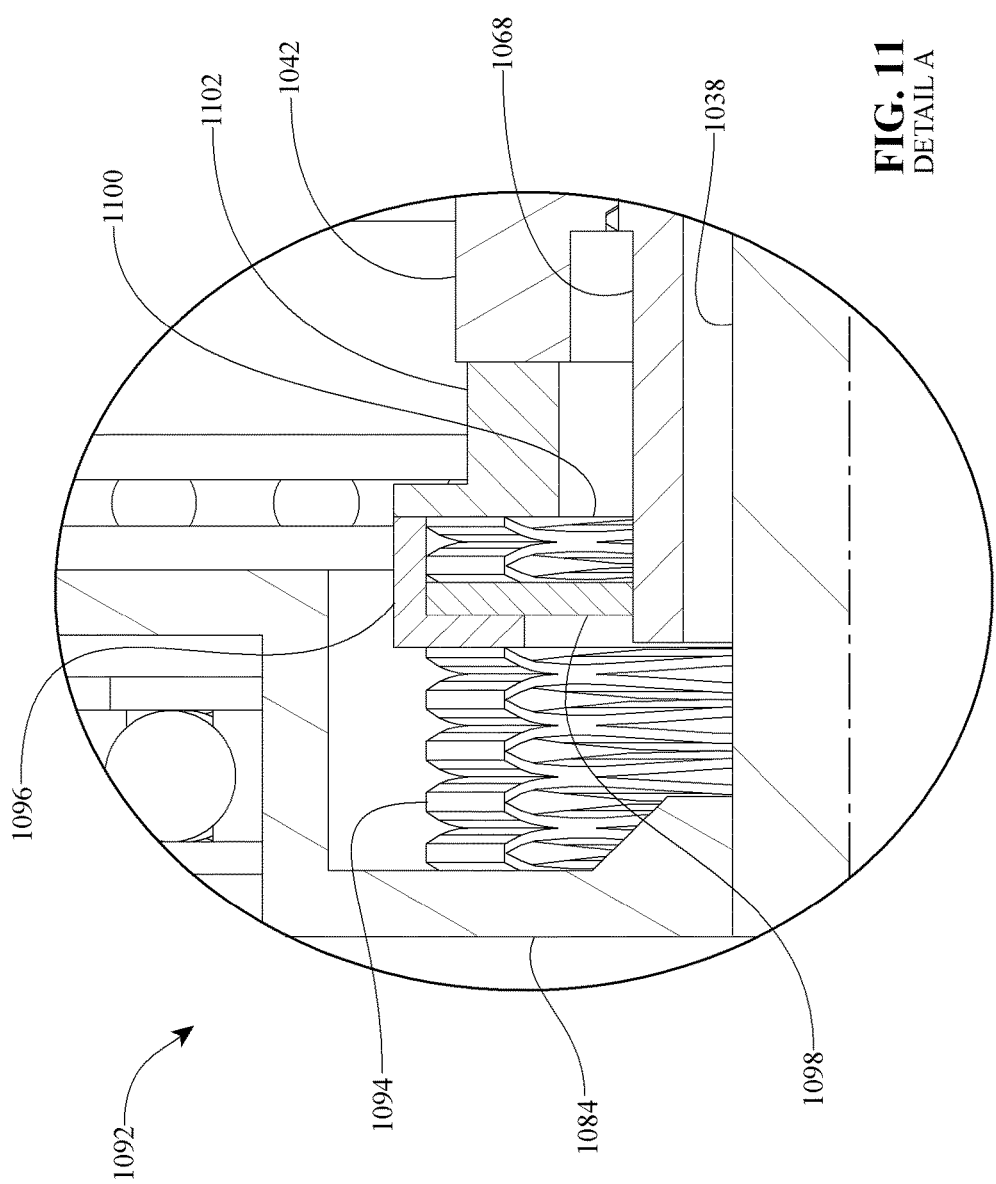
FIG. 11 is a Detail A view of the CVT of FIG. 6.
Figure 12:
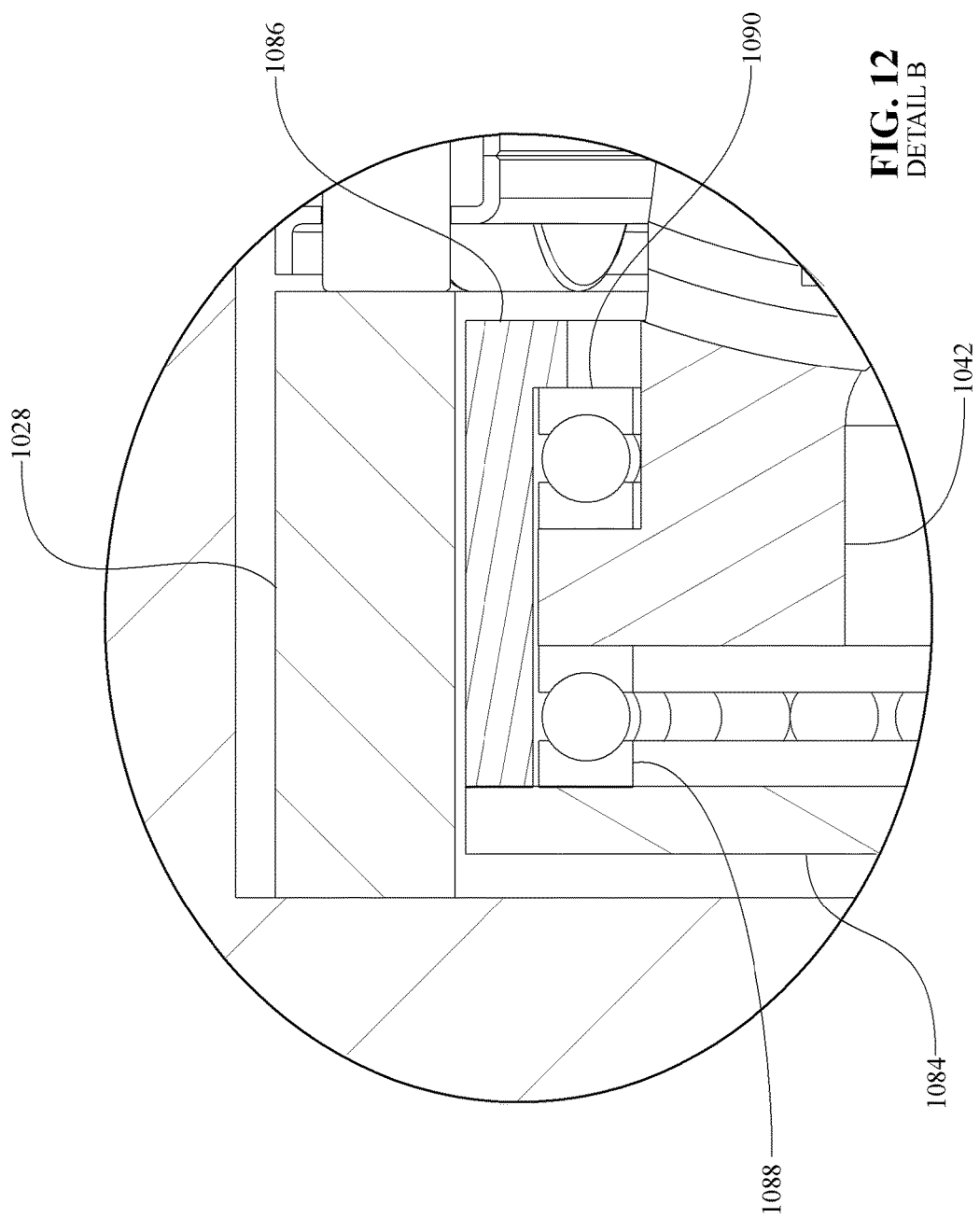
FIG. 12 is a Detail B view of the CVT of FIG. 6.

Referring now to FIGS. 11 and 12 more specifically now, in one embodiment, the carrier plate 1042 is constrained axially by the axial retainer plate 1084 and an axial retainer cap 1086, which cooperate with thrust bearings 1088, 1090, as shown in Detail View B of FIGS. 6 and 12. The axial retainer plate 1084, axial retainer cap 1086, and the thrust bearings 1088, 1090 are mounted coaxially about the longitudinal axis LA1, and are configured to facilitate an axial constraint of the carrier plate 1042 while allowing an angular rotation of the carrier plate 1042 about the longitudinal axis LA1. The axial retainer plate 1084 is preferably coupled rigidly to the main axle 1038; that is, the retainer plate 1084 is configured in some embodiments to be constrained axially, radially, and rotationally relative to the longitudinal axis LA1. In one embodiment, the carrier plate 1040 is constrained axially, radially, and rotationally relative to the longitudinal axis LA1, which constrains can be achieved by, for example, coupling rigidly the carrier plate 1040 to the main axle 1038. In some embodiments, the interface between the carrier plate 1040 and the input driver 1018 is provided with a rolling bearing surface, or bearings, to allow relative rotation between the carrier plate and the input driver 1018 with minimal friction.

Because of the nature of a ball planetary drive such as the CVT 1000, the traction sun 1026 tends to be subjected to an axial force (also, referred to as a "spin-induced side force") through the contact between the traction planets 1022 and the traction sun 1026 during operation of the CVT 1000. When such an axial force is not counteracted, it is possible that the traction sun 1026 will tend to induce an axial translation of the skew cam 1068, resulting in operation at a non-zero skew angle.

In the embodiment of the CVT 1000 illustrated, the spin-induced side force on the traction sun 1026 is balanced, at least in part, by a skew-induced side force; hence, the skew cam 1068 is held in equilibrium. However, such a configuration produces a steady state non-zero skew angle condition, which can be less efficient than a zero skew angle condition. To achieve a zero skew angle condition, the spin-induced side forces are preferably balanced by a force other than a skew-induced side force.

In one embodiment, the CVT 1000 can be provided with a side force neutralizer assembly 1092, which is generally shown in Detail A view of FIGS. 6 and 11. In some embodiments, the neutralizer 1092 includes a first resistance member 1094 (such as one or more coil springs, wave springs, belleville springs, etc.) positioned between the axial retainer plate 1084 and a translating resistance cup 1096. The first resistance member 1094 and the translating resistance cup 1096 are mounted adjacent to one another and coaxially about the longitudinal axis LAL A neutralizer reaction flange 1098 can be coupled to the skew cam 1068. The neutralizer reaction flange 1098 is positioned adjacent to the translating resistance cup 1096. A second resistance member 1100 is positioned between the neutralizer reaction flange 1098 and a neutralizer stop cap 1102 that can be rigidly mounted to the resistance cup 1096, all of which are mounted coaxially about the longitudinal axis LA1. Preferably, the neutralizer stop cap 1102 is axially constrained by, for example, the carrier plate 1042.

During operation, as the side force tends to induce an axial translation of the traction sun 1026, the tendency of the feedback cam 1066 and the skew cam 1068 to translate axially is resisted by either one of the resistance members 1094, 1100. If axial translation of the skew cam 1068 is to the left (based on the orientation of the CVT 1000 in FIG. 6), the neutralizer reaction flange 1098 coupled to the skew cam 1068 pushes on the translating resistance cup 1096. The first resistance member 1094, supported axially by the axial retainer plate 1084, provides a countering force on the neutralizer reaction flange 1098 through the translating resistance cup 1096. Hence, the first resistance member 1094 is configured to counteract translation of the skew cam 1068 in a first direction towards the carrier plate 1042. Similarly, as the skew cam 1068 tends to moves in a second direction toward the carrier plate 1040, the second resistance member 1100 is supported axially by the neutralizer stop cap 1102 and provides a counteracting force that tends to resist the axial translation of the skew cam 1068 in the second direction. It should be noted that the translating resistance cup 1096 is configured to facilitate a decoupling of the action of the resistance members 1094, 1100. The resistance of the resistance members 1094, 1100 is appropriately selected to allow a translation of the skew cam 1068 at a desired operation condition of the CVT 1000 when a speed ratio adjustment is desired. Hence, preferably the resistance of the resistance members 1094, 1100 is suitably selected to provide generally only the minimum sufficient resistance needed to counteract the side force on the traction sun 1026. In some embodiments, the resistance members 1094, 1100 can have variable resistance and vary with the operating condition of CVT 1000, so that the optimal resistance is provided to the skew cam 1068 to neutralize the forces induced on the skew cam 1068.

Turning now to FIGS. 13 and 14, in one embodiment the main axle 1038 includes a generally elongated, cylindrical body 1104. The main axle body 1104 can be provided with a sliding spline portion 1076, which is preferably configured to mate to a corresponding sliding spline portion 1082 of the skew cam 1068. In some embodiments, the main axle body 1104 can exhibit a bearing seat 1106 for receiving and supporting one or more main axle radial bearings 1108 that provide coaxial support between the main axle 1038 and the skew cam 1068 with minimal sliding friction. In one embodiment, the main axle 1038 is configured with a bearing seat 1110 for receiving and supporting one or more feedback cam bearings 1112 that provide coaxial support between the main axle 1038 and the feedback cam 1066 with minimal sliding friction. In some cases, the bearings 1108, 1112 are axial roller bearings, or can be replaced by a sliding interface between the main axle 1038 and, respectively, the skew cam 1068 and feedback cam 1066. In one embodiment, the main axle 1038 can be provided with a main axle flange 1114 that, among other things, provides a piloting surface 1115 for receiving the reference input nut 1062. The main axle flange 1114 can have a shoulder 1116 for providing an axial constraint for the reference input nut 1062.

Passing to FIGS. 15 and 16, in one embodiment, the feedback cam 1066 includes a generally elongated, cylindrical, hollow body 1118. A bore 1120 of the feedback cam 1066 is configured to allow the feedback cam 1066 to be mounted coaxially about the main axle 1038. In one embodiment, the bore 1120 can exhibit a threaded portion 1122 adapted to engage a corresponding threaded portion 1070 of the skew cam 1068. One portion of the feedback cam 1066 is preferably provided with a sliding spline 1124 adapted to mate with a corresponding sliding spline 1064 of the reference input nut 1062. In one embodiment, the feedback cam 1066 can be provided with one or more bearing races 1126, 1128 to form part of the thrust bearings 1078, 1080 (see FIG. 6).

Referring to FIGS. 17 and 18, in one embodiment, the skew cam 1068 includes a generally elongated, hollow, cylindrical body 1130. The skew cam 1068 can be provided with a first threaded portion 1070 adapted to engage a mating threaded portion 1122 of the feedback cam 1066. The skew cam 1068 can be configured additionally with a second threaded portion 1072 for engaging a mating threaded portion 1074 of the carrier plate 1042. In one embodiment, the lead of the first thread portion 1070 is relatively smaller than the lead of the second threaded portion 1072; for example, the lead of the first threaded portion 1070 can be about 10-30 mm, and the lead of the second threaded portion 1072 can be about 100-300 mm. In one case, the leads for the first and second threaded portions 1070, 1072 are, respectively, 20 mm and 200 mm (or, in other words, in a ratio of about 1:10). In some embodiments, a neutralizing reaction flange 1098 is formed integral with the skew cam 1068. However, in other embodiments, the neutralizer reaction flange 1098 can be provided separately and suitably configured to be coupled to the skew cam 1068. A bore 1132 of the skew cam 1068 can be adapted to allow the skew cam 1068 to be mounted about the main axle 1038. In one embodiment, at least a portion of the bore 1132 is provided with a sliding spline 1082 configured to mate with a corresponding sliding spline 1076 of the main axle 1038. In some embodiments, the skew cam 1068 can be formed with a splined portion 1133 on the outer diameter of the body 1130, arranged axially for mating with sliding splines 1144 formed on the shift cam 1056 to facilitate anti-rotation of the shift cam 1056 about the longitudinal axis LA1.

Figures 19, 20, 21:
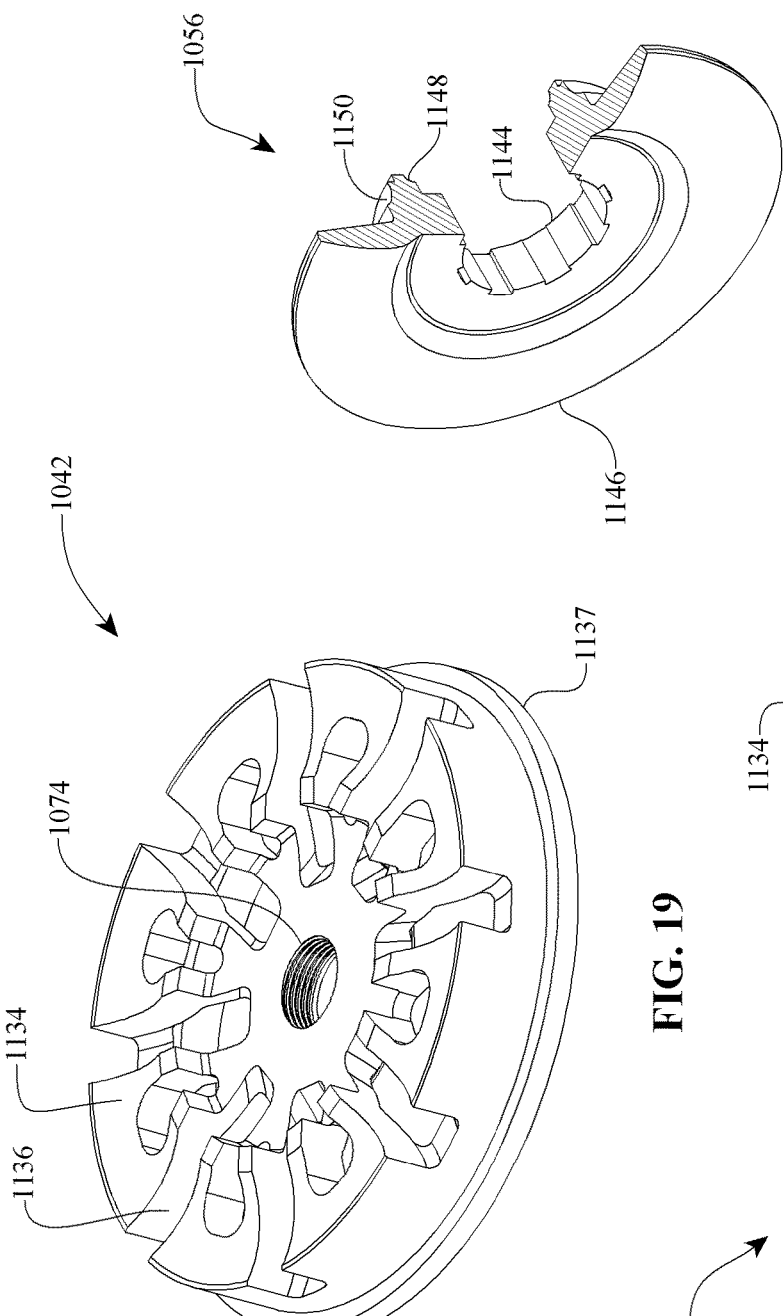
FIG. 19 is a perspective view of a carrier plate that can be used with the CVT of FIG. 6.
FIG. 20 is a cross-sectional view of the carrier plate of FIG. 19.
FIG. 21 is a partially sectioned, perspective view of a shift cam that can be used with the CVT of FIG. 6.

Turning now to FIGS. 19 and 20, in one embodiment, a carrier plate 1042 can be generally a plate or frame, mounted coaxially with the main axle 1038, for supporting and guiding the skew rollers 1060 and/or the shift guide rollers 1054. In one embodiment, the carrier plate 1042 includes a threaded central bore 1074 adapted to engage the threaded portion 1072 of the skew cam 1068. The carrier plate 1042 includes surfaces 1134 that are generally concave and are adapted to support the shift guide rollers 1054 as the CVT 1000 is shifted. Additionally, the carrier 1042 is provided with reaction surfaces 1136, angularly arranged about the central bore 1074, for reacting forces transmitted through the skew rollers 1060 as the CVT 1000 is in operation. The carrier plate 1042 can be provided with an outer ring 1137 having on one side a face 1138 and on the other side a face 1140 for mating with thrust bearings 1088 and 1090. The carrier plate 1042 can also have a reaction face 1142 to facilitate the axial constraint of the neutralizer stop cap 1102 in one direction.

Referring now to FIG. 21, in one embodiment the shift cam 1056 is generally a cylindrical body with a splined inner bore 1144 configured to couple with the sliding spline 1133 of the skew cam 1068. The shift cam 1056 is provided with a profiled surface 1146 for guiding the shift cam rollers 1052. Two bearing races 1148 and 1150 are formed into the shift cam 1056 for cooperating with, respectively, the bearing balls of the bearing 1080 and the bearing balls supporting the traction sun 1026.

Figures 22, 23:
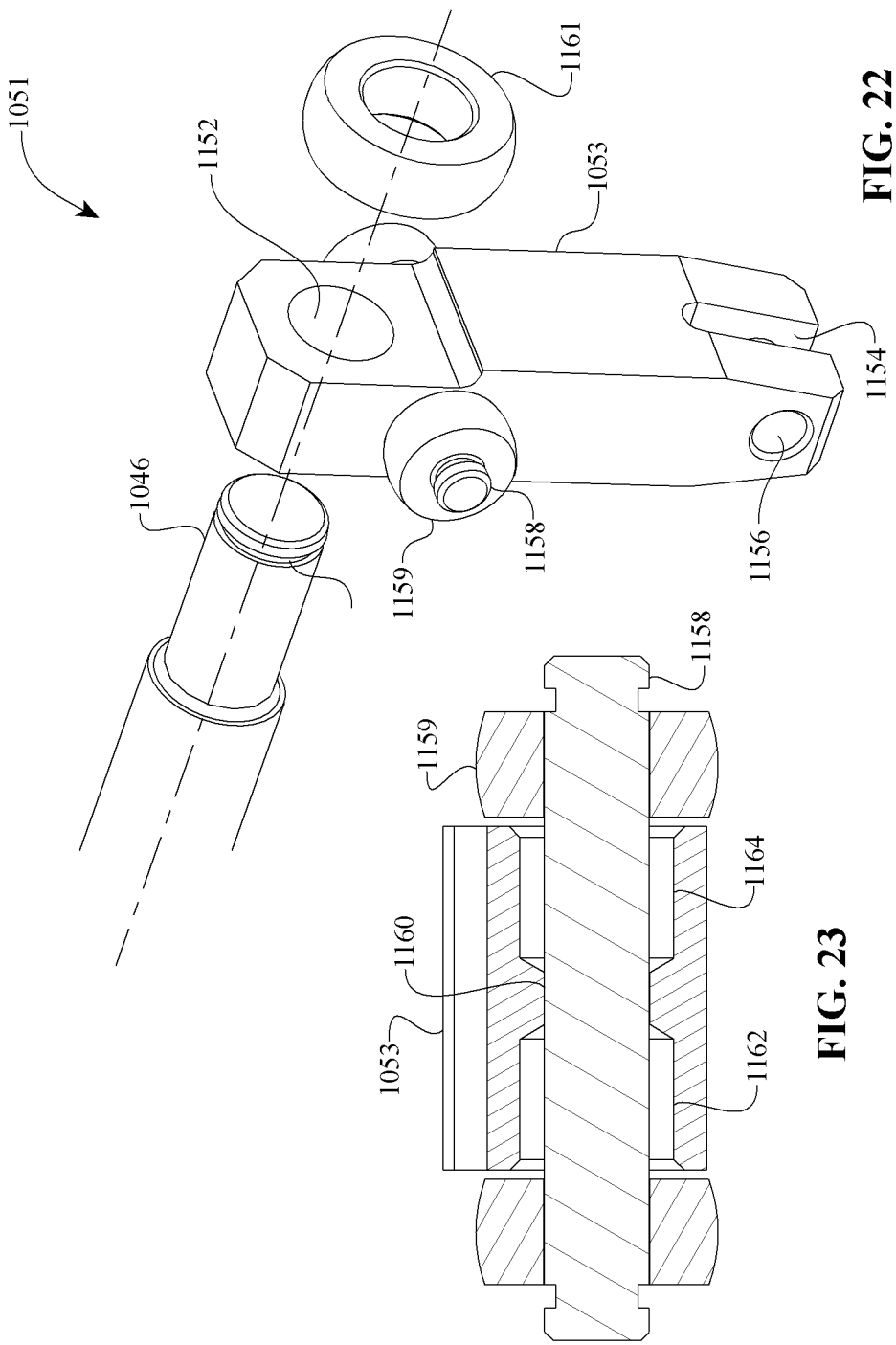
FIG. 22 is a perspective view of a leg assembly that can be used with certain embodiments of a CVT that uses skew control.
FIG. 23 is a cross-sectional view of certain components of the leg of FIG. 22.
Figure 24:
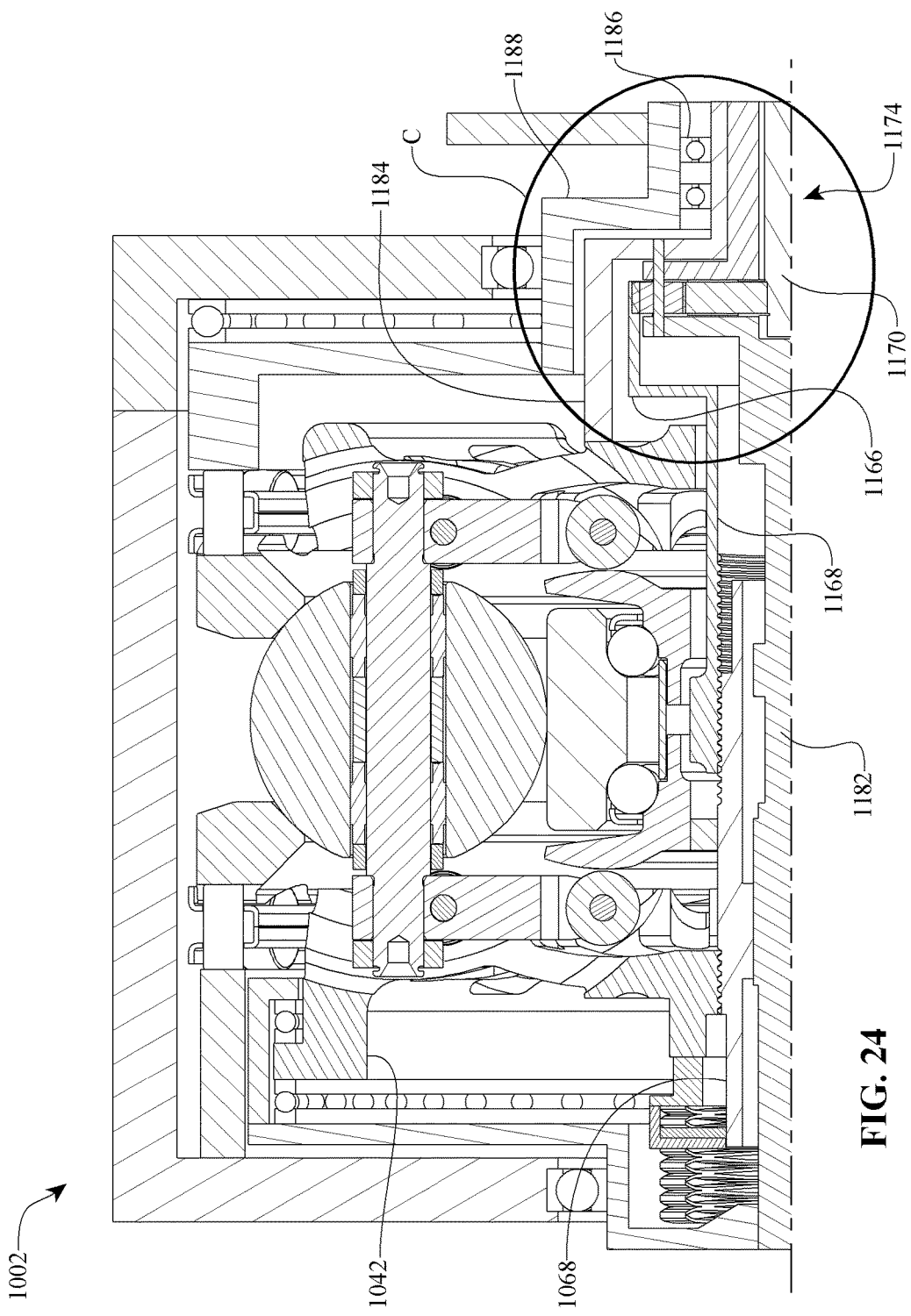
FIG. 24 is a cross-sectional view of another embodiment of a CVT configured to use adjustment of a skew angle to cause adjustment of an angle of rotation of the traction planets of the CVT.

Passing now to FIGS. 22 and 23, a leg assembly 1051, which can be used with certain embodiments of a CVT equipped with a skew control system, will be described now. The leg assembly 1051 can include a leg 1053 having, on one end, a bore 1152 for receiving the planet axle 1046, and on another end, a slot 1154 to receive the shift cam roller 1052. A bore 1156 is formed generally perpendicular to the slot 1154 to retain an axle (not shown) for securing the shift cam roller 1052. A shift guide roller axle 1158 can be supported in a bore 1160 while being provided with clearance bores 1162 and 1164. The clearance bores 1162, 1164 facilitate proper coupling between shift guide rollers 1159 and skew reaction rollers 1161 and carrier plates 1040, 1042 during a shift of the speed ratio induced by a skew condition. The bores 1160, 1162, and 1164 are suitably configured to allow a swiveling or pivoting of the shift guide roller axle 1158 about substantially the center of the shift guide roller axle 1158. The skew reaction rollers 1161 and/or the shift guide rollers 1159 are preferably provided with a crowned, curved surface configured to interface with the carrier plates 1040, 1042 so that contact is insured between the skew reaction rollers 1161 and/or the shift guide rollers and the carrier plates 1040, 1042 during a shifting of the ratio of the CVT under a skew condition.

Passing to FIGS. 24-29 now, an alternative embodiment of a CVT 1002 will be described now. Before proceeding with the description of the CVT 1002, however, it will be helpful to refer back to the CVT 1000. In some embodiments of the CVT 1000, where the carrier 1040 is coupled rigidly to the main axle 1038, it is possible that the reference input nut 1062 can only turn about the longitudinal axis LA1 through an arc that is less than 360 degrees. Such a configuration might not be desirable in certain circumstances. In one embodiment, the CVT 1002 is configured to allow a reference input ring 1166 to rotate about the longitudinal axis LA1 through angles greater than 360 degrees. Such functionality allows for greater range and resolution in the control of the speed ratio.

The CVT 1002 is substantially similar to the CVT 1000, except in the following aspect which will now be described. To effect a speed ratio adjustment, the reference input ring 1166 is coupled to a feedback cam 1168. As depicted best in FIGS. 24 and 25, in one embodiment, the reference input ring 1166 and the feedback cam 1168 are one integral piece. A rotation of the reference input ring 1166 causes a rotation of the feedback cam 1168. The interaction between the feedback cam 1168 and the skew cam 1068 to induce a skew angle via the carrier plate 1042 is substantially similar as described above with reference to the CVT 1000.

To rotate the reference input ring 1166, a sun gear shaft 1170 is provided with a sun gear 1172, which is part of a planetary reference input 1174. The sun gear 1172 is coupled to a number of planet gears 1176, which are coupled to the reference input ring 1166 in a planetary gear configuration. A planet carrier 1178 of the planetary reference input 1174 is rigidly coupled to ground; hence, the planet carrier 1178 is constrained axially and rotationally relative to the longitudinal axis LA1. In one embodiment, the carrier plate 1040 is rigidly coupled to the planetary carrier 1178 via planetary axles 1180, which also serve to support the planet gears 1176. In some instances, the carrier plate 1040 can be coupled to the planetary carrier 1178 via a press fit or splines, for example. In some embodiments, a main axle 1182 can be adapted to couple rigidly to the planet carrier 1178 via the planetary axles 1180. Hence, the planetary carrier 1178, the carrier plate 1040, and the main axle 1182 are substantially constrained axially and prevented from rotation about the longitudinal axis LA1. In the embodiment shown in FIG. 24, the carrier plate 1040 is rigidly coupled to a carrier retainer cup 1184, which is the component of the carrier plate 1040 that is rigidly coupled to the planetary carrier 1178. One or more carrier cup bearings 1186 can be used to provide a rolling interface between the carrier retainer cup 1184 and an input driver 1188.

Referencing FIG. 27 now, in one embodiment, the main axle 1182 can be adapted with a mating flange 1190 having a number of circumferential mating splines 1192, which are configured to mate corresponding circumferential splines 1194 (see FIG. 25) of the planetary carrier 1178. Hence, in some embodiments, the anti-rotational coupling of the main axle 1182 to the planetary carrier 1178 is assisted by the mating splines 1192 and 1194. For certain applications, the main axle 1182 and the planetary carrier 1178 are coupled at raised extensions (similar to the splines 1192, 1194) in the space between the planet gears 1176. In such a configuration, the planet gears 1176 can be inserted between the openings adjacent to the coupling extensions.

Moving now to FIGS. 28 and 29, the feedback cam 1168 includes a threaded central bore 1196 adapted to allow mounting of the feedback cam 1168 about the main axle 1182 and to engage mating threads 1070 of the skew cam 1068. The feedback cam 1168 can include bearing races 1126, 1128. In one embodiment, the feedback cam 1168 is provided with a toothed portion 1198 for engaging the planet gears 1176. The toothed portion 1198 is preferably configured, in some embodiments, to allow axial translation of the feedback cam 1168 relative to the planet gears 1176, while simultaneously allowing the feedback cam 1168 to engage the planet gears 1176.

Referring now to FIGS. 30-35, a CVT 1004 can be configured similarly to the CVT 1000 and the CVT 1002; however, in some embodiments, the CVT 1004 includes a shift cam 1200 adapted to receive one or more anti-rotation rods 1204. To prevent rotation of the shift cams 1200, 1202 about the longitudinal axis LA1, the anti-rotation rods 1204 are coupled to the carrier plates 1040, 1042, which are configured to be substantially non-rotational relative to the longitudinal axis LA1. Of course, the carrier plate 1042 in some embodiments is configured to be capable of some angular rotation about the longitudinal axis LA1 to facilitate inducing a skew of the planet axles 1046; however, such an arrangement results only in a slight, operationally irrelevant, angular rotation of the anti-rotation rods 1204 about the longitudinal axis LA1. In one embodiment, in which the carrier plate 1204 is rotatable about the longitudinal axis LA1, the anti-rotation rods 1204 preferably are provided with an axial degree of freedom relative to the carrier plate 1204. Hence, in some embodiments, the anti-rotation rods 1204 are inserted in the shift cam 1200 and the carrier plate 1042 with radial and/or axial clearances to allow relative axial translation between the carrier plate 1042 and the anti-rotation rods 1204.

The CVT 1004 includes a feedback cam 1206 that couples to planet gears 1176 and that is operationally coupled to a skew cam 1208 and to the shift cam 1200. In one embodiment, the feedback cam 1206 and the shift cam 1200 are coupled through a threaded interface. In some embodiments, the feedback cam 1206 is configured to couple to the skew cam 1208 via a bearing 1210 and a skew cam slider 1212. The outer race of the bearing 1210 can be press fit, for example, to an inner bore of the feedback cam 1206. A clip provided in the inner bore of the feedback cam 1206 cooperates with a shoulder of the skew cam slider 1212 to constrain axially the bearing 1210. In some embodiments, a shoulder (not shown) can be provided on the feedback cam 1206 to axially capture the outer race of the bearing 1210 between the clip and the shoulder. The skew cam slider 1212 is mounted to a main axle 1214 via a sliding spline interface. The skew cam 1208 is axially constrained in the skew cam slider 1212 by, for example, a clip and the bearing 1210. In some embodiments, the skew cam 1208 can be provided with a shoulder that contacts the inner race of the bearing 1210.

During a speed ratio adjustment of the CVT 1004, mere rotation of the feedback cam 1206 causes translation of the shift cams 1200, 1202, but does not result in any movement of the skew cam slider 1212 or, consequently, the skew cam 1208. However, translation of the feedback cam 1206 drives axially the skew cam slider 1212, and thereby the skew cam 1208, via the bearing 1210. Translation of the skew cam 1208 results in an angular rotation of the carrier plate 1042 about the longitudinal axis LA1.

Figure 33:
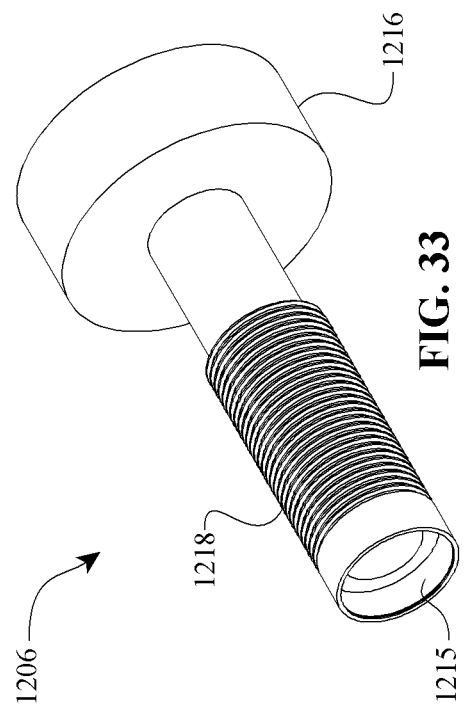
FIG. 33 is a perspective view of a feedback cam that can be used with the CVT of FIG. 30.
Figure 34:
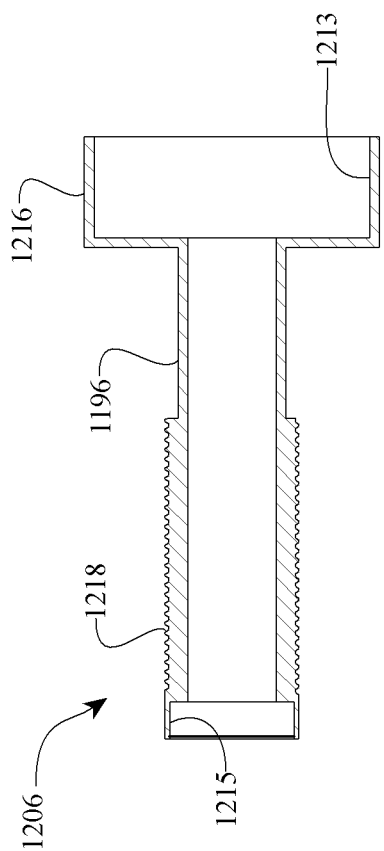
FIG. 34 is a cross-sectional view of the feedback cam of FIG. 33.

Referencing now FIGS. 33 and 34 specifically, in one embodiment, a feedback cam 1206 is generally a cylindrical, hollow body 1196 having a feedback cam flange 1216 adapted with an inner bore having a toothed portion 1213 configured to couple to planet gears 1176. That is, the feedback cam flange 1216 is capable of receiving and transmitting a rotating force. The feedback cam 1206 includes a threaded portion 1218 configured to couple with a corresponding threaded portion 1220 of the shift cam 1200. In some embodiments, the feedback cam 1206 exhibits a feedback cam counterbore 1215 adapted to receive, and facilitate the axial constraint, of the outer race of the bearing 1210.

Figure 35:
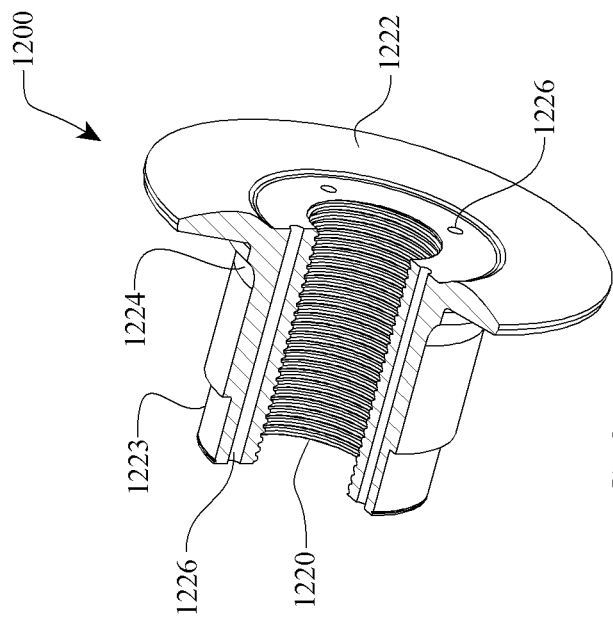
FIG. 35 is a partially sectioned, perspective view of a shift cam that can be used with the CVT of FIG. 30.

Passing now to FIG. 35, in one embodiment, a shift cam 1200 can be a generally cylindrical body with a threaded inner bore 1220 adapted to mate to the threaded portion 1218 of the feedback cam 1206. The shift cam 1200 is provided with a profiled surface 1222 for, in some embodiments, guiding the shift cam rollers 1052. In one embodiment, the profiled surface 1222 is adapted to cooperate with a surface of a leg of a planet-leg assembly. A bearing race 1224 can be formed into the shift cam 1200 for receiving bearings that support the traction sun 1026. In one embodiment, the shift cam 1200 is provided with a shoulder 1223 to receive the shift cam 1202. In some embodiments, one or more bores 1226 are arranged axially around the central bore 1220 to receive and support the anti-rotation rods 1204.

Figure 36:
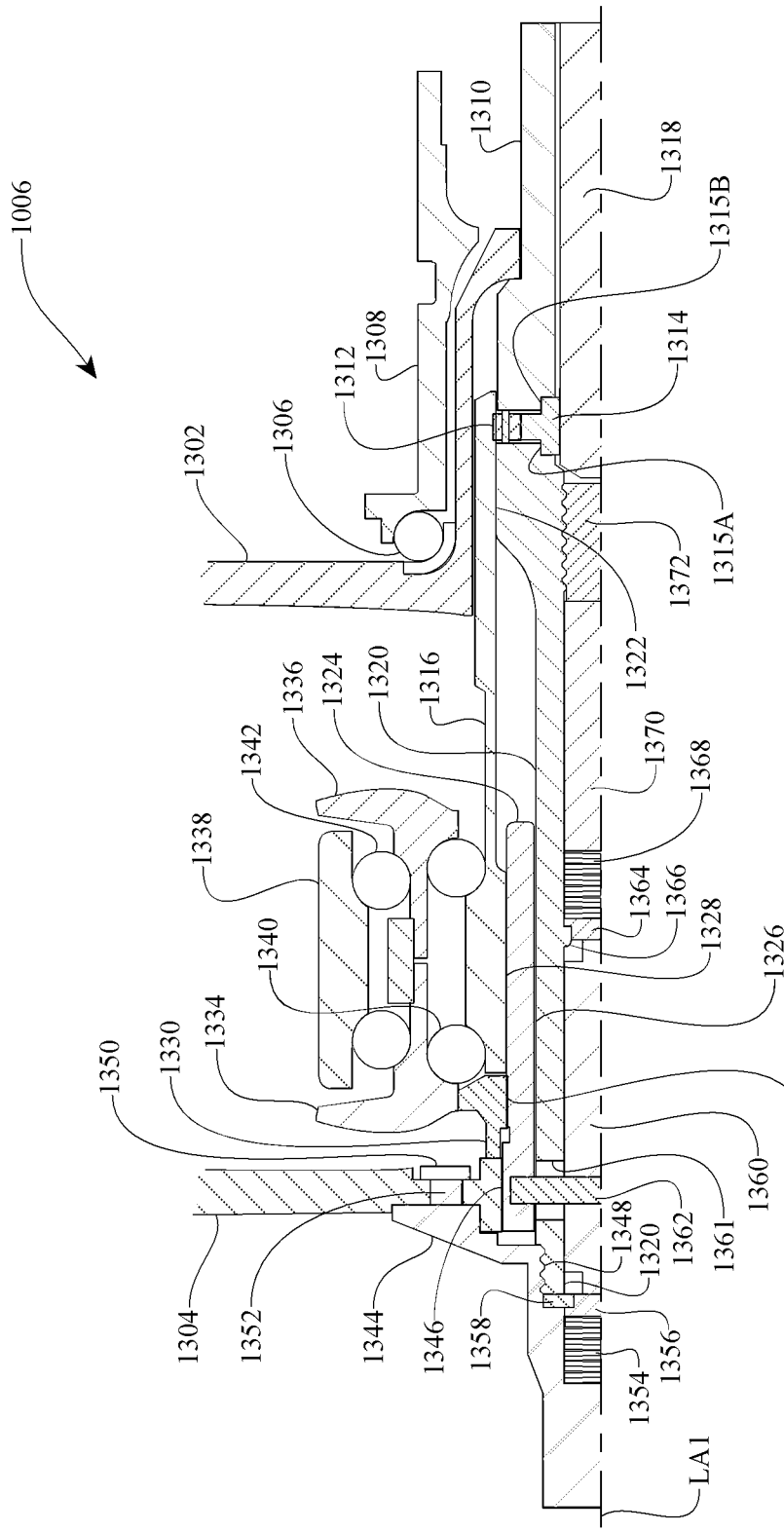
FIG. 36 is a cross-sectional view of certain components of an embodiment of a CVT having a skew-based control system and a neutralizer assembly.

Referencing FIG. 36 now, a CVT 1006 can include a first carrier plate 1302 and a second carrier plate 1304, both of which are substantially similar to the carrier plates 1040, 1042. The carrier plate 1302 can be configured to facilitate the use of a thrust bearing 1306 between the carrier plate 1302 and an input driver 1308. In one embodiment, the carrier plate 1302 is rigidly coupled to a planetary carrier 1310, which is configured to support a set of planetary gears 1312, which are operationally coupled to a sun gear 1314 and a feedback cam 1316. The carrier plate 1302, the planetary carrier 1310, the feedback cam 1316, and the sun gear 1314 are preferably mounted coaxially with the longitudinal axis LAL A sun shaft 1318 is placed radially inward of the planetary carrier 1310, and is operably coupled to the sun gear 1314.

Figure 25:
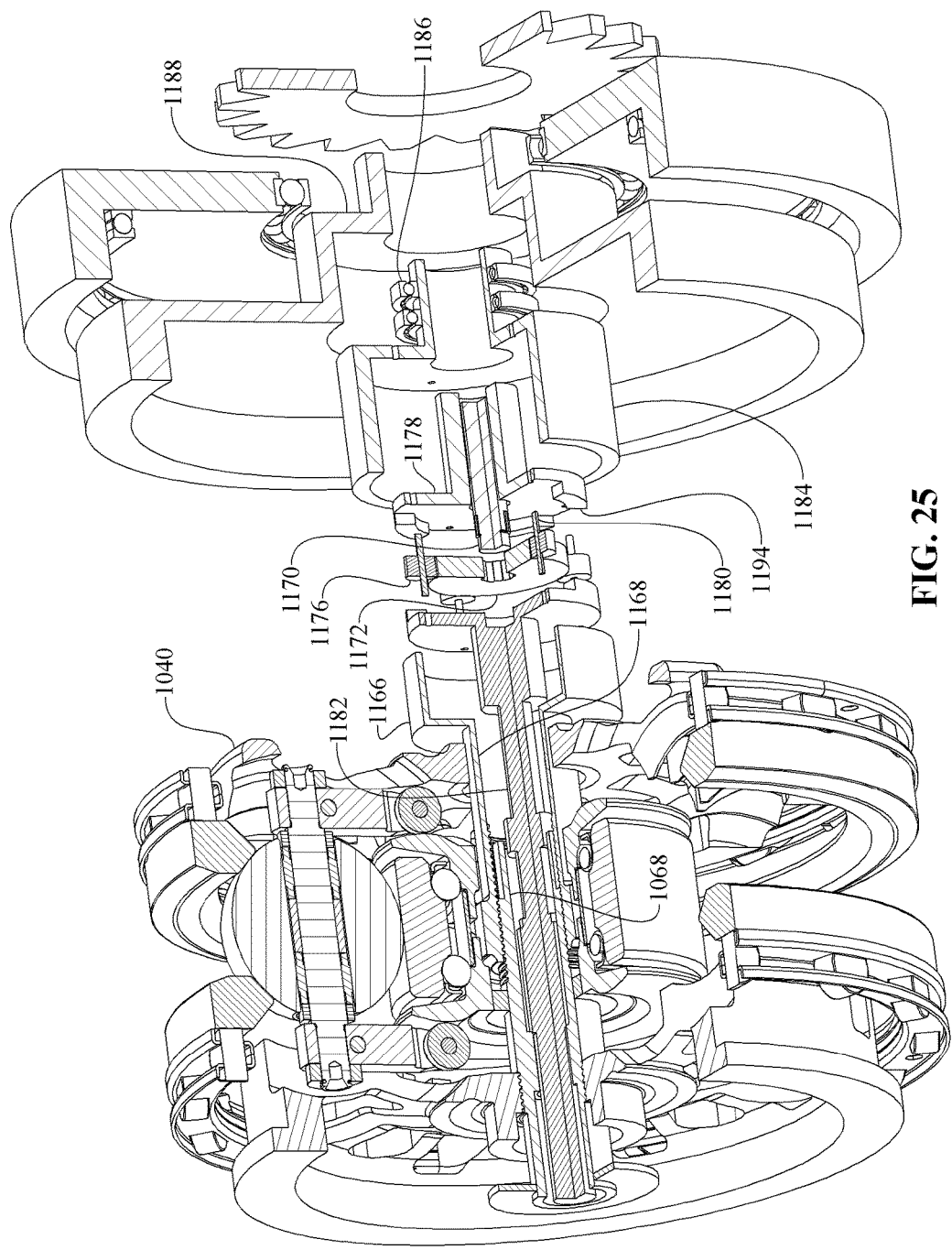
FIG. 25 is a partially sectioned and exploded view of certain components of the CVT of FIG. 24.
Figure 26:
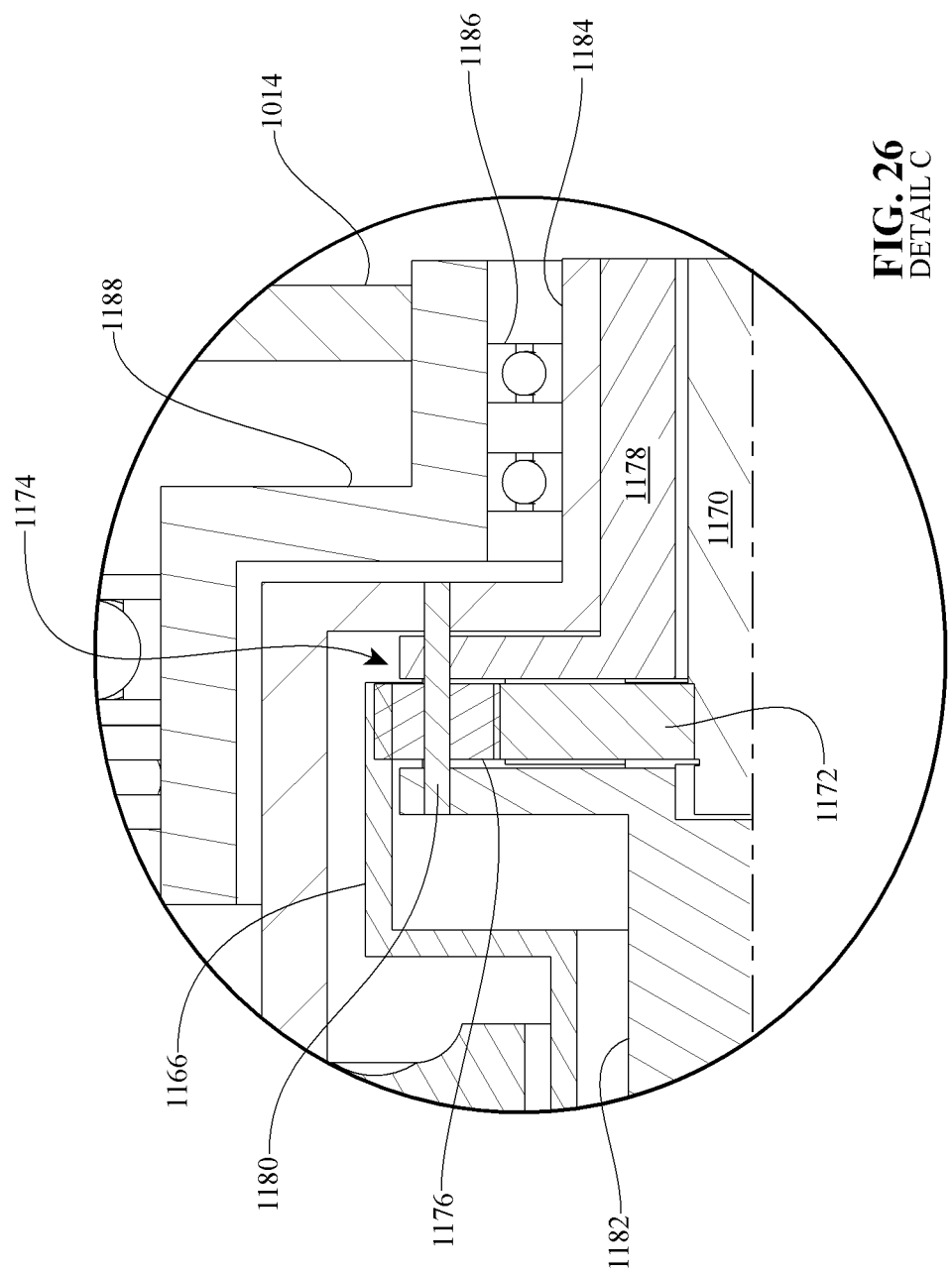
FIG. 26 is a Detail C view of the CVT of FIG. 24.
Figure 30:
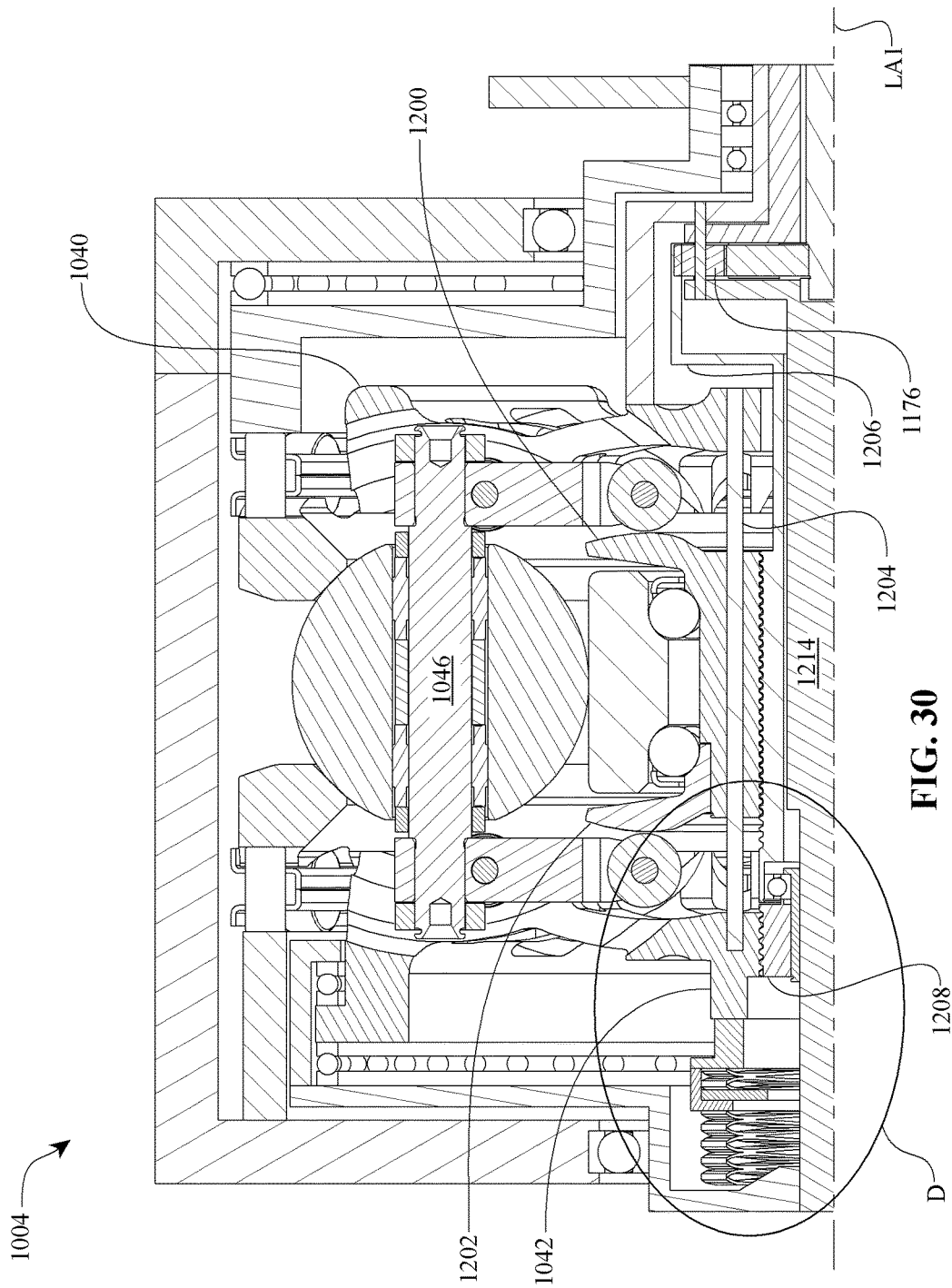
FIG. 30 is a cross-sectional view of a yet another embodiment of a CVT configured to use adjustment of a skew angle to cause an adjustment of the speed ratio.
Figure 31:
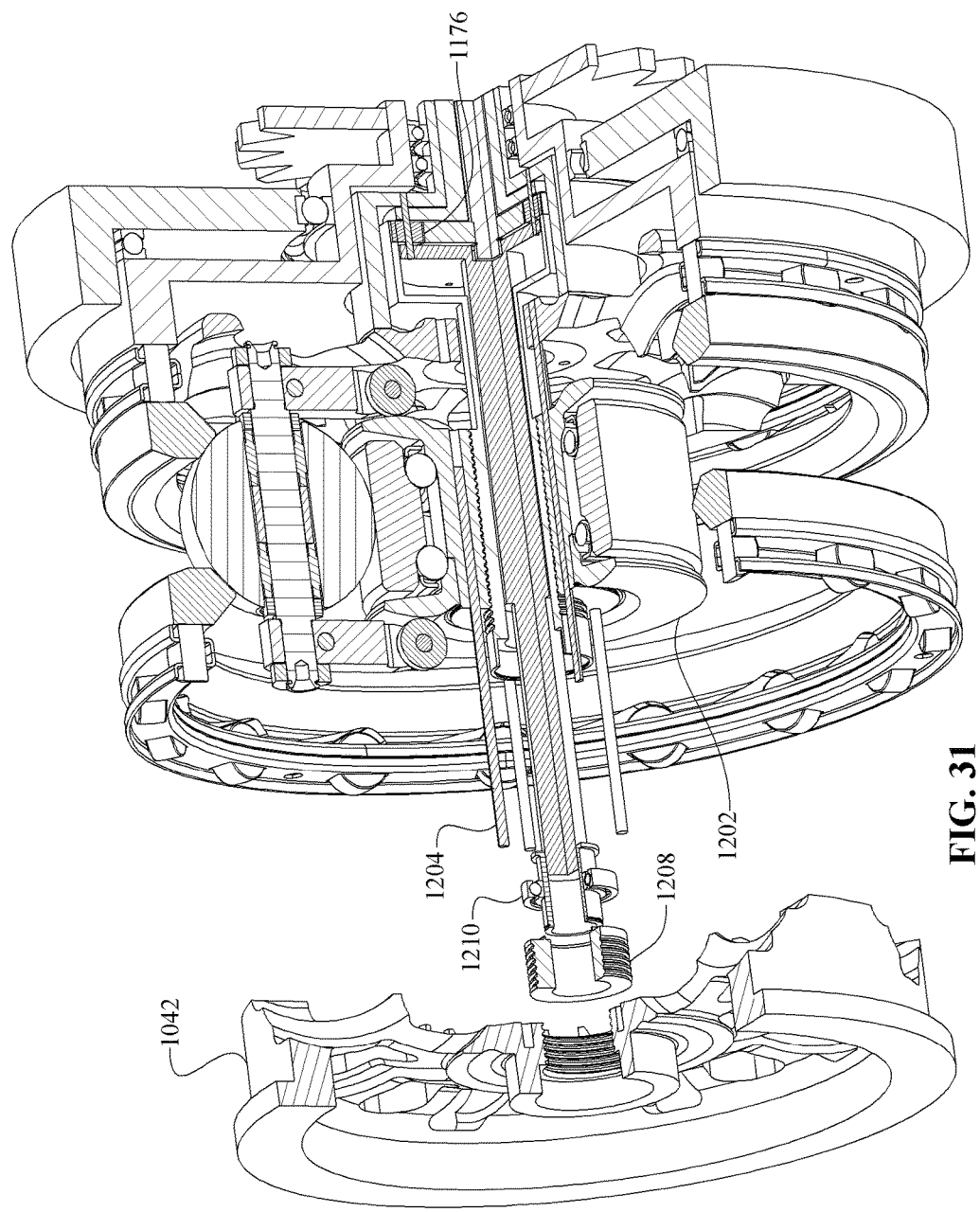
FIG. 31 is partially sectioned and exploded view of certain components of the CVT of FIG. 30.
Figure 32:
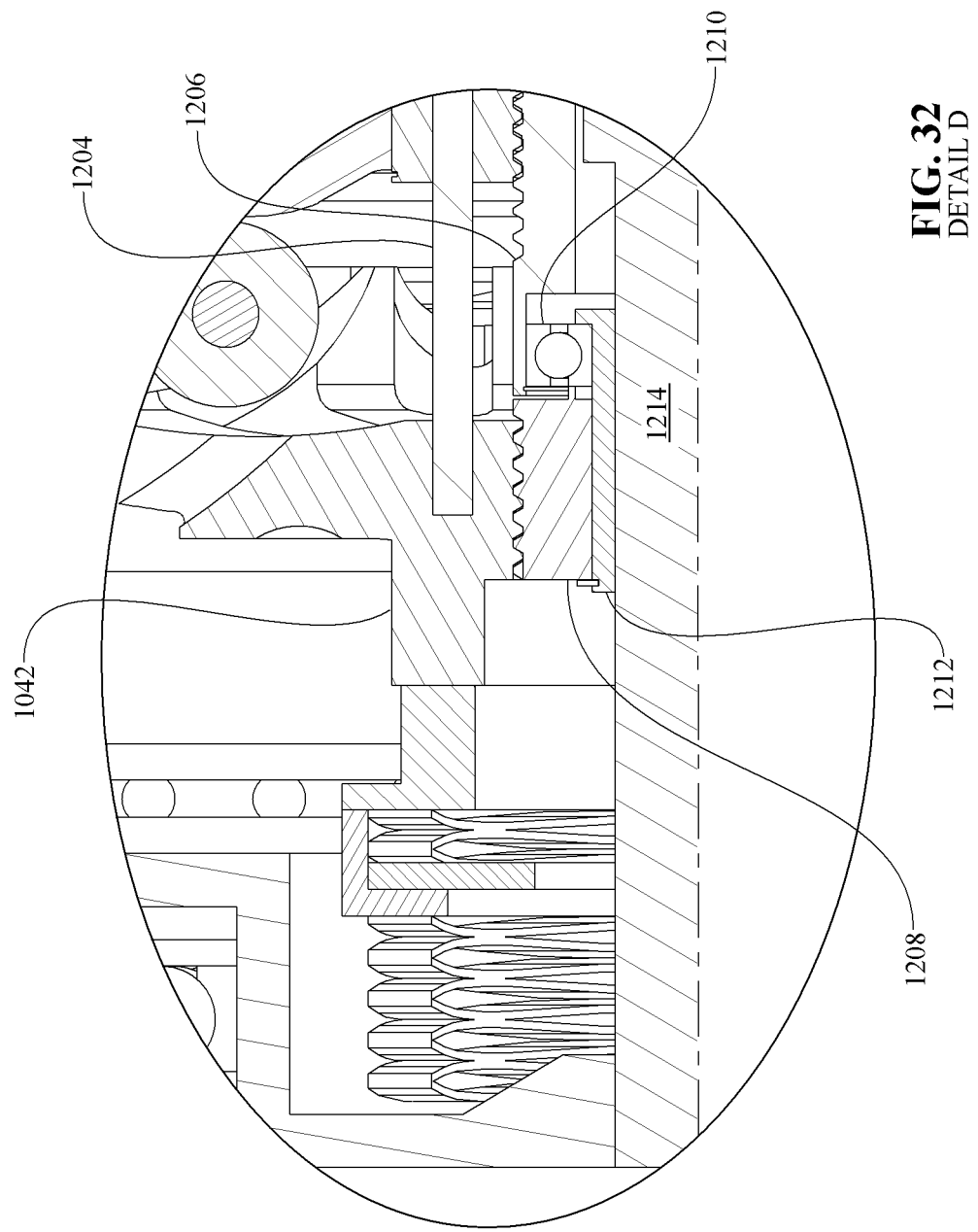
FIG. 32 is a Detail D view of the CVT of FIG. 30.

A main axle 1320 is coupled to the planetary carrier 1310, which planetary carrier 1310 can be substantially similar to the planetary carrier 1178 of FIGS. 25 and 26. In some embodiments, the main axle 1320 can be provided with an interface 1322 for supporting the feedback cam 1316. In one embodiment, the interface 1322 is a sliding bearing interface, but in other embodiments, the interface 1322 can be a clearance fit between the main axle 1320 and the feedback cam 1316. As illustrated in FIG. 36, in one embodiment, the main axle 1320 and the planetary carrier 1310 can be configured to facilitate axial constraint of the sun gear 1314. Hence, the main axle 1320 and/or the carrier 1310 can be provided with shoulders or recesses 1315A and 1315B, respectively, that aid in maintaining the axial position of the sun gear 1314.

In one embodiment, the main axle 1320 is coupled to a skew cam 1324 via, for example, a sliding spline interface 1326. Hence, the main axle 1320 and the skew cam 1324 can be provided with mating sliding splines. The skew cam 1324 is coupled to the feedback cam 1316 by, for example, a threaded interface 1328. Thus, in some embodiments, the skew cam 1324 and the feedback cam 1316 include mating threaded portions. In some embodiments, the skew cam 1324 is coupled to a shift cam anti-rotation retainer 1330 via an anti-rotation coupling 1332, which can be a sliding spline, for example. The shift cam anti-rotation retainer 1330 can be coupled to, or be integral with a shift cam 1334, which is substantially similar to the shift cam of FIG. 6, for example. The shift cam 1334 and a shift cam 1336 are operably coupled to the feedback cam 1316 and to a traction sun 1338 via, respectively, a first thrust bearing 1340 and a second thrust bearing 1342. The skew cam 1324 is preferably coupled to the carrier plate 1304 by an interface 1346, which can be a high lead, threaded coupling, in which case the skew cam 1324 and the carrier plate 1304 can be provided with mating high lead threads.

In one embodiment, the main axle 1320 can be fixed to ground by the planetary carrier 1310 and a carrier plate retainer 1344. Hence, the main axle 1320, the planetary carrier 130, and the carrier plate retainer 1344 are fixed axially, rotationally, and radially relative to the longitudinal axis LA1. Consequently, the skew cam 1324, the anti-rotation retainer 1330 and the shift cams 1334, 1336 are configured to be non-rotatable about the longitudinal axis LA1. In some embodiments, the anti-rotation retainer 1330 is provided with an extension (shown but no labeled) adapted to butt up against the carrier plate 1304, and thus, provide a limit stop when shifting the CVT 1006. In one embodiment, the carrier plate retainer 1344 threads to the main axle 1320 via a threaded interface 1348. The carrier plate retainer 1344 can be adapted to receive a carrier retaining bolt 1350 that is configured to cooperate with the carrier plate retainer 1344 to constrain axially the carrier plate 1304. In some such embodiments, the carrier plate 1304 can be provided with a carrier slot 1352 that allows the carrier plate 1304 to rotate angularly about the longitudinal axis LA1 in a plane perpendicular to said axis. Of course, it is preferable to ensure that the interfaces between the carrier plate 1304, the carrier plate retainer 1344, and the carrier retaining bolt 1350 minimize friction while allowing the carrier plate 1304 to rotate relative to the carrier plate retainer 1344 and the carrier retaining bolt 1350. In one embodiment, the carrier plate 1304 and/or the carrier plate retainer 1344 are provided with, for example, shoulders and/or recesses to provide radial support for the carrier plate 1304.

To adjust the speed ratio of the CVT 1006, a rotation of the sun shaft 1318 causes a rotation of the feedback cam 1316 via the sun gear 1314 and the planetary gears 1312. As previously discussed with reference to FIGS. 6 and 24, rotation of the feedback cam 1316 causes a translation of the feedback cam 1316, when the skew cam 1324 does not translate, or causes a translation of both the feedback cam 1316 and the skew cam 1324, when the shift cams 1334, 1336 and the traction sun 1338 are under clamp loads. Through the interface 1346, translation of the skew cam 1324 imparts an angular rotation of the carrier plate 1304; thereby inducing the CVT 1006 into a skew condition, or conversely, restoring the carrier plate 1304 to a different or zero skew condition. As explained above, the inducement of a skew condition can result in an adjustment of the speed ratio of a CVT.

In one embodiment, the CVT 1006 can be provided with a side force neutralizer mechanism. In the embodiment of FIG. 36, a side force neutralizer can include a first resistance member 1354 mounted coaxially about the longitudinal axis LA1. The first resistance member 1354 can be, for example, one or more springs. In some embodiments, the first resistance member 1354 is arranged about the longitudinal axis LA1, but is not necessarily concentric with the longitudinal axis LA1. A first reaction ring 1356 is placed adjacent to the first resistance member 1354, and is mounted coaxially about the longitudinal axis LA1. A clip or shim 1358 is configured to provide an axial constraint for the first reaction ring 1356. Hence, the first reaction ring 1356 is moveable axially against the first resistance member 1354, but the first reaction ring 1356 cannot move axially past the shim 1358. In one embodiment, the shim 1358 is aligned axially and radially by the carrier plate retainer 1344 and the main axle 1320. As shown, in some embodiments, the first resistance member 1354, the first reaction ring 1356, and the shim 1358 are housed, at least partially, by one or both of the main axle 1320 and the carrier plate retainer 1344.

The main axle 1320 can be adapted to receive and support a pin carrier 1360 that is configured to receive and support a skew cam pin 1362. The pin carrier 1360 has a first end that engages the first reaction ring 1356 and a second end that engages a second reaction ring 1364. The pin carrier 1360 is provided with a substantially lateral bore configured to receive and support the skew cam pin 1362 by, for example, a press fit. The pin carrier 1360 is configured to mate with the main axle 1320 either by a clearance fit or through a sliding fit, for example. The main axle 1320 can be provided with a slot 1361 for facilitating the coupling of the skew cam pin 1362 to the skew cam 1324. The skew cam pin 1362 can facilitate an axial translation of the skew cam 1324. As shown in FIG. 36, the main axle 1320 can be provided with a retaining stop 1366 configured to prevent axial translation of the second reaction ring 1364 in one direction. Adjacent to the second reaction ring 1364, in contact therewith, and mounted coaxially (in some embodiments) about the longitudinal axis LA1, there can be a second resistance member 1368, which can be one or more springs. In one embodiment, a spacer 1370 can be positioned between the second resistance member 1368 and a preload adjuster 1372. The spacer 1370 primarily provides a coupling between the second resistance member 1368 and the preload adjuster 1372. In some embodiments, the preload adjuster 1372 can be a set screw, for example. The pin carrier 1360, the second reaction ring 1364, the second resistance member 1368, the spacer 1370, and the preload adjuster 1372 are mounted coaxially about the longitudinal axis LA1 and are axially movable; however, the axial movement of the first and second reaction rings 1356, 1364 is limited by, respectively, the shim 1358 and the retaining stop 1366.

The first resistance member 1354, the second resistance member 1368, the spacer 1370, and the set screw 1372 are preferably selected to provide a suitable preload and/or desired resistance response characteristic for overcoming the tendency of the side force to act upon the skew cam 1324 and induce a non-zero skew condition. During operation, an axial translation of the skew cam 1324 will tend to be resisted by the first and the second resistance members 1354, 1368. As the skew cam 1324 translates leftward (on the orientation of the page), the skew cam 1324 acts upon the skew cam pin 1362. This action translates the pin carrier 1360 axially, which engages the first reaction ring 1356. The first resistance member 1354 resists translation of the first reaction ring 1356. As the skew cam 1324 translates rightward, in a similar fashion, the skew cam 1234 operably engages the second reaction ring 1368, which is resisted by the second resistance member 1368. It should be noted that the action of the first and second resistance members 1354, 1368 is decoupled (that is, independent of one another) through the axial constraints provided by the shim 1358 and the retaining stop 1366.

To recap some of the disclosure above, in one embodiment, the main axle 1320 includes at least some of the following aspects. The central bore is adapted to receive the pin carrier 1360. The central bore can exhibit the retaining stop 1366, as well as, the threaded portion for receiving the preload adjuster 1372. The main axle 1320 preferably includes the slot 1361 adapted to allow passage of the skew cam pin 1362 from inside the main axle 1320 to an exterior space of the main axle 1320. An exterior diameter of the main axle 1320 can include the first threaded interface 1348 for rigidly coupling to a grounded member, such as the carrier plate retainer 1344. The exterior diameter of the main axle 1320 can further include a sliding spline portion for engaging a mating sliding spline of the skew cam 1324. The skew cam 1324 can be a tubular body having an inner diameter and an outer diameter. The inner diameter of the skew cam 1324 can be provided with a recess (shown but not labeled) for receiving the skew cam pin 1362. The inner diameter of the skew cam 1324 can include a splined portion for engaging corresponding splines of the main axle 1320. A portion of the exterior diameter of the skew cam 1324 can be provided with a high lead threaded portion for engaging a mating threaded portion of the carrier plate 1304. The skew cam 1324 can include a threaded portion, of relatively low lead when compared to the high lead portion, for engaging a similarly threaded portion of the feedback cam 1316. In some embodiments, the skew cam 1324 is adapted with a sliding spline portion on its outer diameter to engage a corresponding sliding spline of the anti-rotation retainer 1330.

Turning to FIGS. 37 and 38 now, a CVT 1008 is similar to the CVT 1006 in many respects. However, the CVT 1008 is provided with an alternative side force neutralizer. Those components of the CVT 1008 that are substantially similar to components of the CVT 1006 will not be specifically addressed in detail in the following discussion. The CVT 1008 includes the first carrier plate 1302 that is rigidly coupled to the planetary carrier 1310. An input driver 1308 can be supported by, and reacted by, the first carrier plate 1302 through a bearing 1306. A planetary reference input 1410 can be coupled to a feedback cam 1316. The planetary reference input 1410 can be as previously described with reference to FIGS. 24 and 36, for example. A skew cam 1325 couples, similarly as previously described with reference to FIG. 36, to the feedback cam 1316, the anti-rotation retainer 1330, and the carrier plate 1304. The skew cam 1325 can also couple to a main axle 1404 in a substantially similar manner as the skew cam 1324 of FIG. 36 couples to the main axle 1320.

Referencing FIG. 38 more specifically, the CVT 1008 can be provided with a side force neutralizer that includes a first resistance member 1355 mounted coaxially with the longitudinal axial LA1 and the main axle 1404. A flange 1402 of the main axle 1404 is rigidly coupled to a flange extension 1406, which is rigidly coupled to a shoulder stop 1408. A translating cup 1412 mounts coaxially with the main axle 1404 and is placed radially inward of the flange extension 1406. In one embodiment, the translating cup 1412 contacts the flange 1402 and has a clearance fit relative to the flange extension 1406. In some embodiments, a translating cup cap 1414 can be rigidly coupled to the translating cup 1412, thereby forming a holding space for the first resistance member 1355. The skew cam 1325 can be provided with a catch 1416 adapted to engage the translating cup 1412. In some embodiments, the first resistance member 1355 is positioned between the catch 1416 and the translating cup cap 1414 or the flange 1402. A second resistance member 1369 can be mounted coaxially about the main axle 1404 and can be positioned between the translating cup 1412 and the shoulder stop 1408.

In operation, axial translation of the skew cam 1325 toward the carrier plate 1302 is resisted by the first resistance member 1355, as the first resistance member 1355 is reacted by the translating cup cap 1414 and/or the flange 1402. It should be recalled that the main axle 1404 can be fixed to ground; hence, the main axle 1404 can be configured to not translate axially. As the skew cam 1325 translates axially toward the carrier plate 1304, the second resistance member 1369 tends to resist this axial movement of the skew cam 1324A, since the second resistance member 1369 is supported by the shoulder stop 1408, which is rigidly coupled to the main axle 1404 through the flange extension 1406. The resistance members 1355, 1369 are preferably selected to provide desired characteristics in overcoming the effects of the side force upon the skew cam 1325. It should be noted that in some embodiments the interface between the feedback cam 1316 and the flange extension 1406, as well as the interface between the translating cup 1412 and the flange extension 1406, are suitably configured to minimize sliding friction.

Passing to FIGS. 39 and 40 now, a CVT 1009 is substantially similar in various respects to the CVTs 1006 and 1008. In one embodiment, a skew cam 1502 couples rigidly to an extension sleeve 1504 of a neutralizer 1506, which is generally shown in Detail F. In some embodiments, the neutralizer 1506 includes a resistance member locator 1508 that is adapted to receive the first and second resistance members 1357, 1371. The resistance member locator 1508 is preferably rigidly coupled to a main axle 1510, and is mounted coaxially therewith. In one embodiment, the first resistance member 1357 is mounted coaxially with the main axle 1510, and is located axially between a flange 1402 of the main axle 1510 and a first resistance ring or a shim 1512. The first resistance member 1357 and the first resistance ring 1512 are received in a recess formed by the main axle 1510 and a stop shoulder 1514 of the resistance member locator 1508. The second resistance member 1371 can be located axially between a stop cap 1516 of the resistance member locator 1508 and a second resistance ring or shim 1518. In some embodiments, the second resistance member 1371 and the second resistance ring 1518 are mounted coaxially with the main axle 1510. A catch flange 1520 of the extension sleeve 1504 is positioned between the first and second resistance rings 1512, 1518. The stop shoulder 1514 is suitably configured to provide an axial stop for the first and second resistance rings 1512, 1518 in at least one axial direction. The stop shoulder 1514 constrains axial translation of the first resistance ring 1512 in a first direction, and the stop shoulder 1514 constrains axial translation of the second resistance ring 1518 in second direction.

During operation, as the skew cam 1502 translates towards the carrier plate 1302, the first resistance member 1357 tends to oppose the translation of the skew cam 1502 through the operational coupling between the skew cam 1502 and the first resistance member 1357 via the first resistance ring 1512, the catch flange 1520, and the extension sleeve 1504. Similarly, as the skew cam 1502 translates toward the carrier plate 1304, the second resistance member 1371 tends to oppose the translation of the skew cam 1502 through the operational coupling between the skew cam 1502 and the second resistance member 1371 via the second resistance ring 1518, the catch flange 1520, and the extension sleeve 1504. It should be noted that as the catch flange 1520 acts upon either one of the first and second resistance rings 1512, 1518, the other one of the first and second resistance members 1357, 1371 is not engaged or energized. Hence, the actions of the first and second resistance members 1357, 1371 are decoupled. Preferably, the first and second resistance members 1357, 1371 are suitably selected to provide the desired response characteristics to move the skew cam 1502 to a position corresponding to a CVT skew condition of nominal zero skew angle.

It should be noted that the neutralizer 1506 need not employ all of the components described above. For example, in some embodiments, the first resistance member 1357 and the first resistance ring 1512 can be provided as a suitable configured single piece component that performs the desired resistance function as it engages the catch flange 1520. As shown best in FIG. 39, in some embodiments, the neutralizer 1506 is housed at least partially in a bore of the feedback cam 1316.

Referring now to FIGS. 41-45, a CVT 4100 can be configured in various respects similarly to the CVT 1000 and the CVT 1002. In some embodiments, the CVT 4100 includes a control reference assembly 4300, which will now be discussed. In one embodiment, a control reference nut 4302 is coaxially located with a main shaft 4135 and is coupled to an intermediate reaction member 4304. Spring members 4306 and 4308 provide bidirectional spring support between the control reference nut 4302 and the intermediate reaction member 4304. An adjustment in one direction of the control reference nut 4302 tends to energize torsionally the spring member 4306 and an adjustment in the other direction tends to energize torsionally the spring member 4308. Once energized, the spring member 4306 or 4308 exerts a force on the intermediate reaction member 4304 and thereby exerts force onto a feedback cam 4102 until an adjustment in tilt angle is achieved. Some operating conditions of CVT 4100 generate forces that tend to resist the adjustment of the feedback cam 4102, and consequently, those forces also resist adjustment of the control reference nut 4302. The feedback cam 4102 is substantially similar to the feedback cam 1206. In some embodiments, it is preferable to minimize the, or limit the maximum, effort required to adjust the control reference nut 4302. In the embodiment shown in FIG. 41, the control reference assembly 4300 facilitates the adjustment of the control reference nut 4302 even in the presence of high resistance on the feedback cam 4102.

In one embodiment of the control reference assembly 4300, the spring members 4306 and 4308 are torsion springs formed with legs 4322, 4324 and 4326, 4328, respectively, that are operationally connected to the control reference nut 4302 and the intermediate reaction member 4304. The leg 4322 is rotatably constrained in one direction by a shoulder 4320 on the control reference nut 4302. The leg 4324 is rotatably constrained in two directions by a bore 4330 formed on the intermediate reaction member 4304. Similarly, the leg 4328 is constrained by a shoulder 4315 in one direction, and the leg 4326 is constrained in two directions by a bore 4332 (see FIG. 45) formed on the intermediate reaction member 4304.

Referencing FIG. 44 more specifically now, in one embodiment the control reference nut 4302 is a generally cylindrical body with an outer ring 4312 adapted to couple to an adjustment interface (not shown) such as a cable pulley or other actuator. First and second recesses 4316 and 4318 are formed on the inner diameter of the control reference nut 4302 to receive and retain, for example, the torsion spring 4308. Similarly, first and second recesses 4317 and 4319 are adapted to receive and retain the torsion spring 4306. In one embodiment, the recess 4318 is formed on substantially half of the perimeter of the inner diameter, and on a first end, of the control reference nut 4302. The recess 4318 facilitates the retention of the leg 4322 in one direction and provides clearance for the leg 4322 in the opposite direction. The recess 4317 is formed on a second end of the inner diameter of the control reference nut 4302. The recesses 4317 and 4318 provide a degree of freedom to the legs 4322 and 4328 that facilitates the energizing of one spring member 4306, 4308 while the other spring member 4306, 4308 is allowed to rotate without being energized.

Passing now to FIGS. 42 and 45, in one embodiment the intermediate reaction member 4304 can be a generally cylindrical body having a splined inner bore 4310 that mates, for example, to the feedback cam 4102. A first and a second retention bore 4330 and 4332 can be formed on the outer diameter of the intermediate reaction member 4304. The retention bores 4330, 4332 can receive the legs 4324 and 4326. To axially retain the spring members 4306 and 4308, respective first and second shoulders 4334 and 4335 are, in some embodiments, coupled to the outer diameter of the intermediate reaction member 4304.

Figure 41:
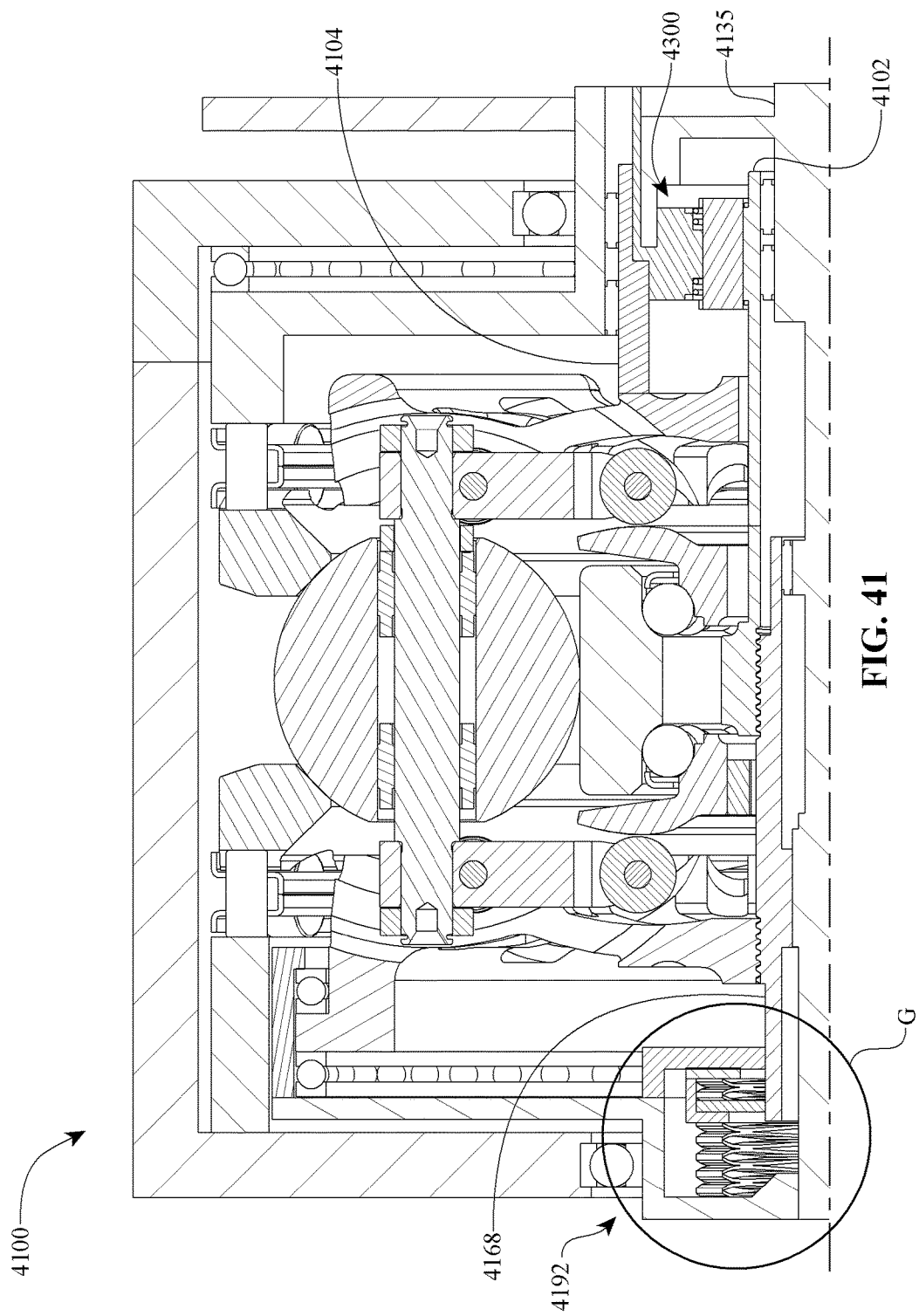
FIG. 41 is a cross-section view of one more embodiment of a CVT having a skew-based control system and a neutralizer assembly.
Figure 47:
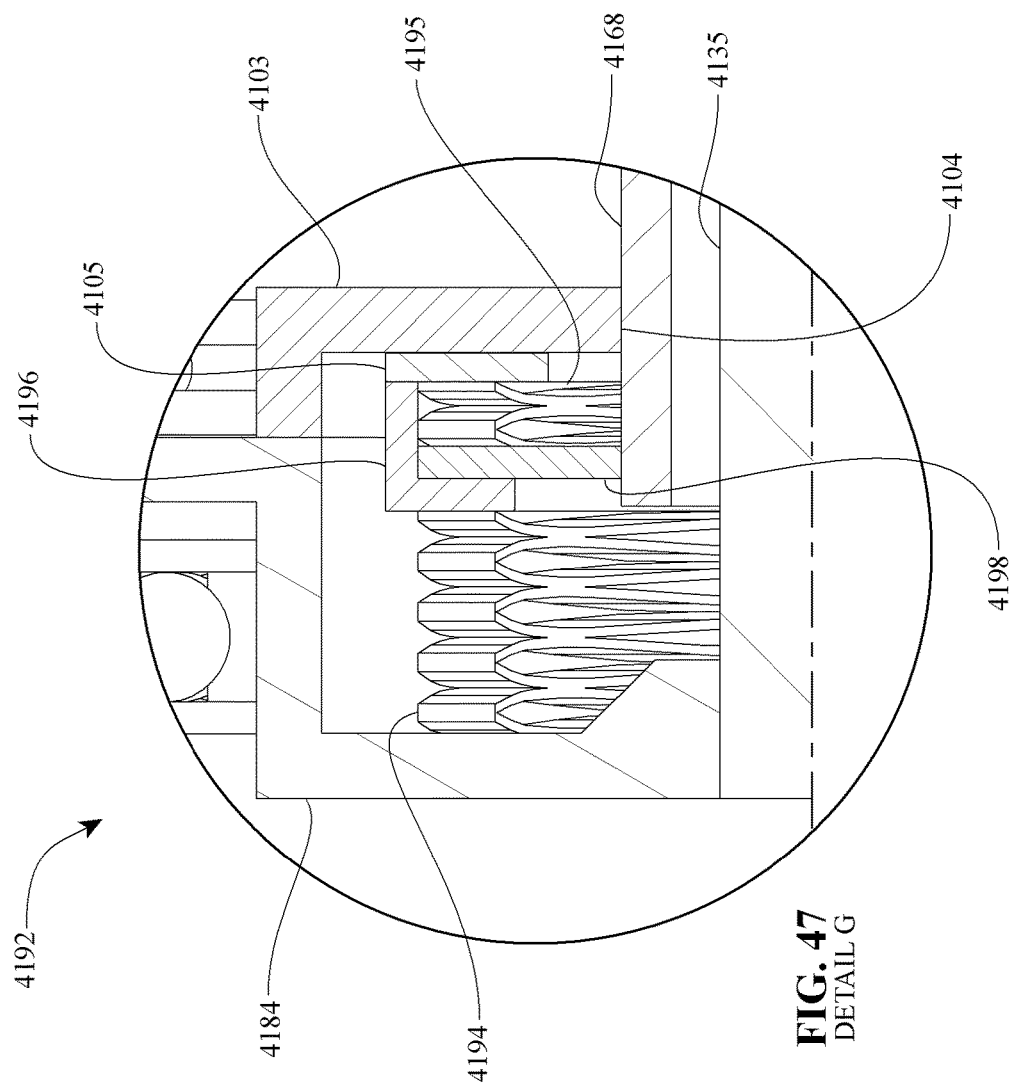
FIG. 47 is a Detail G view of the CVT of FIG. 41.

In one embodiment, the CVT 4100 can be provided with a side force neutralizer assembly 4192, an embodiment of which is generally shown in Detail G view of FIGS. 41 and 47. In some embodiments, the neutralizer 4192 includes a first resistance member 4194 positioned between an axial resistance plate 4184 and a translating resistance cup 4196. The axial resistance plate 4184 is rigidly coupled to a main shaft 4135. The first resistance member 4194 and the translating resistance cup 4196 are mounted adjacent to one another and coaxially about the longitudinal axis LA1. A neutralizer reaction flange 4198 can be coupled to a skew cam 4168. The neutralizer reaction flange 4198 is positioned adjacent to the translating resistance cup 4196. A second resistance member 4195 is positioned between the neutralizer reaction flange 4198 and a neutralizer stop cap 4105 that can be rigidly mounted to the translating resistance cup 4196, all of which are mounted coaxially about the longitudinal axis LA1. The neutralizer stop cap 4105 is axially constrained by, for example, a neutralizer retainer plate 4103 that is preferably rigidly coupled to the axial retainer plate 4184 and provided with a sliding interface 4104.

Figure 48:
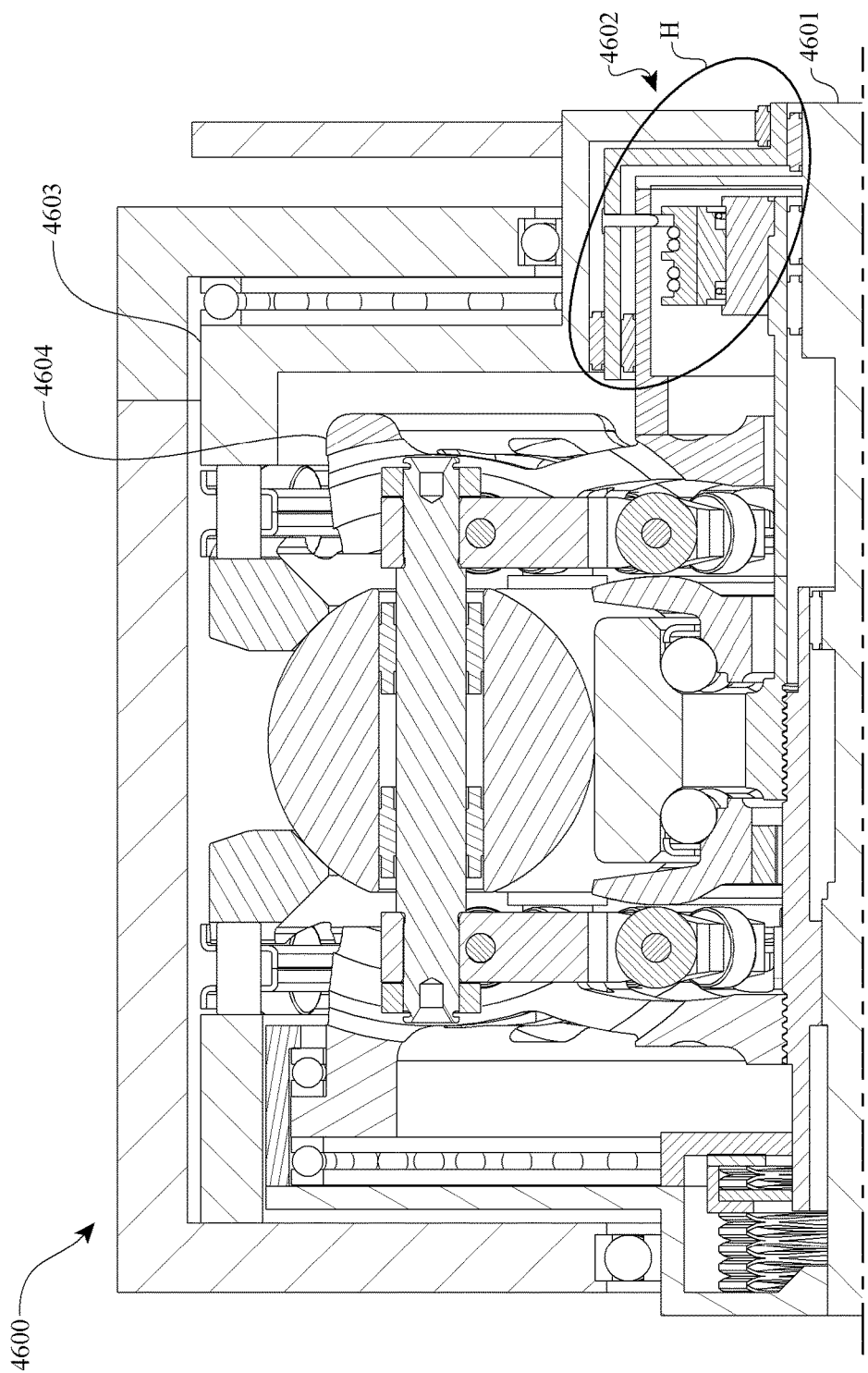
FIG. 48 is a cross-sectional view of another embodiment of a CVT having a skew-based control system.
Figure 49:
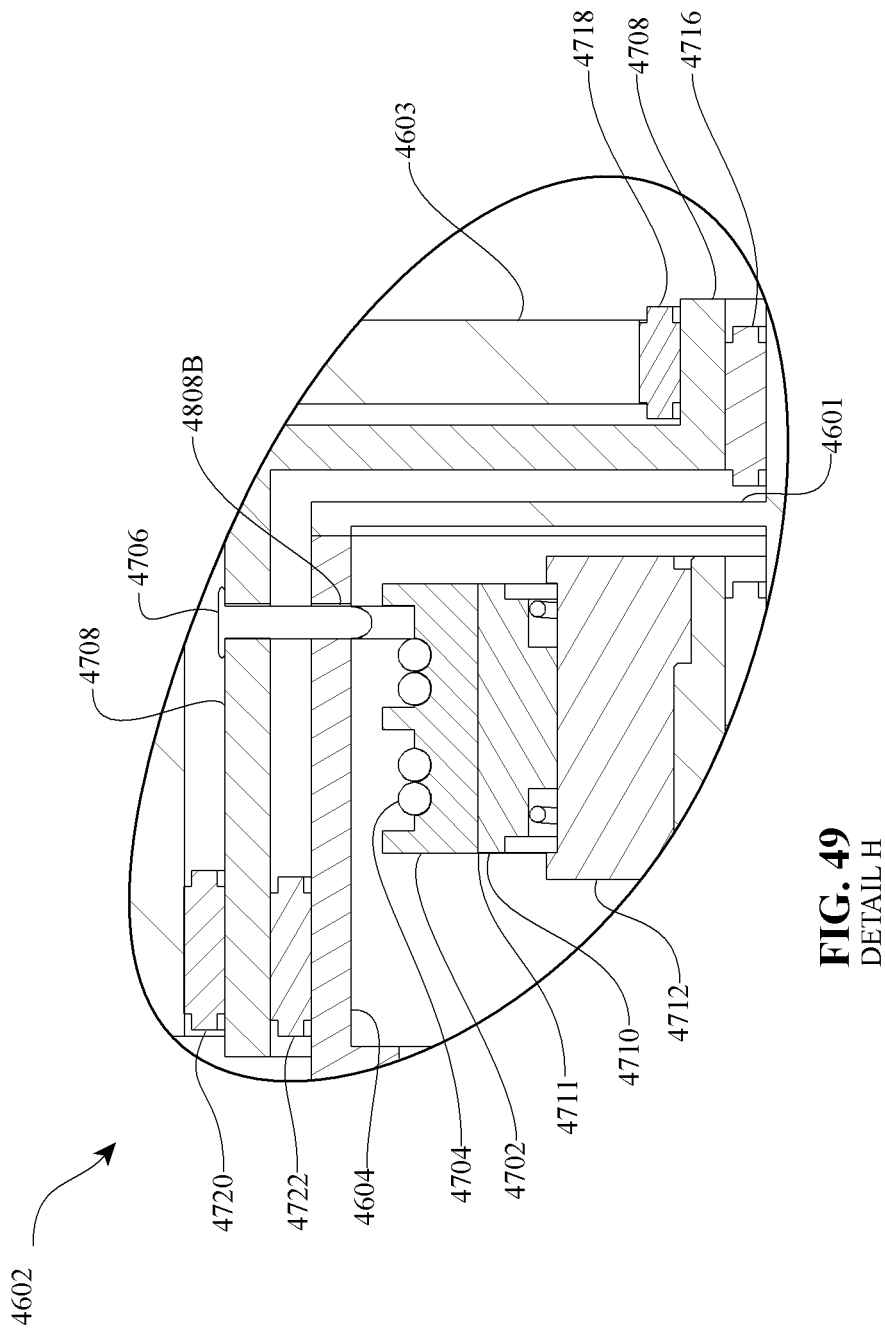
FIG. 49 is a Detail H view of the CVT of FIG. 48.
Figure 50:
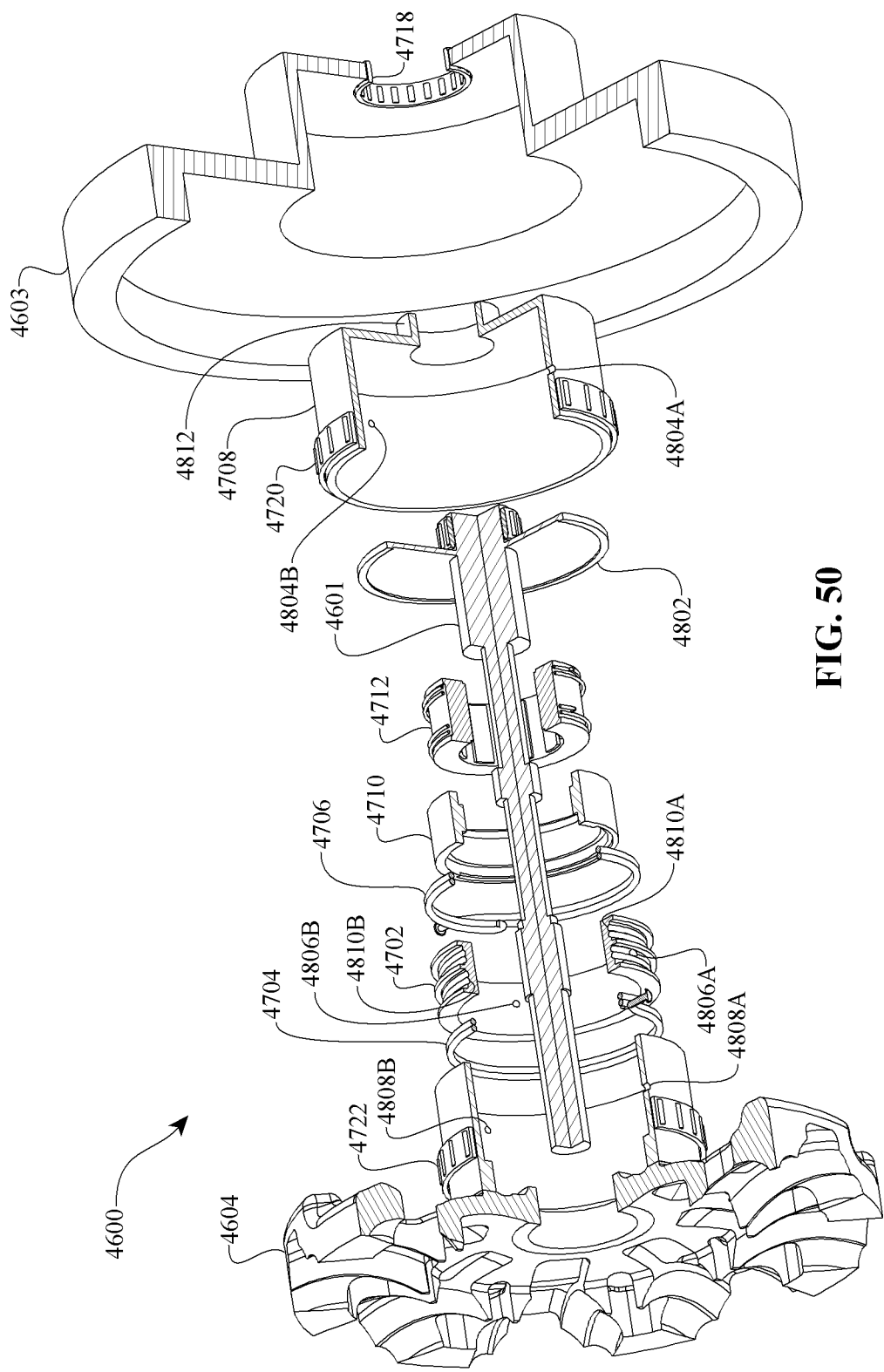
FIG. 50 is a partially cross-sectioned exploded view of certain components of the CVT of FIG. 48.
Figure 51A:
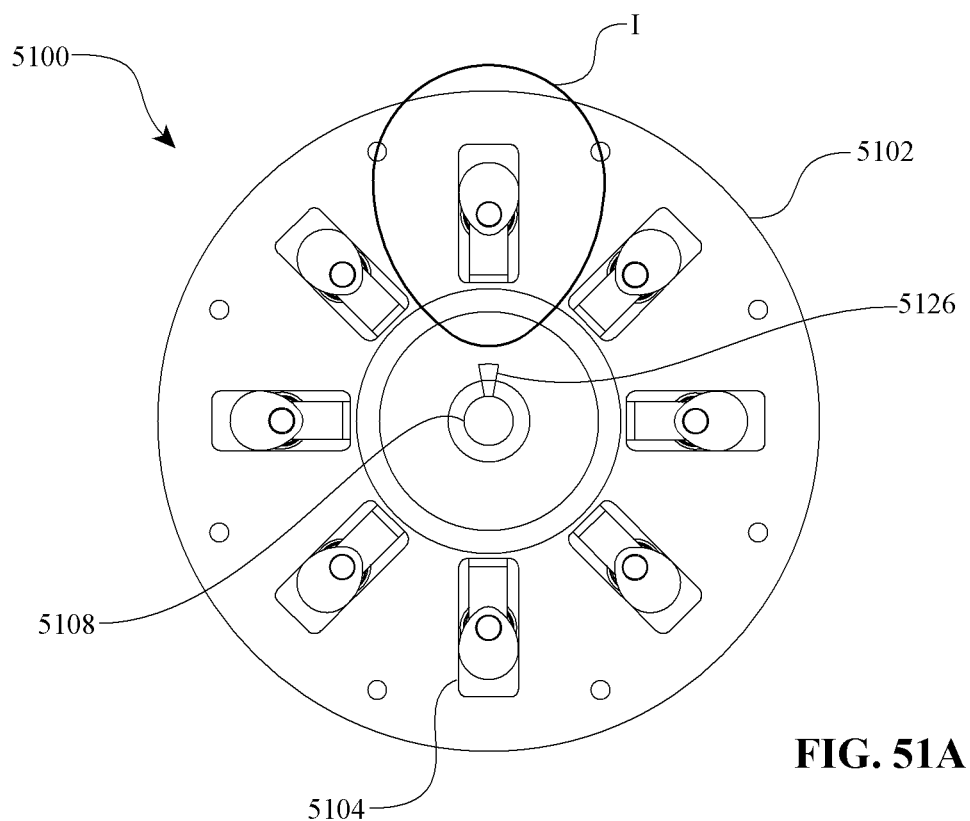
FIG. 51A is a plan view of certain components of an embodiment of a CVT having an inventive skew-based control system.
Figure 51B:
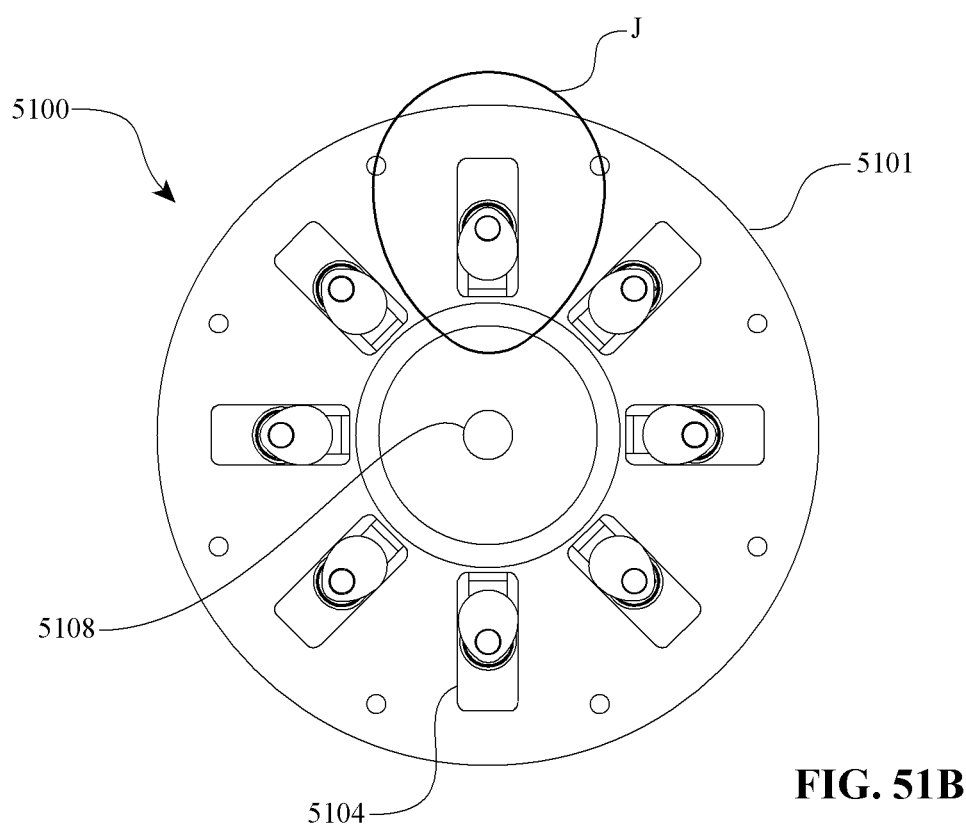
FIG. 51B is another plan view of the CVT of FIG. 51A.
Figure 54:
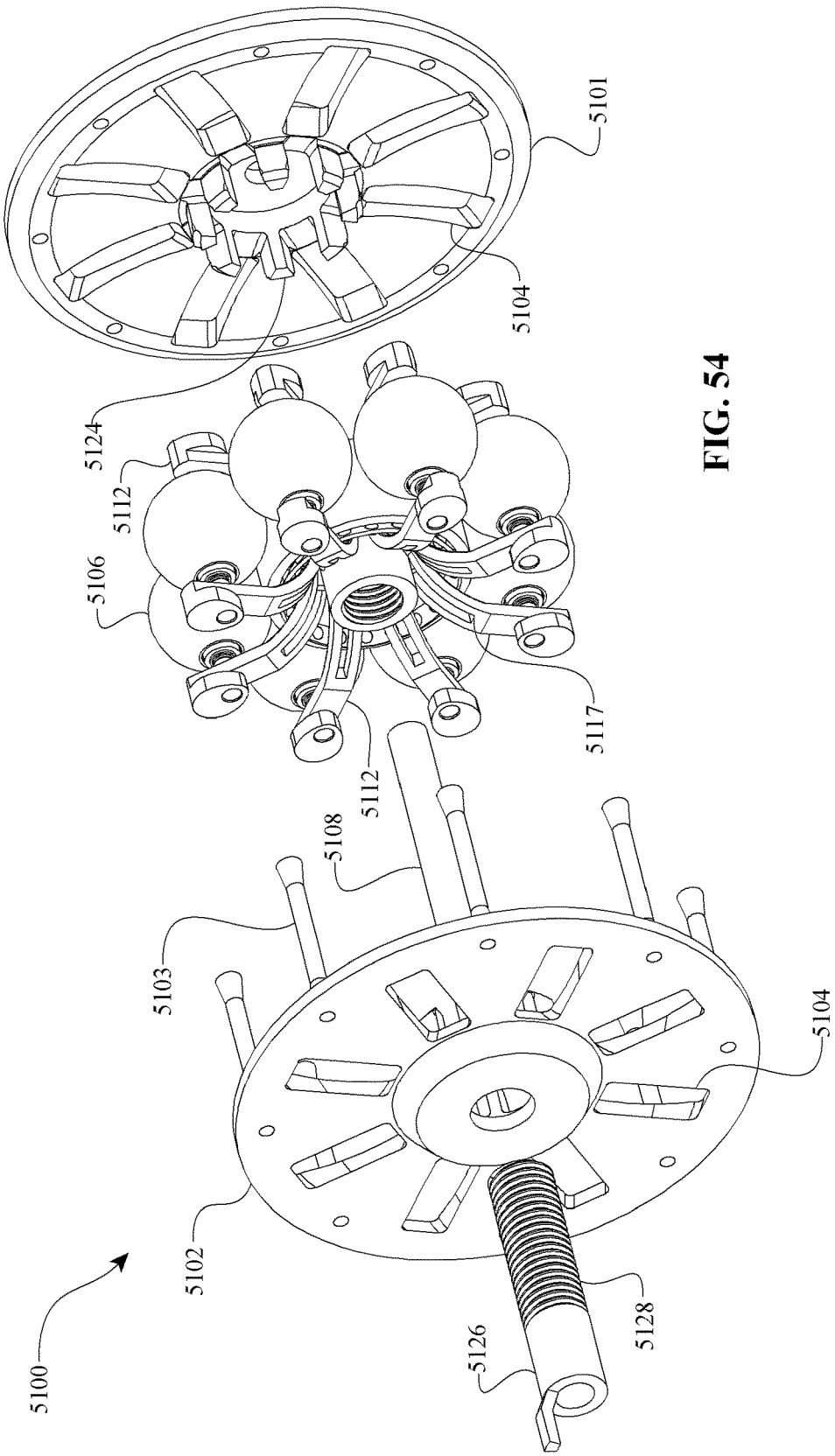
FIG. 54 is an exploded perspective view of the CVT of FIG. 51A.

Passing now to FIGS. 48-50, in one embodiment a CVT 4600 can be configured in various respects substantially similar to the CVT 1000. The CVT 4600 can be provided with a control reference assembly 4602. In the embodiment shown, the control reference assembly 4602 can include a control reference nut 4708 coaxially arranged about the main shaft 4601 that is coupled to a pulley 4702 by cables 4704 and 4706. The pulley 4702 is coupled to a spring retention member 4710 at an interface 4711. In some embodiments, the interface 4711 can be a splined interface and in other embodiments the interface 4711 can be a press fit between the pulley 4702 and the spring retention member 4710. The spring retention member 4710 is coupled to a spring reaction member 4712 in a similar manner as the control reference nut 4302 is coupled to the intermediate reaction member 4304 described with reference to FIGS. 41-46. One end of the cable 4706 is retained in the control reference nut 4708 at a bore 4804B, while another end of the cable 4706 is retained at a bore 4806B formed in the pulley 4702; the cable 4706 can be coupled to the bores 4804B, 4806B in a suitable manner, such as with a set screw or with an adhesive. Similarly, one end of the cable 4704 is retained in the control reference nut 4708 at a bore 4804A, while another end of the cable 4704 is retained at a bore 4806A formed in the pulley 4702. The cables 4704 and 4706 are wrapped around the pulley 4702 in a set of helical grooves 4810A and 4810B.

Referring now to FIGS. 51A-56, in one embodiment, a CVT 5100 can be configured to be similar in various respects to the previously described CVTs; therefore, only certain differences between the previous embodiments and the CVT 5100 will be described. The CVT 5100 can include a first carrier plate 5101 and a second carrier plate 5102 that can be coupled together with a number of carrier rods 5103. The carrier plates 5101, 5102 each can have a number of radial slots 5104. In one embodiment, the CVT 5100 includes a number of traction planets 5106 arranged angularly about a main axle 5108. The main axle 5108 generally defines a longitudinal axis of the CVT 5100. Each of the traction planets 5106 is configured to rotate about a planet axle 5110. The planet support trunnion is configured to receive and support each end of the planet axle 5110.

In one embodiment, the planet support trunnion 5112 is a generally u-shaped body (FIG. 56) having a central bore 5114 and first and second legs 5116A, 5116B extending from the central bore 5114. A slot 5117 can be provided on the u-shaped body and arranged to bisect at least a portion of the legs 5116A, 5116B. The first leg 5116A can be provided with an eccentric skew cam 5118A. The second leg 5116B can be provided with an eccentric skew cam 5118B. The eccentric skew cams 5118A and 5118B are adapted to couple to the radial slot 5104. The planet support trunnion 5112 can have bores 5119 adapted to couple to, and provide support for, the planet axle 5110. In one embodiment, the bores 5119 have a center axis 51190. The eccentric skew cams 5118A and 5118B can be provided with center axes 51180A and 51880B, respectively. The center axis 51190 and the center axes 51180A, 5118B can be configured to be non-concentric. In some embodiments, the eccentric skew cams 5118A, 5118B can have curved profiles around the circumference. In other embodiments, the eccentric skew cams 5118A, 5118B can have circular profiles. In one embodiment, the center axis 51180A is radially outward (with respect to a central, longitudinal axis of the CVT 5100) of the center axis 51190, while the center axis 51180B is radially inward of the center axis 51190 (see, for example, FIGS. 53A and 53B).

In one embodiment, the CVT 5100 is provided with traction sun 5120 that can be configured to rotate about the main axle 5108. The traction sun 5120 is positioned radially inward of, and in contact with, each of the traction planets 5106. In some embodiments, the traction sun 5120 is operably coupled to the first and the second carrier plates 5101 and 5102 via bearings, for example, that can be axially positioned by a number of bearing support fingers 5124 (see FIG. 54) coupled to the carrier plates 5101 and 5102.

Referring again to FIG. 52, in one embodiment, the CVT 5100 can be provided with a shift rod 5126 that is mounted coaxial about the main axle 5108. In some embodiments, the shift rod 5126 slidingly couples to the main axle 5108, while in other embodiments, the shift rod 5126 is operably coupled to the main axle 5108 via bearings (not shown). The shift rod 5126 can be provided with a threaded portion 5128 that is adapted to couple to a sleeve 5130. The sleeve 5130 operably couples to the planet support trunnion 5112 via a pin 5132.

Figure 55:
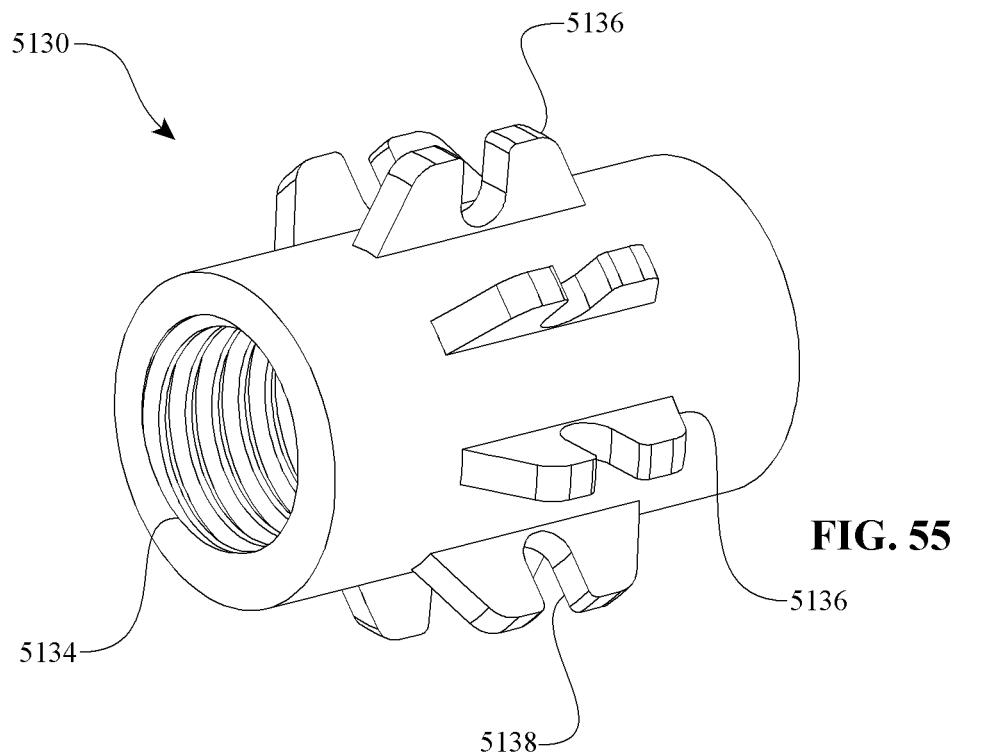
FIG. 55 is a perspective view of a sleeve that can be used with the CVT of FIG. 51A.
Figure 56:
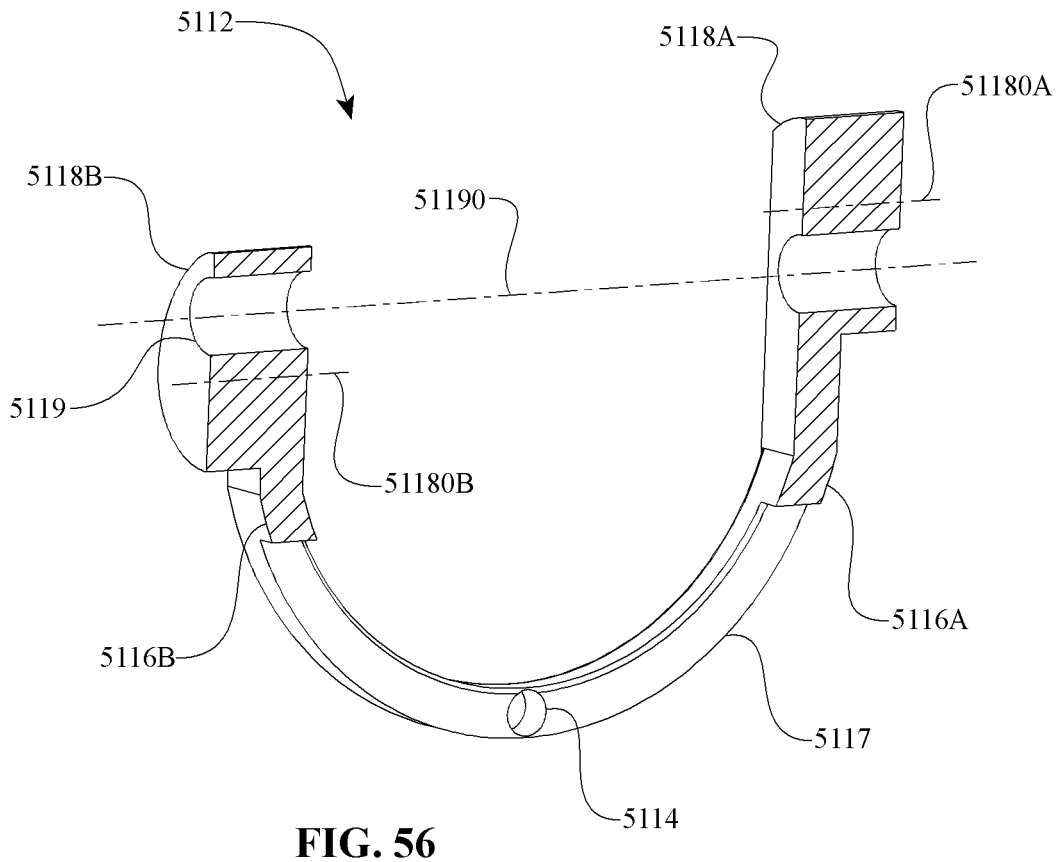
FIG. 56 is a partially cross-sectioned, perspective view of a planet support trunnion that can be used with the CVT of FIG. 51A.

Referring to FIG. 55, in one embodiment, the sleeve 5130 is provided with a threaded inner bore 5134. A number of reaction shoulders 5136 can be arranged angularly about, and extend radially from, the threaded inner bore 5134. The reaction shoulders can be configured to be received in the slot 5117 of each of the planet support trunnions 5112. In some embodiments, each reaction shoulder 5136 is provided with a slot 5138 that is adapted to couple to the pin 5132.

During operation of CVT 5100, a change in the speed ratio of the CVT 5100 can be achieved by tilting the planet axles 5110. The planet axles 5110 can be tilted by pivoting the planet support trunnions 5112. The planet support trunnions 5112 can be pivoted using any suitable method. One method for pivoting the planet support trunnion 5112 involves rotating the shift rod 5126 and, thereby, axially translating the sleeve 5130 and the pin 5132. A second method for pivoting the planet support trunnions 5112 involves rotating the shift rod 5126 thereby rotating the sleeve 5130. A rotation of the sleeve 5130 engages the reaction shoulders 5136 with the planet support trunnions 5112. The reaction shoulders 5136 urge the planet support trunnions 5112 to rotate about the skew cam center axes 51180A and 51180B, which moves the center axis 51190. The movement of the center axis 51190 induces a skew angle on the planet axle 5119. The skew angle, as discussed previously, motivates a change in the tilt angle of the planet axle 5110. Under some operating conditions, for example under a high torque condition, the second method may be preferred.

Figure 57:
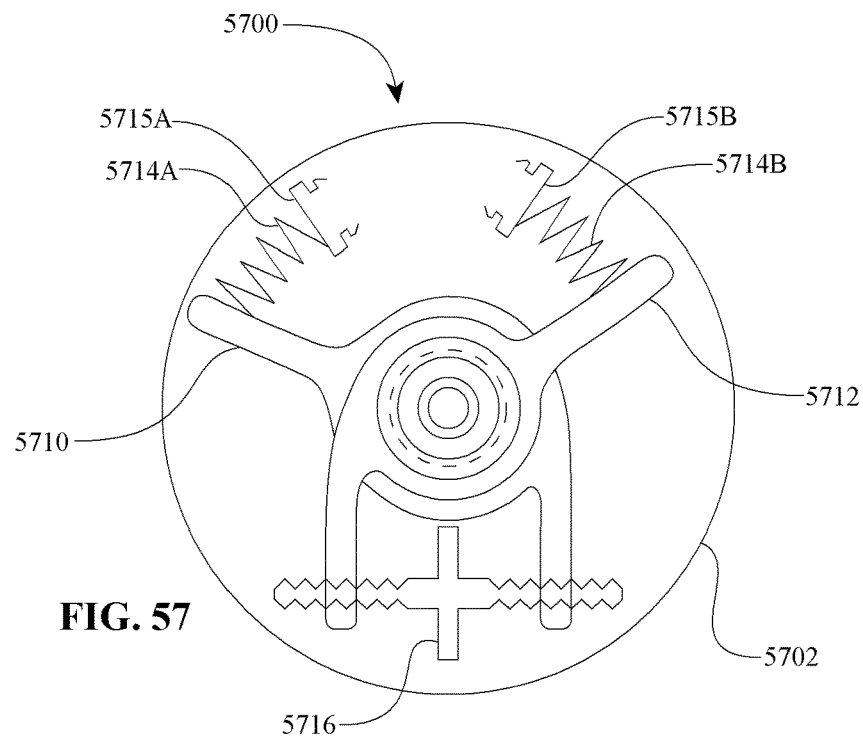
FIG. 57 is a plan view of a torque governor having certain inventive features.
Figure 58:
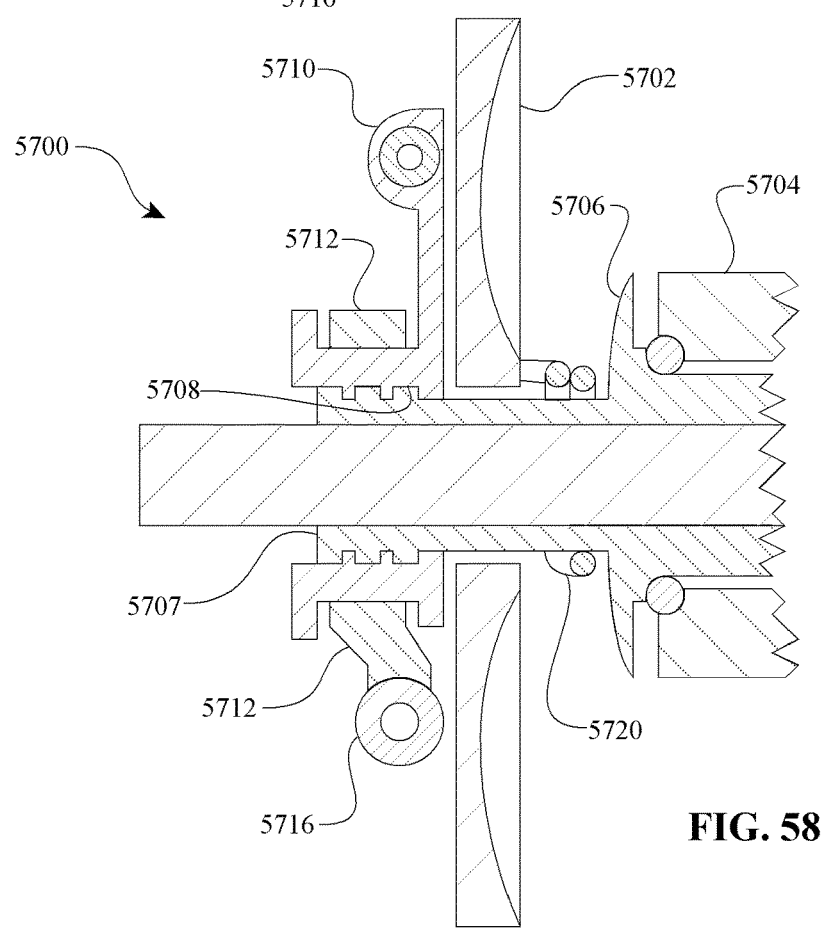
FIG. 58 is a cross-sectional view of the torque governor of FIG. 57.

Passing now to FIGS. 57-58, in one embodiment, a torque governor 5700 can be adapted to cooperate with embodiments of CVTs previously disclosed such as CVT 4100 or 5100, for example. For description purposes, the torque governor 5700 includes a representative carrier plate 5702 that can be substantially similar to the carrier plates 1302, 4604, or 5102, for example. The torque governor 5700 can include a traction sun 5704 that is substantially similar to the traction sun 310, for example. The torque governor 5700 can also include a shift cam 5706 that is substantially similar to the shift cam 1200, for example. In one embodiment, the torque governor 5700 includes first and second reaction arms 5710 and 5712, both of which can be operably coupled to the carrier plate 5702 via springs 5714. The torque governor 5700 can also include a preload adjuster 5716 coupled to the first and the second reaction arms 5710 and 5712. In one embodiment, the preload adjuster 5716 has threaded ends and can be configured to operate as a common turn-buckle, or other similar device, for positioning the reaction arms 5710 and 5712. The reaction arms 5710 and 5712 can be configured in a scissor-like arrangement.

In one embodiment, the shift cam 5706 and the carrier plate 5702 can be adapted to couple to traction planet assemblies 1044 (not shown in FIGS. 57-58), for example, in a substantially similar manner as previously described for embodiments of continuously variable transmission adapted with various inventive skew-based control systems. In one embodiment, the shift cam 5706 includes a threaded extension 5707 that is configured to operably couple to a central bore of the carrier plate 5702. A spring 5720 can be operably coupled to the carrier plate 5702 and the shift cam 5706. The threaded extension 5707 can couple to a mating threaded bore of the reaction arm 5710.

During operation, the torque governor 5700 can adjust the transmission speed ratio to maintain a constant operating torque. An axial translation of the traction sun 5704 due to a change in operating torque causes an axial translation of the shift cam 5706 and the threaded extension 5707. The threaded extension 5707 engages the first reaction arm 5710 and converts the axial translation into a rotation of the first reaction arm 5710. The rotation of the first reaction arm 5710 energizes the spring 5714A and urges the carrier plate 5702 to rotate. It should be readily apparent that the spring 5714B can be energized by the second reaction arm 5712 under an operating condition that causes an axial translation of the threaded extension 5707 in an opposite direction than the one described here as an illustrative example. The rotation of the carrier plate 5702 induces a skew angle on the traction planet assemblies 1044. As previously discussed, the skew angle motivates a shift in the transmission 5700. As the transmission shifts, the traction sun 5704 axially displaces and the carrier plate 5702 returns to an equilibrium position. Since the first reaction arm 5710 is operably coupled to the second reaction arm 5712 via springs 5714, the equilibrium condition can be set with the preload adjuster 5716 that is representative of a desired operating torque.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A method for controlling a continuously variable transmission (CVT) comprising a plurality of traction planets arranged around a main axle defining a longitudinal axis and between first and second traction rings, each traction planet having a planet axle defining an axis of rotation that is tiltable to change a ratio of output speed to input speed, the method comprising:
   receiving, from a control reference source, a control reference indicative of a desired operating condition for the CVT;
   rotating a first carrier plate to a carrier plate angle relative to a second carrier plate, wherein the first carrier plate is coupled to a first end of each planet axle and rotatable about the main axle, wherein the second carrier plate is coupled to a second end of each planet axle and rigidly coupled to the main axle, and wherein rotation of the first carrier relative to the second carrier induces a skew condition on each planet axle;
   sensing a present operating condition for the CVT;
   comparing the present operating condition of the CVT to the control reference to determine a control error; and
   adjusting the carrier plate angle of the first carrier plate relative to the second carrier plate based on the control error to change the skew condition.

2. The method of claim 1, wherein a skew angle coordinator is configured to rotate the first carrier plate relative to the second carrier plate.

3. The method of claim 1, wherein adjusting the carrier plate angle of the first carrier plate relative to the second carrier plate based on the control error comprises rotating the first carrier plate to return to a zero angle relative to the second carrier plate.

4. The method of claim 1, wherein a rate of change of the tilt angle of the plurality of traction planets is a function of the skew condition induced on each planet axle.

5. The method of claim 1, wherein adjusting the carrier plate angle comprises applying a gain to the control error.

6. The method of claim 1, further comprising:
   comparing, by a summing junction, the control reference to a feedback value; and
   receiving a result of the comparison of the control reference to the feedback value to determine the control error.

7. The method of claim 1, further comprising:
   returning a rate of change in a tilt angle of the plurality of traction planets;
   determining, by an integrator, a tilt angle of the plurality of traction planets based on the rate of change in the tilt angle for the plurality of traction planets; and
   inducing the skew condition to change the tilt angle of the plurality of traction planets.

8. The method of claim 1, wherein the control reference comprises a skew angle.

9. The method of claim 1, wherein the control reference comprises one of a desired skew angle, a desired tilt angle, a speed ratio, and a torque ratio.

10. A system for controlling a continuously variable transmission (CVT) comprising a plurality of traction planets arranged around a main axle defining a longitudinal axis and between first and second traction rings, each traction planet having a planet axle defining an axis of rotation that is tiltable to change a ratio of output speed to input speed, the system comprising:
    a control reference source for generating a control reference indicative of a desired operating condition for the CVT;
    a first carrier plate coupled to a first end of each planet axle and rotatable about the main axle;
    a second carrier plate coupled to a second end of each planet axle and rigidly coupled to the main axle; and
    a controller configured to
       receive the control reference,
       determine a present operating condition of the CVT,
       compare the present operating condition of the CVT to the control reference to determine a control error, and
       adjust a carrier plate angle of the first carrier plate relative to the second carrier plate based on the control error to change a skew condition on each planet axle.

11. The system of claim 10, further comprising a skew angle coordinator configured to rotate the first carrier plate relative to the second carrier plate, wherein rotation of the first carrier relative to the second carrier induces the skew condition on each planet axle.

12. The system of claim 11, wherein the skew angle coordinator is configured to rotate the first carrier plate to a zero angle relative to the second carrier plate.

13. The system of claim 11, wherein a rate of change of a tilt angle of the plurality of traction planets is a function of the skew condition on each planet axle.

14. The system of claim 10, wherein the controller further comprises a summing junction configured to compare the control reference to a feedback value, and wherein the controller is further configured to receive a result of the comparison of the control reference to the feedback value to determine the control error.

15. The system of claim 10, wherein the controller is further configured to:
    receive an indication of a rate of change in a tilt angle of the plurality of traction planets;
    determine a tilt angle of the plurality of traction planets based on the rate of change in the tilt angle for the plurality of traction planets; and
    induce the skew condition to change the tilt angle of the plurality of traction planets.

16. The system of claim 10, wherein the control reference comprises a skew angle.

17. The system of claim 10, wherein the control reference comprises one of a desired skew angle, a desired tilt angle, a speed ratio, and a torque ratio.

18. The system of claim 10, wherein the controller is further configured to adjust the carrier plate angle by applying a gain to the control error.

* * * * *